(12) United States Patent
Miller et al.

(10) Patent No.: US 9,739,015 B2
(45) Date of Patent: *Aug. 22, 2017

(54) HIGH SOFTNESS, HIGH DURABILITY BATH TISSUES WITH TEMPORARY WET STRENGTH

(71) Applicant: Georgia-Pacific Consumer Products LP, Atlanta, GA (US)

(72) Inventors: Joseph H. Miller, Neenah, WI (US); Daniel W. Sumnicht, Hobart, WI (US); T. Philips Oriaran, Appleton, WI (US); Brian J. Schuh, Appleton, WI (US); Alberto J. Ramirez, Little Chute, WI (US); Jeffrey A. Lee, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,584

(22) Filed: Sep. 29, 2016

(65) Prior Publication Data

US 2017/0016183 A1 Jan. 19, 2017

Related U.S. Application Data

(63) Continuation of application No. 15/063,637, filed on Mar. 8, 2016, now Pat. No. 9,493,911, which is a
(Continued)

(51) Int. Cl.
*D21H 27/30* (2006.01)
*D21H 27/00* (2006.01)
(Continued)

(52) U.S. Cl.
CPC .......... *D21H 27/30* (2013.01); *B32B 29/005* (2013.01); *B32B 29/06* (2013.01); *D21H 1/02* (2013.01);
(Continued)

(58) Field of Classification Search
CPC ........ D21H 1/02; D21H 21/18; D21H 27/002; D21H 27/30; D21H 21/20; D21H 13/08;
(Continued)

(56) References Cited

U.S. PATENT DOCUMENTS 3,508,941 A 4/1970 Johnson
3,545,705 A 12/1970 Hodgson
(Continued)

FOREIGN PATENT DOCUMENTS

CA 2053505 C 10/1991
CA 2095554 A1 8/1994
(Continued)

OTHER PUBLICATIONS

Egan, R. R., "Cationic Surface Active Agents as Fabric Softeners," J. Am. Oil Chemist's Soc., V. 55 (1978), pp. 118-121.
(Continued)

*Primary Examiner* — Catherine A Simone
(74) *Attorney, Agent, or Firm* — Laura L. Bozek

(57) ABSTRACT

A multi-ply bath tissue includes cellulosic microfibers and wood pulp fibers. The bath tissue has sufficient temporary wet strength resin to provide an initial Finch Cup cross-machine direction (CD) wet tensile of from about 2.5 to about 20 g/3 in. per pound of basis weight, decaying to less than 65% of the initial value in less than 15 minutes after immersion in water, and a caliper of at least 5 mils per 8 sheets per pound of basis weight. At least one of the plies includes a plurality of fiber-enriched hollow domed regions having a relatively high basis weight, a plurality of connecting regions having a relatively lower basis weight forming a network interconnecting the fiber-enriched hollow domed regions of the sheet, and a plurality of transition regions with upwardly and inwardly inflected consolidated fibrous
(Continued)

regions transitioning from the connecting regions into the fiber-enriched hollow domed regions.

126 Claims, 40 Drawing Sheets

Related U.S. Application Data continuation of application No. 13/548,600, filed on Jul. 13, 2012, now Pat. No. 9,309,627.

(60) Provisional application No. 61/457,991, filed on Jul. 28, 2011.

(51) Int. Cl.
    *D21H 21/18* (2006.01)
    *D21H 21/20* (2006.01)
    *B32B 29/00* (2006.01)
    *B32B 29/06* (2006.01)
    *D21H 27/02* (2006.01)
    *D21H 27/40* (2006.01)
    *D21H 11/04* (2006.01)

(52) U.S. Cl.
    CPC ............ *D21H 11/04* (2013.01); *D21H 21/18* (2013.01); *D21H 21/20* (2013.01); *D21H 27/002* (2013.01); *D21H 27/005* (2013.01); *D21H 27/02* (2013.01); *D21H 27/40* (2013.01); *B32B 2250/20* (2013.01); *B32B 2262/065* (2013.01); *B32B 2262/067* (2013.01); *B32B 2262/14* (2013.01); *B32B 2555/00* (2013.01); *Y10T 428/24612* (2015.01)

(58) Field of Classification Search
    CPC ...... D21H 27/005; D21H 27/02; D21H 27/40; B32B 29/06; B32B 29/005; B32B 3/00; B32B 3/28; B32B 3/30; B32B 29/00; B32B 2250/26; B32B 2250/02
    See application file for complete search history.

(56) References Cited

U.S. PATENT DOCUMENTS

| | | |
|---|---|---|
| 3,549,742 A | 12/1970 | Benz |
| 3,556,932 A | 1/1971 | Coscia et al. |
| 3,556,933 A | 1/1971 | Williams et al. |
| 3,700,623 A | 10/1972 | Keim |
| 3,772,076 A | 11/1973 | Keim |
| 3,858,623 A | 1/1975 | Lefkowitz |
| 4,041,989 A | 8/1977 | Johansson et al. |
| 4,071,050 A | 1/1978 | Codorniu |
| 4,112,982 A | 9/1978 | Bugge et al. |
| 4,149,571 A | 4/1979 | Burroughs |
| 4,157,276 A | 6/1979 | Wandel et al. |
| 4,161,195 A | 7/1979 | Khan |
| 4,182,381 A | 1/1980 | Gisbourne |
| 4,184,519 A | 1/1980 | McDonald et al. |
| 4,246,221 A | 1/1981 | McCorsley, III |
| 4,314,589 A | 2/1982 | Buchanan et al. |
| 4,359,069 A | 11/1982 | Hahn |
| 4,376,455 A | 3/1983 | Hahn |
| 4,379,735 A | 4/1983 | MacBean |
| 4,453,573 A | 6/1984 | Thompson |
| 4,529,480 A | 7/1985 | Trokhan |
| 4,533,437 A | 8/1985 | Curran et al. |
| 4,543,156 A | 9/1985 | Cheshire et al. |
| 4,564,052 A | 1/1986 | Borel |
| 4,592,395 A | 6/1986 | Borel |
| 4,603,176 A | 7/1986 | Bjorkquist et al. |
| 4,605,585 A | 8/1986 | Johansson |
| 4,605,702 A | 8/1986 | Guerro et al. |
| 4,611,639 A | 9/1986 | Bugge |
| 4,640,741 A | 2/1987 | Tsuneo |
| 4,675,394 A | 6/1987 | Solarek et al. |
| 4,709,732 A | 12/1987 | Kinnunen |
| 4,720,383 A | 1/1988 | Drach et al. |
| 4,759,391 A | 7/1988 | Waldvogel et al. |
| 4,759,976 A | 7/1988 | Dutt |
| 4,804,769 A | 2/1989 | Solarek et al. |
| 4,866,151 A | 9/1989 | Tsai et al. |
| 4,942,077 A | 7/1990 | Wendt et al. |
| 4,967,085 A | 10/1990 | Bryan et al. |
| 4,973,512 A | 11/1990 | Stanley et al. |
| 4,981,557 A | 1/1991 | Bjorkquist |
| 4,983,748 A | 1/1991 | Tsai et al. |
| 4,998,568 A | 3/1991 | Vohringer |
| 5,008,344 A | 4/1991 | Bjorkquist |
| 5,016,678 A | 5/1991 | Borel et al. |
| 5,023,132 A | 6/1991 | Stanley et al. |
| 5,030,081 A | 7/1991 | Schulz |
| 5,054,525 A | 10/1991 | Vohringer |
| 5,066,532 A | 11/1991 | Gaisser |
| 5,085,736 A | 2/1992 | Bjorkquist |
| 5,091,032 A | 2/1992 | Schulz |
| 5,093,068 A | 3/1992 | Schulz |
| 5,098,519 A | 3/1992 | Ramasubramanian et al. |
| 5,103,874 A | 4/1992 | Lee |
| 5,114,777 A | 5/1992 | Gaisser |
| 5,138,002 A | 8/1992 | Bjorkquist |
| 5,167,261 A | 12/1992 | Lee |
| 5,182,164 A | 1/1993 | Eklund et al. |
| 5,199,261 A | 4/1993 | Baker |
| 5,199,467 A | 4/1993 | Lee |
| 5,211,815 A | 5/1993 | Ramasubramanian et al. |
| 5,217,756 A | 6/1993 | Shinzawa |
| 5,219,004 A | 6/1993 | Chiu |
| 5,223,096 A | 6/1993 | Phan et al. |
| 5,225,269 A | 7/1993 | Bohlin |
| 5,240,562 A | 8/1993 | Phan et al. |
| 5,245,025 A | 9/1993 | Trokhan et al. |
| 5,262,007 A | 11/1993 | Phan et al. |
| 5,264,082 A | 11/1993 | Phan et al. |
| 5,269,983 A | 12/1993 | Schulz |
| 5,277,761 A | 1/1994 | Van Phan et al. |
| 5,312,522 A | 5/1994 | Van Phan et al. |
| 5,328,565 A | 7/1994 | Rasch et al. |
| 5,368,696 A | 11/1994 | Cunnane, III et al. |
| 5,372,876 A | 12/1994 | Johnson et al. |
| 5,379,808 A | 1/1995 | Chiu |
| 5,415,737 A | 5/1995 | Phan et al. |
| 5,607,551 A | 3/1997 | Farrington, Jr. et al. |
| 5,618,612 A | 4/1997 | Gstrein |
| 5,657,797 A | 8/1997 | Townley et al. |
| 5,958,187 A | 9/1999 | Bhat et al. |
| 6,036,820 A | 3/2000 | Schiel et al. |
| 6,059,928 A | 5/2000 | Van Luu et al. |
| 6,413,368 B1 | 7/2002 | Dwiggins et al. |
| 6,413,614 B1 | 7/2002 | Giesler, Sr. et al. |
| 6,500,302 B2 | 12/2002 | Dwiggins et al. |
| 6,808,557 B2 | 10/2004 | Holbrey et al. |
| 6,824,599 B2 | 11/2004 | Swatloski et al. |
| 6,896,768 B2 | 5/2005 | Dwiggins et al. |
| 6,899,791 B2 | 5/2005 | Sabourin |
| 7,300,541 B2 | 11/2007 | Sabourin |
| 7,399,378 B2 | 7/2008 | Edwards et al. |
| 7,442,278 B2 | 10/2008 | Murray et al. |
| 7,494,563 B2 | 2/2009 | Edwards et al. |
| 7,503,998 B2 | 3/2009 | Murray et al. |
| 7,585,389 B2 | 9/2009 | Yeh et al. |
| 7,588,660 B2 | 9/2009 | Edwards et al. |
| 7,588,661 B2 | 9/2009 | Edwards et al. |
| 7,651,589 B2 | 1/2010 | Murray et al. |
| 7,662,255 B2 | 2/2010 | Murray et al. |
| 7,662,257 B2 | 2/2010 | Edwards et al. |
| 7,670,457 B2 | 3/2010 | Murray et al. |
| 7,704,349 B2 | 4/2010 | Edwards et al. |
| 7,718,036 B2 | 5/2010 | Sumnicht et al. |
| 7,758,720 B2 | 7/2010 | Sabourin |
| 7,758,721 B2 | 7/2010 | Sabourin |
| 7,763,715 B2 | 7/2010 | Hecht et al. |
| 7,789,995 B2 | 9/2010 | Super et al. |

(56) References Cited

U.S. PATENT DOCUMENTS

| | | |
|---|---|---|
| 7,850,823 B2 | 12/2010 | Chou et al. |
| 7,888,412 B2 | 2/2011 | Holbrey et al. |
| 7,951,264 B2 | 5/2011 | Sumnicht |
| 8,048,263 B2 | 11/2011 | Herkel et al. |
| 8,216,423 B2 | 7/2012 | Xu |
| 8,287,986 B2 | 10/2012 | Huss et al. |
| 8,293,072 B2 | 10/2012 | Super et al. |
| 8,318,859 B2 | 11/2012 | Amano et al. |
| 9,267,240 B2 | 2/2016 | Lee et al. |
| 9,309,627 B2 | 4/2016 | Miller et al. |
| 9,493,911 B2 * | 11/2016 | Miller .................... D21H 21/18 |
| 2003/0116291 A1 | 6/2003 | Zoeller et al. |
| 2003/0157351 A1 | 8/2003 | Swatloski et al. |
| 2004/0038031 A1 | 2/2004 | Holbrey et al. |
| 2004/0069427 A1 | 4/2004 | Xu |
| 2004/0200586 A1 | 10/2004 | Herkel |
| 2005/0288484 A1 | 12/2005 | Holbrey et al. |
| 2006/0090271 A1 | 5/2006 | Price et al. |
| 2006/0207722 A1 | 9/2006 | Amano et al. |
| 2006/0240727 A1 | 10/2006 | Price et al. |
| 2006/0240728 A1 | 10/2006 | Price et al. |
| 2006/0241287 A1 | 10/2006 | Hecht et al. |
| 2007/0224419 A1 | 9/2007 | Sumnicht et al. |
| 2008/0066877 A1 | 3/2008 | Sabourin |
| 2008/0173418 A1 | 7/2008 | Sumnicht |
| 2009/0297781 A1 | 12/2009 | Huss et al. |
| 2010/0186910 A1 | 7/2010 | Herkel et al. |
| 2010/0186913 A1 | 7/2010 | Super et al. |
| 2010/0263815 A1 | 10/2010 | Xu |

FOREIGN PATENT DOCUMENTS

| | | |
|---|---|---|
| WO | 03/008703 A1 | 1/2003 |
| WO | 2007/109259 A2 | 9/2007 |
| WO | 2009/038730 A1 | 3/2009 |
| WO | 2009/038735 A1 | 3/2009 |
| WO | 2010/088359 A1 | 8/2010 |

OTHER PUBLICATIONS

Espy, Herbert H., "Chapter 2: Alkaline-Curing Polymeric Amine-Epichlorohydrin Resins," in Wet Strength Resins and Their Application, L. Chan, Editor, 1994.

Evans, W. P., "Cationic fabric softeners," Chemistry and Industry, Jul. 5, 1969, pp. 893-903.

Gooding, R.W. and J. A. Olson, "Fractionation in a Bauer-McNett Classifier," Journal of Pulp and Paper Science, vol. 27, No. 12, Dec. 2001, pp. 423-428.

Imperato, Giovanni, et al., "Low-melting sugar-urea-salt mixtures as solves for Diels-Alder reactions," Chem. Commun. 2005, pp. 1170-1172.

Trivedi, B. C., et al., "Quaternization of Imidazoline: Unequivocal Structure Proof," J. Am. Oil Chemist's Soc., Jun. 1981, pp. 754-756.

Westfelt, Lars, "Chemistry of Paper Wet-Strength. I. A Survey of Mechanisms of Wet Strength Development," in Cellulose Chemistry and Technology, V. 13, pp. 813-825, 1979.

English translation of Egyptian Office Action dated Jul. 9, 2015, issued in corresponding Egyptian Patent Application No. PCT 125/2014.

Notification Concerning Transmittal of International Preliminary Report on Patentability and International Preliminary Report on Patentability mailed Feb. 6, 2014, in counterpart International Application No. PCT/US2012/047802.

Egyptian Official Action issued May 10, 2016, in corresponding Egyptian Patent Application No. PCT 125/2014, with an English translation.

* cited by examiner

QUILTED NORTHERN® ULTRA PLUSH

QUILTED NORTHERN® SOFT AND STRONG

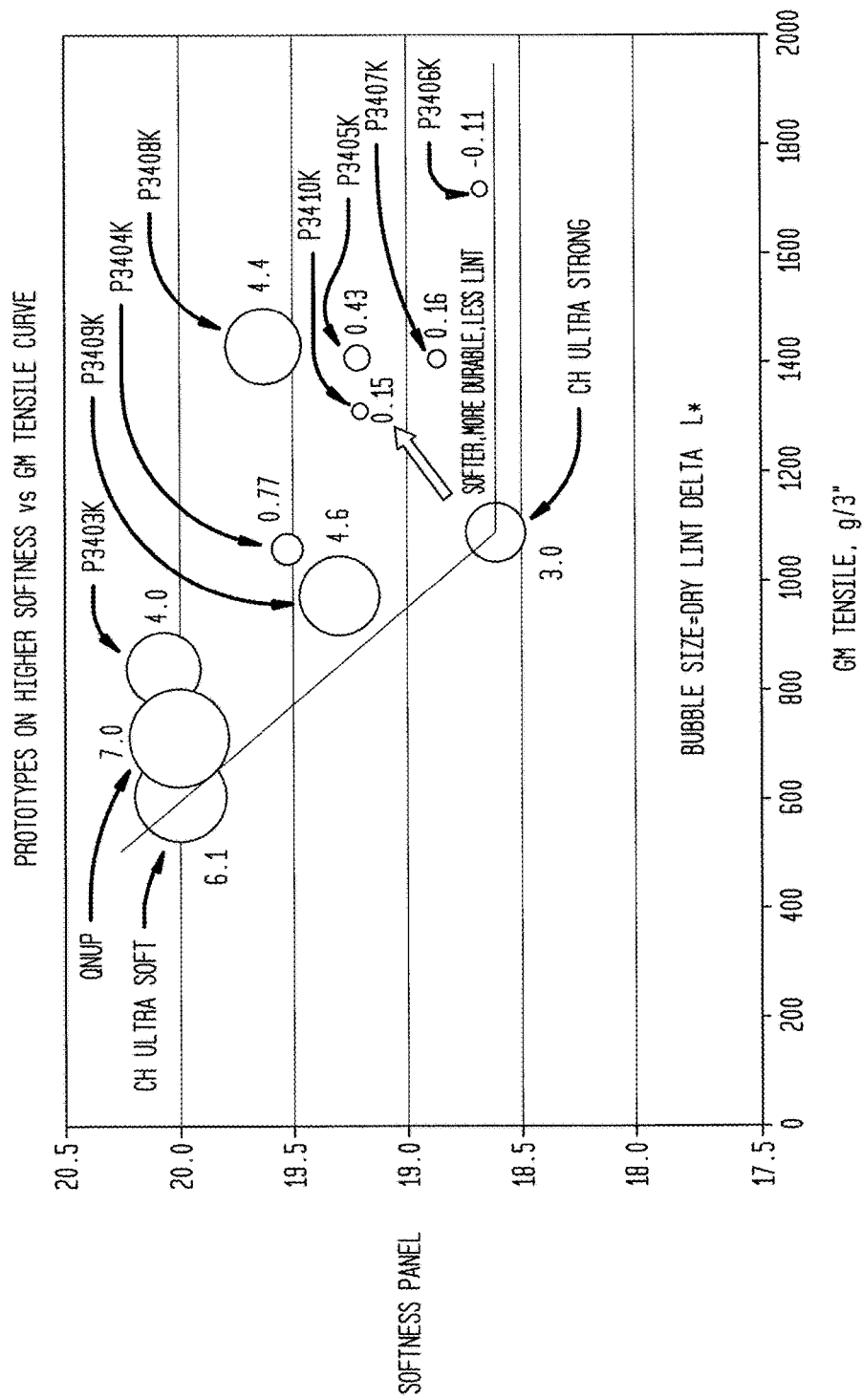

P3403 K

P3405 K

CHARMIN® ULTRA STRONG

COTTONELLE® FRESH

18" Hg, VACUUM, UNCALENDERED, BELT 50, MD

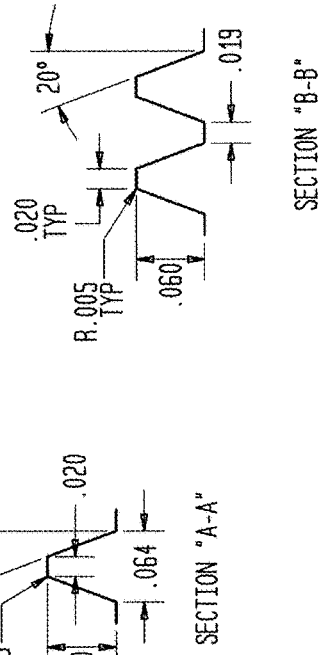
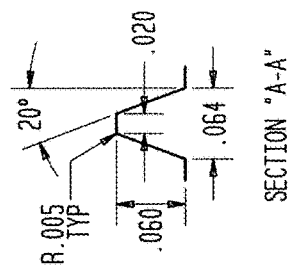
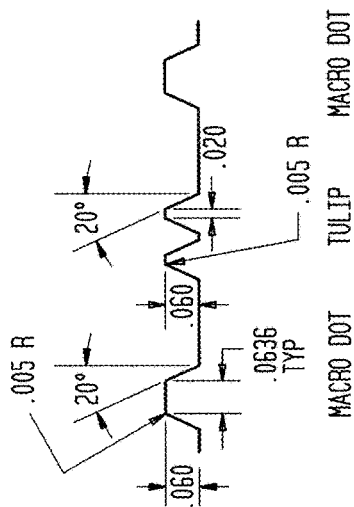
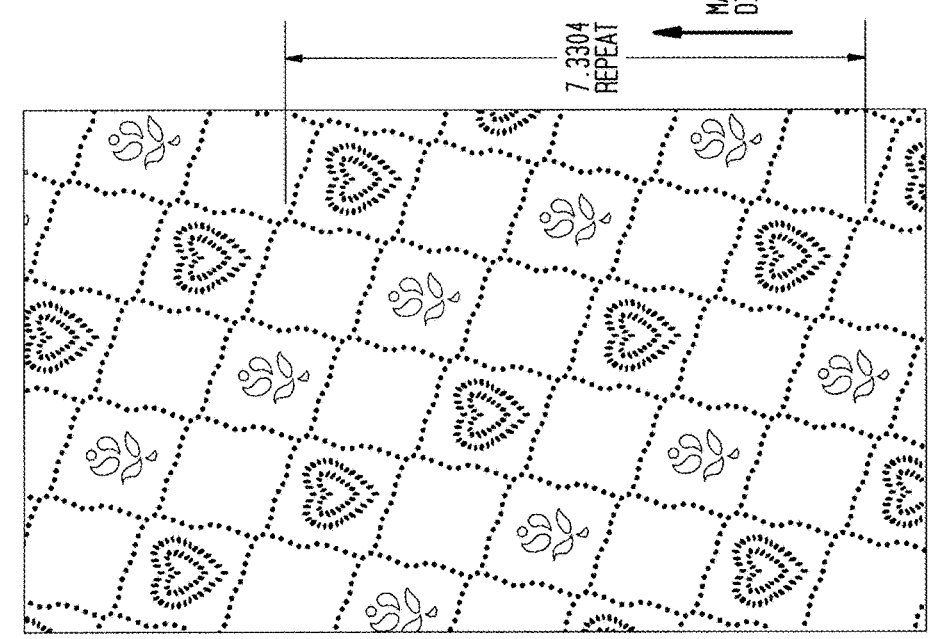

SECTION "D-D"

SECTION "E-E"

SECTION "F-F"

HEART DETAIL

TULIP DETAIL

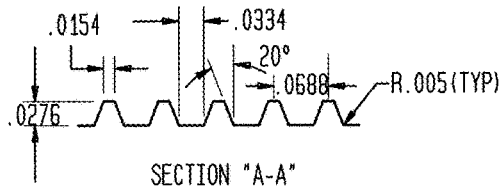
FIG. 28-A
SECTION "A-A"
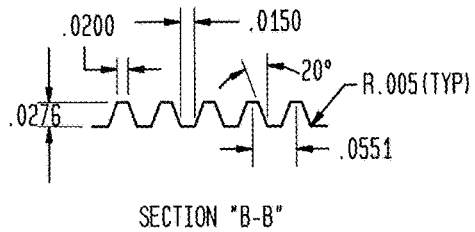
FIG. 28-B
SECTION "B-B"
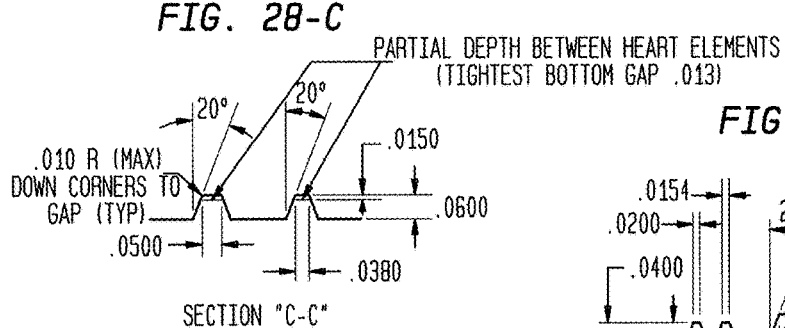
FIG. 28-C
SECTION "C-C"
FIG. 28-D
SECTION "D-D"
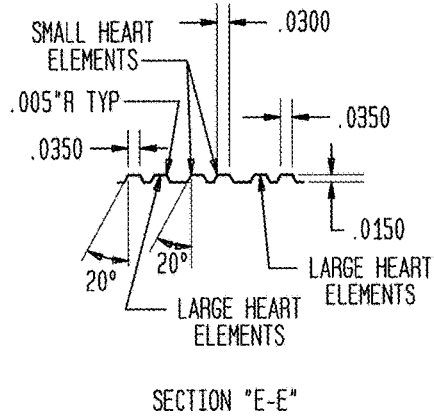
FIG. 28-E
SECTION "E-E"
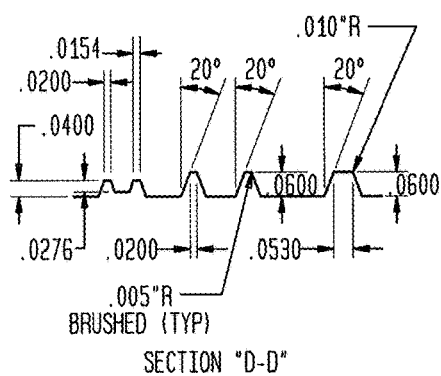
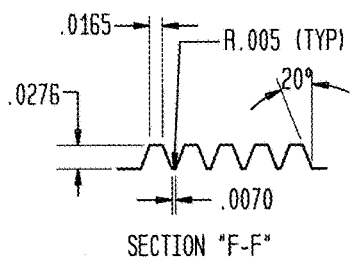
FIG. 28-F
SECTION "F-F"
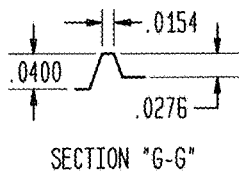
FIG. 28-G
SECTION "G-G"
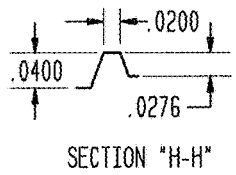
FIG. 28-H
SECTION "H-H"
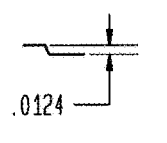
FIG. 28-J
SECTION "J-J"

HIGH SOFTNESS, HIGH DURABILITY BATH TISSUES WITH TEMPORARY WET STRENGTH

CLAIM OF PRIORITY

This application is a continuation application of copending U.S. patent application Ser. No. 15/063,637, filed Mar. 8, 2016, which is a continuation of U.S. patent application Ser. No. 13/548,600, filed Jul. 13, 2012, now U.S. Pat. No. 9,309,627, which claims the benefit of U.S. Provisional Patent Application No. 61/457,991, filed Jul. 28, 2011.

TECHNICAL FIELD

Bath tissue must reconcile several competing imperatives. It must be soft. It must be strong. It must absolutely be flushable and protect the user's hands, while also being effective at cleaning. Bath tissue is primarily used for dry cleaning, although there have been several product entries that were advertised as being suitable for wet cleaning, being primarily, pre-moistened.

Requiring that bath tissue also have significant wet strength immensely complicates the problems that a tissue manufacturer faces, as not only are wet strength and flushability in direct conflict, but softness usually suffers as well when strength is increased, while use of wet tissue can result in linting—conflicting with, if not entirely negating, a bath tissue's raison d'être of cleaning.

BACKGROUND

Against this background, it is apparent that, while some products have reconciled these competing "must-haves" to some extent, there has been a longstanding un-met need for a bath tissue truly surmounting these inherent conflicts. There are also many patents that seem to assume that there is little more to making a viable bath tissue that is usable either dry or premoistened than providing a tissue weight product with significant initial wet strength that decays with time. We have discovered that we can provide a bath tissue that achieves a previously unmatched combination of wet and dry properties by incorporating a minor proportion of cellulosic microfibers into a furnish that is used for bath tissue, then forming a tissue web using a belt creping process, in which a nascent web at a consistency of between about 30 and about 60% is creped from an internally heated creping roll using a creping belt. We have found that, with belt-creping and cellulose microfiber (CMF) content, we can produce sheets that are particularly resistant to linting, even when used wet, while also retaining both sufficient wet strength to protect the user's hand and sufficient softness to be used dry by sensitive users. We have also found that we can substitute a controlled coarseness alkaline peroxide mechanical pulp (APMP) into these wet strength bath tissues as a replacement for eucalyptus kraft, and obtain excellent softness, wet strength, lint resistance and wet lint resistance, with very small amounts of CMF.

Others have attempted to address the need for a flushable bath tissue that can be used dry or premoistened, with a variety of wet wipe formulations, wherein fibers in the wet wipe are bonded together with a strength resin that is stabilized by a chemical species in the imbuement of the wet wipe, but is destabilized upon exposure to a large quantity of "normal" water. Thus, the wipe remains strong as long as the imbuement is in contact with the wipe in its package and for a period after removal, because the imbuement stabilizes the resin, but, when the imbuement is removed or, more properly, diluted with water, the strength agent is rendered less effective and the wipe, at least in theory, becomes dispersible. A major tissue producer is reported to have attempted to commercialize such a technology that was, however, not well accepted by the market. In another approach involving wet wipes, some circles maintain that flushability does not really require that the sheet disintegrate after flushing as long as the size of the sheet is kept under some fairly small maximum. Limited consumer research that has been conducted, however, indicates that most users will remove and use several sheets of bath tissue from the roll at a time, so that the sheet used has an area several times that of the so-called "flushable wet wipe" in which "flushability" is predicated upon the size of the sheet.

In contrast, the present invention is based upon a product that can be stored dry on a perforated roll and used like a conventional bath tissue employing a convenient number of unseparated sheets, as the user prefers. If, however, pre-moistened shortly before use, the tissue retains a sufficient wet strength to be used in the moist state without linting, pilling or shredding, but will disintegrate within a reasonable time after flushing, so that the effectiveness of plumbing is not unduly compromised. Significantly, these goals are achieved without requiring another product in the bathroom; although some users may prefer to use a small container, such as a spray bottle to hold aqueous liquid for moistening the sheet immediately before use. Such bottles can be conveniently disposed inside the roll core of packaged tissue, as promotional or introductory items, if desired.

As use of the present invention makes it possible to achieve quite a high wet/dry ratio, softness does not unduly suffer, as the actual dry tensile strength, which is strongly associated—negatively—with perceived softness, can be moderate, while the wet strength can remain quite high in the first minutes after moistening. Thus, the strength and softness of the tissue of the present invention can be comparable to that of premium bath tissue, while retaining a high temporary wet strength. Even though, when used with conventional papermaking furnishes, many wet strength resins make it possible to achieve wet strength levels necessary for the tissue to be employed premoistened, in many cases, the tactile properties of the dry sheet can be somewhat compromised thereby.

When employing substantial amounts of cellulosic microfibers in the furnish, in conjunction with temporary wet strength resin and belt-creped paper making technology, we have found that we can achieve a surprisingly good combination of softness, opacity, wet strength and resistance to pilling and shredding in a flushable bath tissue. In addition, the flushable bath tissue is capable of being stored on a roll, as is conventional bath tissue, and suitable for use either dry or premoistened. When alkaline peroxide mechanically pulped (APMP) eucalyptus fiber is included, we have found that we can obtain excellent results, even using far less of the cellulosic microfiber, even when using conventional wet press (CWP) technology. We have further discovered that the APMP eucalyptus fiber is an excellent substitute for conventional eucalyptus kraft fiber in conventional bath tissue, imparting increased opacity, bulk, softness, absorbency and reduced strength, even to tissue made with recycle furnishes.

One early pre-wettable tissue was disclosed in Bhat et al., "Prewettable High Softness Paper Product Having Temporary Wet Strength", U.S. Pat. No. 5,958,187, Sep. 28, 1999, relating to a paper product with a glabrous surface and adapted for use either dry or use in a manually pre-moistened condition. Bhat et al. disclose a paper product having a temporary wet strength and exhibiting an initial normalized cross machine direction (CD) wet tensile strength of at least about 25 g/in. strip, preferably, 35 g/in. strip as measured by the Finch Cup Test 5 seconds after immersion, and a subsequent CD wet tensile strength of less than about ⅔ the initial value as measured 30 minutes after immersion. Temporary wet strength was provided by addition to the furnish of a temporary wet strength agent comprising aldehydic units in the range of from about 2 pounds per ton to about 30 pounds per ton. The furnish also included a cationic nitrogenous softener/debonder in an amount of from about 1 pound per ton to about 6 pounds per ton. The CD dry tensile strength of the paper product was from about 133 g/in. strip up to about 267 g/in. strip, and the tensile modulus was from about 10 to about 32 g/% strain, while the geometric mean friction deviation (GM MMD value) was from about 0.26 to about 0.10. The CD wet strength of the product decays to about 15 g/in. within 10 hours after immersion. When rubbed against a skin-like surface in a moistened condition, the paper product remains substantially free of pilling. Significantly, in Bhat et al., the wet abrasion resistance of a 2" by 4.5" sample of tissue was measured under a load of 135 grams against a wetted pigskin, and visual observation was made to determine whether the sample left pills, shreds or lint behind.

Another early pre-wettable tissue was disclosed in Van Luu et al. [sic, Luu et al.], "Prewettable High Softness Paper Product Having Temporary Wet Strength", U.S. Pat. No. 6,059,928, May 9, 2000, in which a temporary wet strength agent comprising uncharged chemical moieties, such as aldehydes, and aldehydes containing polymers, polyols and cyclic ureas, or mixtures thereof, in the range of from about 2 pounds per ton to about 30 pounds per ton are added to the web to provide the temporary wet strength. In this application, glyoxal was preferably sprayed on the sheet after it left the Yankee dryer.

"Belt-Creped, Variable Local Basis Weight Absorbent Sheet Prepared With Perforated Polymeric Belt" is disclosed in Super et al. U.S. Patent Application Publication No. 2010/0186913, now U.S. Pat. No. 8,293,072 (incorporated herein by reference), which produces cellulosic tissue sheets exhibiting a surprising combination of bulk, roll firmness, absorbency and softness, from a sheet with a fiber-enriched higher basis weight, hollow domed regions joined by a network of lower local basis weight connecting regions forming a network in which upwardly and inwardly inflected consolidated fibrous regions exhibiting CD fiber orientation bias form transition areas between the connecting regions and the domed regions. The consolidated fibrous regions are, preferably, saddle shaped and exhibit a matted structure on both their outer and inner surfaces. Related technology is found in the following U.S. Patent Applications and U.S. Patents: U.S. Pat. No. 7,494,563 entitled "Fabric Creped Absorbent Sheet with Variable Local Basis Weight", U.S. Pat. No. 7,399,378 entitled "Fabric Crepe Process for Making Absorbent Sheet", U.S. Pat. No. 7,789,995 entitled "Fabric Crepe/Draw Process for Producing Absorbent Sheet", the application of which was a continuation-in-part of the application of U.S. Pat. No. 7,399,378 entitled "Fabric Crepe Process for Making Absorbent Sheet", U.S. Pat. No. 7,442,278 entitled "Fabric Crepe and In Fabric Drying Process for Producing Absorbent Sheet", U.S. Pat. No. 7,503,998 entitled "High Solids Fabric Crepe Process for Producing Absorbent Sheet With In-Fabric Drying", U.S. Pat. No. 7,662,257 entitled "Multi-Ply Paper Towel With Absorbent Core", U.S. Pat. No. 7,588,660 entitled "Wet-Pressed Tissue and Towel Products With Elevated CD Stretch and Low Tensile Ratios Made With a High Solids Fabric Crepe Process", and U.S. Pat. No. 7,585,389 entitled "Method of Making Fabric-Creped Sheet for Dispensers", U.S. Pat. No. 7,850,823 entitled "Method of Controlling Adhesive Build-Up on a Yankee Dryer", U.S. Pat. No. 7,651,589 entitled "Process for Producing Absorbent Sheet", U.S. Pat. No. 7,662,255 entitled "Absorbent Sheet", and U.S. Pat. No. 7,670,457, which are each a division of the application of U.S. Pat. No. 7,442,278; U.S. Pat. No. 7,588,661 entitled "Fabric Crepe Process for Making Absorbent Sheet", and U.S. Pat. No. 7,704,349 entitled "Fabric Crepe Process for Making Absorbent Sheet", which are both a division of the application of U.S. Pat. No. 7,399,378, and U.S. Pat. No. 7,670,457 entitled "Process for Producing Absorbent Sheet". The papermaking technology disclosed in the foregoing documents in this paragraph, the disclosures of which are all incorporated herein by reference in their entireties, makes it possible to form sheets with extremely high bulk stretch and absorbency.

Canadian Patent Application No. 2,095,554 in the name of William D. Lloyd, published Aug. 6, 1994, discloses that hardwood bleached chemical thermomechanical pulp (BCTMP) fibers at amounts of about 5 weight percent or greater provide a soft tissue useful for use as facial or bath tissue, but fails to disclose the degree of bleaching and chemical refining applied to his fibers and is devoid of information concerning the brightness, lignin content or Kappa number of his fibers, other than to state that the fibers contain "substantial amounts of lignin" and the that pulping yield is "about 90% or greater". Lloyd also states that "it is not necessary to bury the BCTMP fibers in the middle of the tissue sheet by layering. Instead, the tissue sheets can be blended using a mixture of hardwood BCTMP fibers (for softness) and longer softwood fibers (for strength). If a layered tissue is preferred, the hardwood BCTMP fibers can be utilized in the outer layer(s)."

SUMMARY OF THE INVENTION

We have found that we can achieve this desirable combination of properties in a two- or three-ply sheet formed from belt creped cellulosic basesheet, the multi-ply sheet having a basis weight of from about 20 to about 35 lbs and comprising from about 10% to about 30% cellulosic microfiber, from about 70% to about 90% wood pulp fibers, with a geometric mean (GM) dry tensile of from about 35 to 80 g/3 in. per pound of basis weight, a CD dry tensile of between about 30 to about 60 g/3 in. per pound of basis weight, sufficient wet strength resin to provide a CD wet tensile of from about 8.5 to about 20 g/3 in. per pound of basis weight, and a caliper of at least 5 mils per 8 sheets per pound of basis weight. Preferably, such a multi-ply tissue will have an opacity of at least about 2.5 McBeth Opacity Units per pound of basis weight. More preferably, the basis weight will be between 22 and 32 lbs per 3000 sq ft ream. Upon testing for Dry Lint, as referenced herein, sheets of the present invention will exhibit a ΔL* of less than about 6. ("L*" as used in this connection relates to International Commission on Illumination (CIE) 1976, also known as CIELAB measurement of lightness and should not be confused with Hunter lightness, typically denominated "L". In this connection, the asterisk "*" is not a reference mark directing the reader to some other location in this document, but a portion of the commonly used symbol for CIE 1976 lightness "L*".) When tested for wet lint as set forth herein, sheets of the present invention will exhibit a Wet Abraded Lint Area of less than about 35 mm². Alternatively, when tested as set forth herein, resistance to wet linting will be represented by the number of fibers removed having a length of greater than 40 μm, with products of the invention suffering a loss of less than 2500 fibers having a length of greater than 40 μm.

We also have discovered that inclusion of eucalyptus pre-conditioning refiner chemical alkaline peroxide mechanical pulp (APMP) into tissue formulations intended to be used pre-wetted makes it possible to dramatically improve the performance of these tissues, even with concentrations of cellulosic microfiber below the 10% by weight level in conventional wet press technology (i.e., CWP) tissues. U.S. Provisional Patent Application No. 61/574,200, entitled "High Softness, High Durability Bath Tissue Incorporating High Lignin Eucalyptus Fiber", filed on Jul. 28, 2011, naming Jeffrey A. Lee and Daniel W. Sumnicht as inventors, illustrates the suitability of eucalyptus pre-conditioning refiner chemical alkaline peroxide mechanical pulp referred to herein as eucalyptus (APMP). We have found that we can get surprisingly good softness, bulk and wet properties using eucalyptus APMP, in conjunction with relatively low contents of CMF, even in CWP products. Accordingly, it is evident that eucalyptus APMP can be substituted into the formulations described elsewhere in this application to significant benefit, particularly, in cases when the amount of CMF is below 20% by weight.

BRIEF DESCRIPTION OF THE DRAWINGS

The invention is described with reference to the drawings, wherein:

FIGS. 8A to 8D are graphical comparisons of properties of tissues of the present invention, particularly, softness, as compared to commercially available tissue products illustrating that Applicants have succeeded in manufacturing dispersible (flushable) temporary wet strength bath tissues that not only can achieve at least parity softness with conventional ultra premium bath tissue, but have sufficient temporary wet strength to be usable pre-wetted without leaving excessive lint behind in use, whether used pre-wetted or dry.

FIG. 10 is photomicrograph of a perforated polymeric belt suitable for the practice of the present invention, while

(FIG. 26 is a sectional view taken along line 28-28 of FIG. 25.)

FIGS. 27, 27A to 27F, 27H, and 27T illustrate details of the emboss pattern U 19 referred to herein.

DETAILED DESCRIPTION

Figure 1:
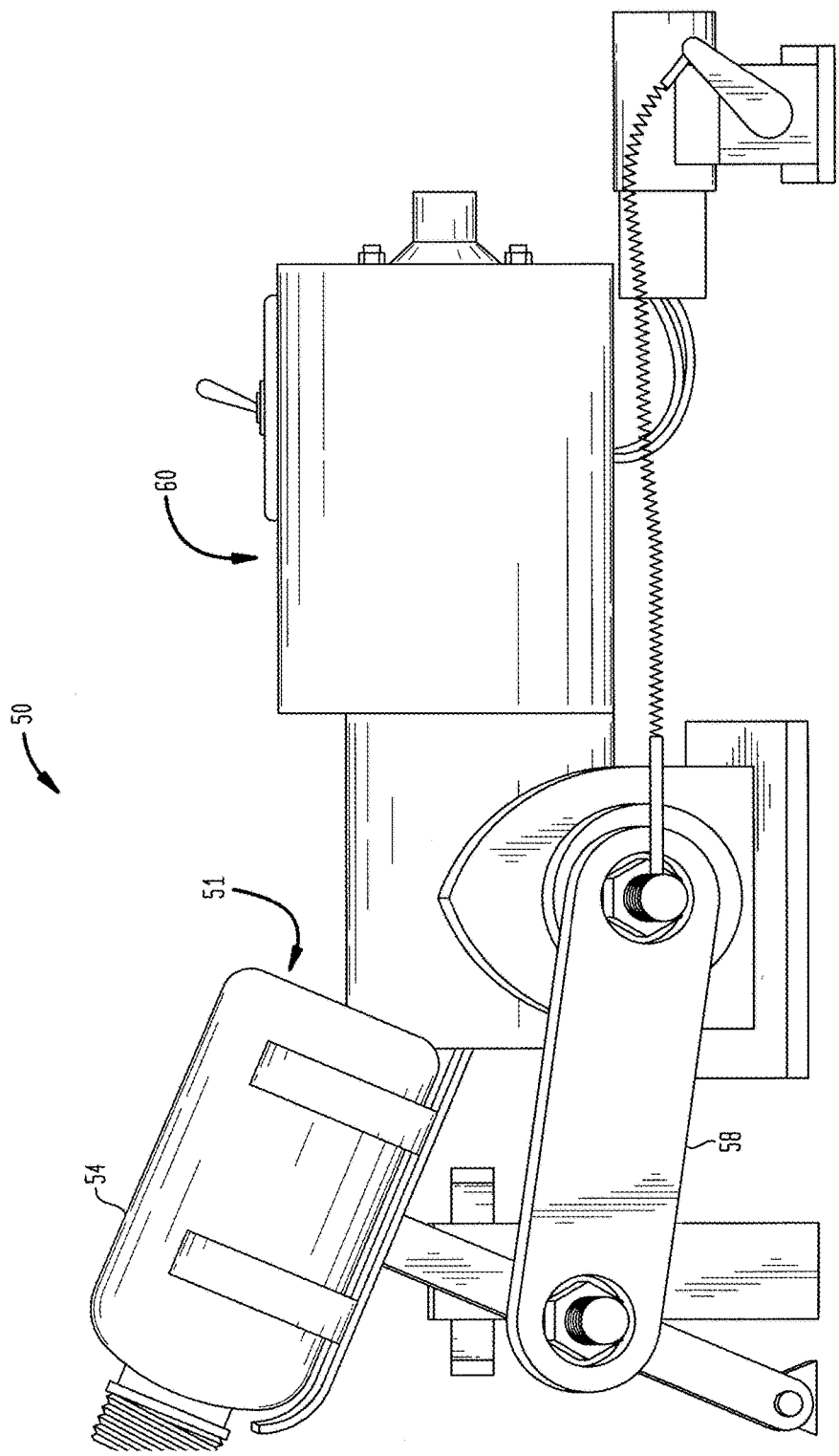
FIG. 1 is a schematic illustration of a shaker for use in the "Dispersibility Test" described herein.

The invention is described below with reference to numerous embodiments. Such a discussion is for purposes of illustration only. Modifications to particular examples within the spirit and scope of the present invention, set forth in the appended claims, will be readily apparent to one of skill in the art.

Terminology used herein is given its ordinary meaning consistent with the exemplary definitions set forth immediately below: mg refers to milligrams and m² refers to square meters, mm² refers to square millimeters, and so forth.

The creping adhesive "add-on" rate is calculated by dividing the rate of application of adhesive (mg/min) by surface area of the drying cylinder passing under a spray applicator boom (m²/min). The resinous adhesive composition most preferably consists essentially of a polyvinyl alcohol resin and a polyamide-epichlorohydrin resin, wherein the weight ratio of polyvinyl alcohol resin to polyamide-epichlorohydrin resin is from about 2 to about 4. The creping adhesive may also include modifier sufficient to maintain good transfer between the creping belt and the Yankee cylinder, generally, less than 5% by weight modifier, and, more preferably, less than about 2% by weight modifier, for peeled products. For blade creped products, from about 5% to about 25% modifier or more may be used.

Throughout this specification and claims, when we refer to a nascent web having an apparently random distribution of fiber orientation (or use like terminology), we are referring to the distribution of fiber orientation that results when known forming techniques are used for depositing a furnish on the forming fabric. When examined microscopically, the fibers give the appearance of being randomly oriented, even though, depending on the jet to wire speed ratio, there may be a significant bias toward machine direction orientation making the machine direction tensile strength of the web exceed the cross-direction tensile strength.

In many applications related to U.S. Pat. No. 7,399,378, entitled "Fabric Crepe Process for Making Absorbent Sheet", the importance of the distinction between creping using a woven fabric and a creping belt formed by perforating a solid belt was of minor importance, so the term "belt" could apply to either creping medium. In this application, however, as well as in U.S. patent application Ser. No. 12/694,650, filed on Jan. 27, 2010, entitled "Belt-Creped, Variable Local Basis Weight Absorbent Sheet Prepared With Perforated Polymeric Belt" and published as U.S. Patent Application Publication No. 2010/0186913, now U.S. Pat. No. 8,293,072, the distinction between the use of a creping fabric and a perforated polymeric belt is of considerable importance, as it has been found that use of a perforated polymeric belt makes it possible to obtain consolidated regions, particularly, consolidated saddle shaped regions, in the web, giving it improved physical properties over the webs previously formed using the technique of creping from a transfer drum. For convenience, we refer to this method of forming a sheet as Fiber Reorienting Belt Creping or FRBC. Further, in this application, it is demonstrated that CMF containing wipers made using a perforated polymeric belt have substantial performance advantages over wipers made using a woven creping fabric, which we term Fiber Reorienting Fabric Creping or FRFC. Throughout this application, we have endeavored to make this distinction explicit, but, definitional language in applications incorporated by reference notwithstanding, in this application, belts and creping fabrics should not be considered to be synonymous.

Unless otherwise specified, "basis weight", BWT, bwt, BW, and so forth, refers to the weight of a 3000 square-foot ream of product (basis weight is also expressed in g/m$^2$ or gsm). Likewise, "ream" means a 3000 square-foot ream, unless otherwise specified. Local basis weights and differences therebetween are calculated by measuring the local basis weight at two or more representative low basis weight areas within the low basis weight regions and comparing the average basis weight to the average basis weight at two or more representative areas within the relatively high local basis weight regions. For example, if the representative areas within the low basis weight regions have an average basis weight of 15 lbs/3000 ft$^2$ ream and the average measured local basis weight for the representative areas within the relatively high local basis regions is 20 lbs/3000 ft$^2$ ream, the representative areas within high local basis weight regions have a characteristic basis weight of ((20−15)/15)×100% or 33% higher than the representative areas within low basis weight regions. Preferably, the local basis weight is measured using a beta particle attenuation technique as referenced herein. In some cases, X-ray techniques can be suitably provided that the X-rays are sufficiently "soft"—that the energy of the photons is sufficiently low and the basis weight differences between the various regions of the sheet are sufficiently high, so that significant differences in attenuation are attained.

"Belt crepe ratio" is an expression of the speed differential between the creping belt and the forming wire, and is typically calculated as the ratio of the web speed immediately before belt creping and the web speed immediately following belt creping, the forming wire and transfer surface being typically, but not necessarily, operated at the same speed:

Belt crepe ratio=transfer cylinder speed÷creping belt speed.

Belt crepe can also be expressed as a percentage calculated as:

Belt crepe=[Belt crepe ratio−1]×100.

A web creped from a transfer cylinder with a surface speed of 750 fpm to a belt with a velocity of 500 fpm has a belt crepe ratio of 1.5 and a belt crepe of 50%.

For reel crepe, the reel crepe ratio is typically calculated as the Yankee speed divided by reel speed. To express reel crepe as a percentage, one (1) is subtracted from the reel crepe ratio and the result multiplied by 100.

The belt crepe/reel crepe ratio is calculated by dividing the belt crepe by the reel crepe.

The line or overall crepe ratio is calculated as the ratio of the forming wire speed to the reel speed and a % total crepe is:

Line Crepe=[Line Crepe Ratio−1]/100.

A process with a forming wire speed of 2000 fpm and a reel speed of 1000 fpm has a line or total crepe ratio of 2 and a total crepe of 100%.

"Belt side" and like terminology refers to the side of the web that is in contact with the creping belt. "Dryer-side" or "Yankee-side" is the side of the web in contact with the drying cylinder, typically, opposite to the belt-side of the web in many papermaking configurations. In these configurations, the belt side could also be referred to as the air side. The air side, however, is always opposite to the Yankee side. In this application, "belt side" is determined when the sheet is in contact with the transfer cylinder from which it is creped by the creping belt.

Calipers and/or bulk reported herein may be measured at 8 or 16 sheet calipers as specified. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with 2-in diameter anvils, 539±10 grams dead weight load, and 0.231 in/sec descent rate. For finished product testing, each sheet of product to be tested must have the same number of plies as the product as sold. For testing in general, eight sheets are selected and stacked together. For napkin testing, napkins are unfolded prior to stacking. For base sheet testing off of winders, each sheet to be tested must have the same number of plies as produced off of the winder. For base sheet testing off of the papermachine reel, single plies must be used. Sheets are stacked together aligned in the machine direction (MD). Bulk may also be expressed in units of volume/weight by dividing caliper by basis weight.

The term "cellulosic", "cellulosic sheet", and the like, is meant to include any wet-laid product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include nonwood fibers, such as cotton fibers or cotton derivatives, abaca, kenaf, sabai grass, flax, esparto grass, straw, jute hemp, bagasse, milkweed floss fibers, and pineapple leaf fibers, and wood fibers, such as those obtained from deciduous and coniferous trees, including softwood fibers, such as northern and southern softwood kraft fibers, hardwood fibers, such as eucalyptus, maple, birch, aspen, or the like. Papermaking fibers can be liberated from their source material by any one of a number of chemical pulping processes familiar to one experienced in the art, including sulfate, sulfite, polysulfide, soda pulping, etc. The pulp can be bleached, if desired, by chemical means, including the use of chlorine, chlorine dioxide, oxygen, alkaline peroxide, and so forth. The products of the present invention may comprise a blend of conventional fibers (whether derived from virgin pulp or recycle sources) and high coarseness lignin-rich tubular fibers, mechanical pulps, such as bleached chemical thermomechanical pulp (BCTMP). "Furnishes" and like terminology refers to aqueous compositions including papermaking fibers, optionally, wet strength resins, debonders, and the like, for making paper products. Recycle fiber is typically more than 50% by weight hardwood fiber and may be 75% to 80% or more hardwood fiber.

As used herein, the term "compactively dewatering the web" (or furnish) refers to mechanical dewatering by overall wet pressing, such as on a dewatering felt, for example, in some embodiments, by use of mechanical pressure applied continuously over the web surface as in a nip between a press roll and a press shoe, wherein the web is in contact with a papermaking felt. The terminology "compactively dewatering" is used to distinguish from processes wherein the initial dewatering of the web is carried out largely by thermal means, as is the case, for example, in U.S. Pat. No. 4,529,480 to Trokhan and U.S. Pat. No. 5,607,551 to Farrington et al. Compactively dewatering a web thus refers, for example, to removing water from a nascent web having a consistency of less than 30% or so by application of pressure thereto and/or increasing the consistency of the web by about 15% or more by application of pressure thereto, that is, increasing the consistency, for example, from 30% to 45%.

Consistency refers to % solids of a nascent web, for example, calculated on a bone dry basis. "Air dry" means including residual moisture, by convention, up to about 10% moisture for pulp and up to about 6% for paper. A nascent web having 50% water and 50% bone dry pulp has a consistency of 50%.

Consolidated fibrous structures are those that have been so highly densified that the fibers therein have been compressed to ribbon-like structures and the void volume is reduced to levels approaching or perhaps even less than those found in flat papers, such as are used for communication purposes. In preferred structures, the fibers are so densely packed and closely matted that the distance between adjacent fibers is typically less than the fiber width, often less than half or even less than a quarter of the fiber width. In the most preferred structures, the fibers are largely collinear and strongly biased in the machine direction (MD). The presence of consolidated fiber or consolidated fibrous structures can be confirmed by examining thin sections that have been imbedded in resin, then, microtomed in accordance with known techniques. Alternatively, if scanning electron microscope images (SEM's) of both faces of a region are so heavily matted as to resemble flat paper, then that region can be considered to be consolidated. Sections prepared by focused ion beam cross section polishers, such as those offered by JEOL® USA, Inc., 11 Dearborn Road, Peabody, Mass., 01960, are especially suitable for observing densification throughout the thickness of the sheet, to determine whether regions in the tissue products of the present invention have been so highly densified as to become consolidated.

Creping belt and like terminology refers to a belt that bears a perforated pattern suitable for practicing the process of the present invention. In addition to perforations, the belt may have features, such as raised portions and/or recesses between perforations, if so desired. Preferably, the perforations are tapered, which appears to facilitate transfer of the web, especially, from the creping belt to a dryer, for example. Typically, the face of the sheet contacting the web during the fabric creping step will have a greater open area than the face away from the web. In some embodiments, the creping belt may include decorative features, such as geometric designs, floral designs, and so forth, formed by rearrangement, deletion, and/or combination of perforations having varying sizes and shapes.

"Domed", "dome-like", and so forth, as used in the description and claims, generally refer to hollow, arched protuberances in the sheet of the class seen in the various Figures and is not limited to a specific type of dome structure. The terminology refers to vaulted configurations, generally, whether symmetric or asymmetric about a plane bisecting the domed area. Thus, "domed" generally refers to spherical domes, spheroidal domes, elliptical domes, ellipsoidal domes, oval domes, domes with polygonal bases and related structures, generally including a cap and sidewalls, preferably, inwardly and upwardly inclined, that is, the sidewalls being inclined toward the cap along at least a portion of their length. Cross-sectional photomicrographs are shown of such domed structures in FIGS. 21 to 23.

FPM, Fpm and fpm refer to feet per minute, while fps refers to feet per second.

MD means machine direction and CD means cross-machine direction.

When applicable, MD bending length (cm) of a product is determined in accordance with American Society for Testing and Materials (ASTM) test method D 1388-96, cantilever option. Reported bending lengths refer to MD bending lengths, unless a CD bending length is expressly specified. The MD bending length test was performed with a Cantilever Bending Tester available from Research Dimensions, 1720 Oakridge Road, Neenah, Wis., 54956, which is substantially the apparatus shown in the ASTM test method, item 6. The instrument is placed on a level, stable surface, horizontal position being confirmed by a built in leveling bubble. The bend angle indicator is set at 41.5° below the level of the sample table. This is accomplished by setting the knife edge appropriately. The sample is cut with a one inch strip cutter available from Thwing-Albert Instrument Company, 14 Collins Avenue, W. Berlin, N.J. 08091. Six (6) samples are cut: 1 inch×8 inch machine direction specimens. Samples are conditioned at 23° C.±1° C. (73.4° F.±1.8° F.) at 50% relative humidity for at least two hours. For machine direction specimens, the longer dimension is parallel to the machine direction. The specimens should be flat, free of wrinkles, bends or tears. The Yankee-side of the specimens is also labeled. The specimen is placed on the horizontal platform of the tester, aligning the edge of the specimen with the right hand edge. The movable slide is placed on the specimen, being careful not to change its initial position. The right edge of the sample and the movable slide should be set at the right edge of the horizontal platform. The movable slide is displaced to the right in a smooth, slow manner, at approximately 5 inch/minute until the specimen touches the knife edge. The overhang length is recorded to the nearest 0.1 cm. This is done by reading the left edge of the movable slide. Three specimens are preferably run with the Yankee-side up and three specimens are preferably run with the Yankee-side down, on the horizontal platform. The MD bending length is reported as the average overhang length in centimeters, divided by two to account for bending axis location.

Nip parameters include, without limitation, nip pressure, nip width, backing roll hardness, creping roll hardness, belt approach angle, belt takeaway angle, uniformity, nip penetration and velocity delta between surfaces of the nip.

Nip width (or length as the context indicates) means the MD length over which the nip surfaces are in contact.

PLI or pli means pounds force per linear inch. The process employed is distinguished from other processes, in part, because belt creping is carried out under pressure in a creping nip. Typically, rush transfers are carried out using suction to assist in detaching the web from the donor fabric and, thereafter, attaching it to the receiving or receptor fabric. In contrast, suction is not required in a belt creping step, so, accordingly, when we refer to belt creping as being "under pressure," we are referring to loading of the receptor belt against the transfer surface, although suction assist can be employed at the expense of further complication of the system, as long as the amount of suction is not sufficient to undesirably interfere with rearrangement or redistribution of the fiber.

Pusey and Jones (P&J) hardness (indentation) is measured in accordance with ASTM D 531, and refers to the indentation number (standard specimen and conditions).

"Predominantly" means more than 50% of the specified component, by weight, unless otherwise indicated.

Figure 25:
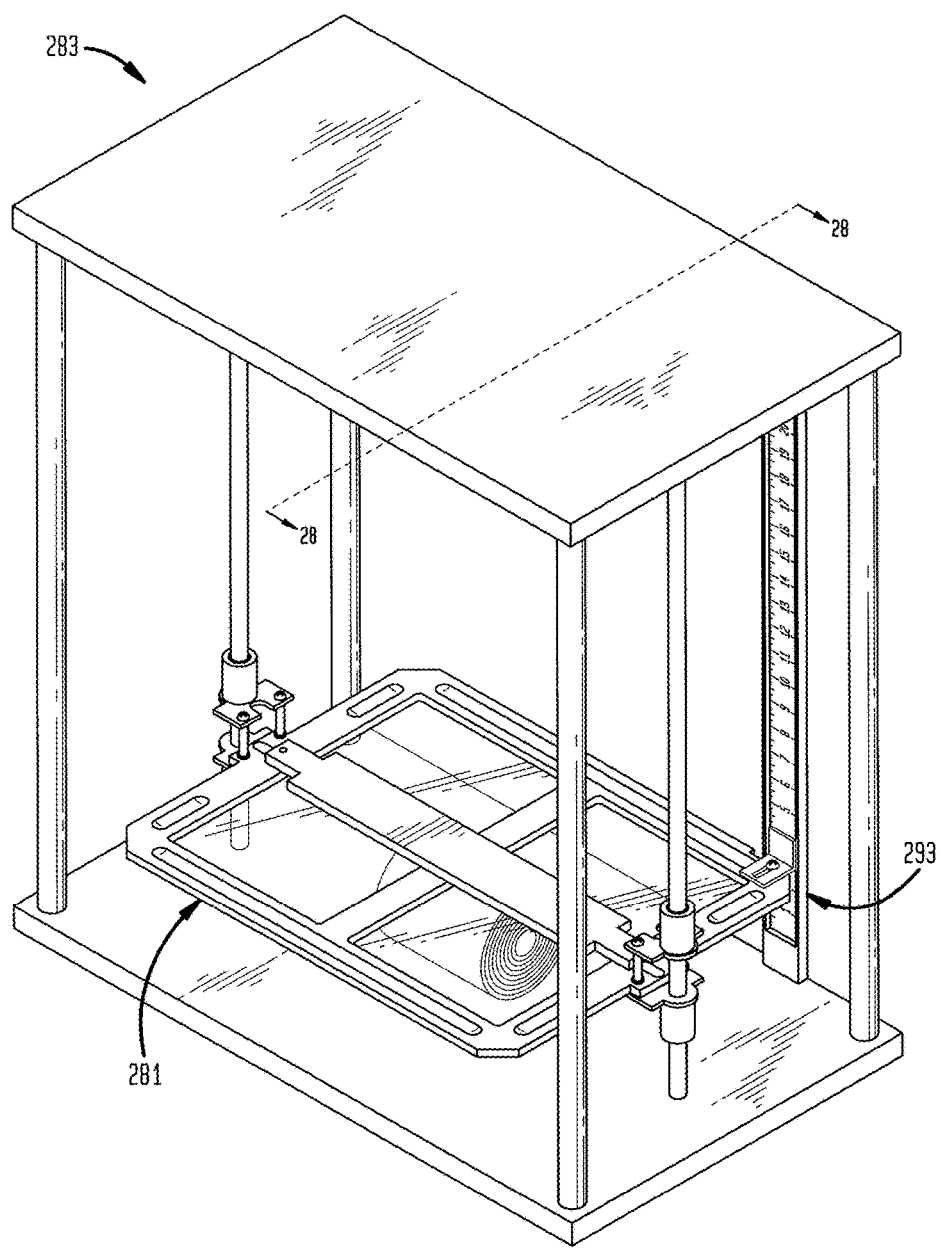
FIGS. 25 and 26 illustrate a fixture used for measuring roll compression of towel and tissue products.
Figure 26:
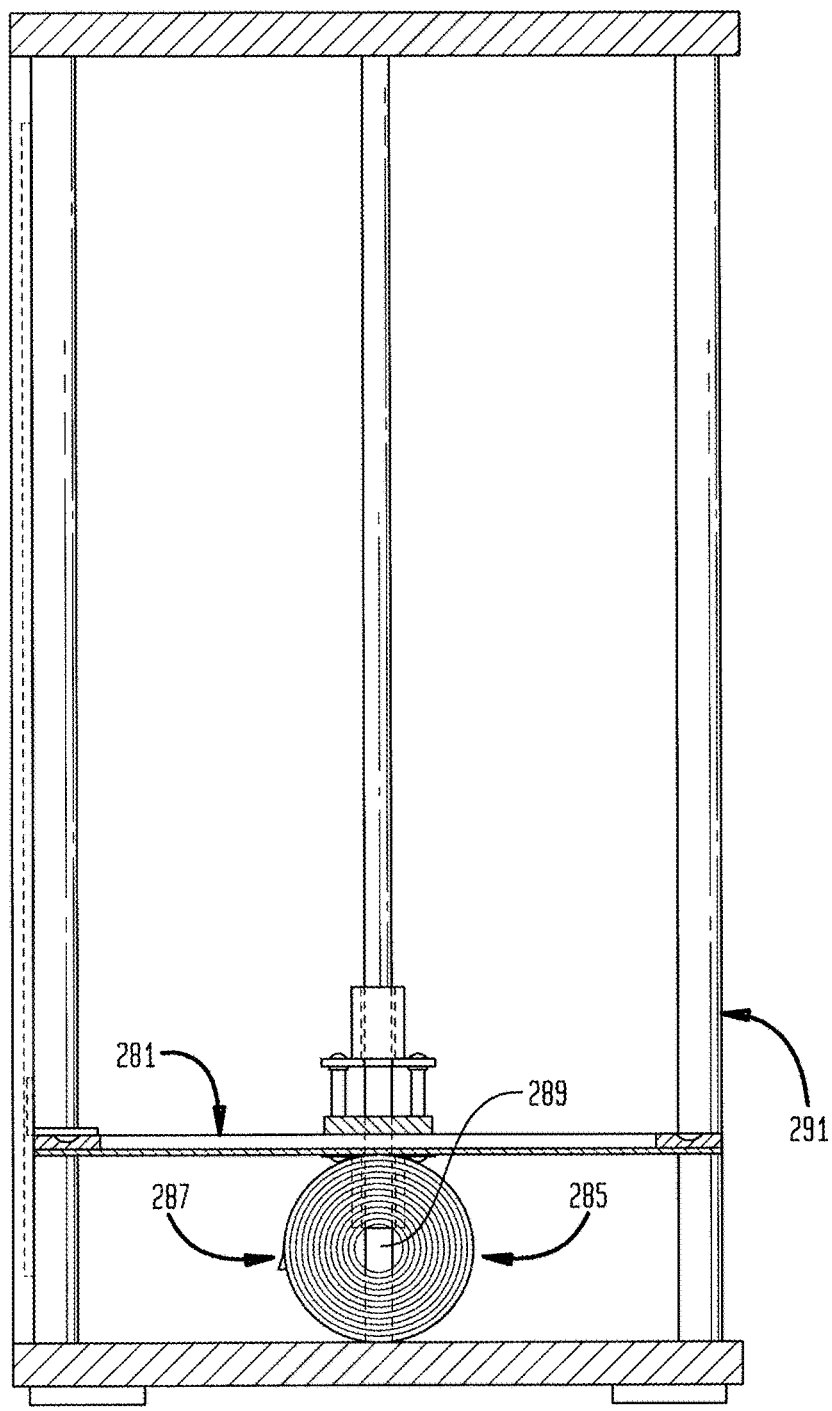
Figure 27D:
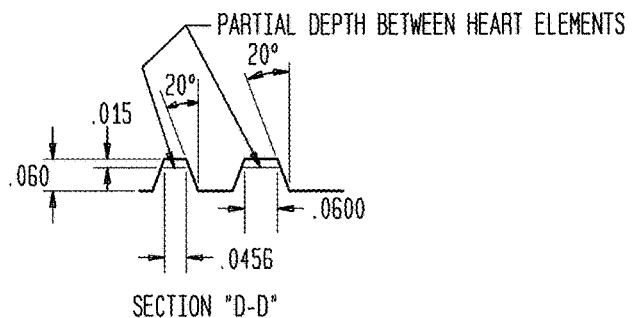
Figure 27E:
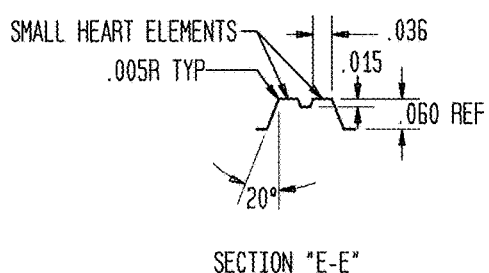
Figure 27F:
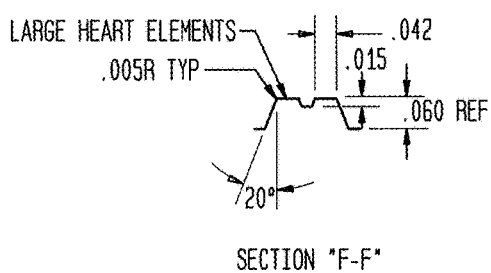
Figure 27H:
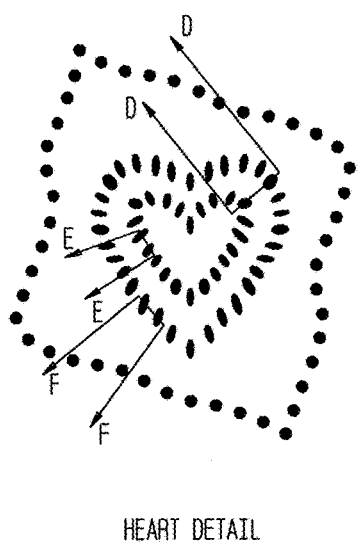
Figure 27T:
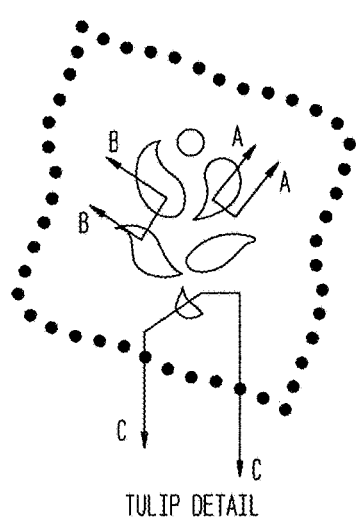

Roll compression is measured by compressing the roll 285 under a 1500 g flat platen 281 of a test apparatus 283 similar to that shown in FIGS. 25 and 26. Sample rolls 285 are conditioned and tested in an atmosphere of 23.0°±1.0° C. (73.4°±1.8° F.). A suitable test apparatus 283 with a movable 1500 g platen 281 (referred to as a height gauge) is available from:

Research Dimensions
1720 Oakridge Road
Neenah, Wis. 54956
920-722-2289
920-725-6874 (FAX).

The test procedure is generally as follows:

(a) Raise the platen 281 and position the roll 285 to be tested on its side, centered under the platen, with the tail seal 287 to the front of the gauge 291 and the core 289 parallel to the back of the gauge 291.

(b) Slowly lower the platen 281 until it rests on the roll 285.

(c) Read the compressed roll diameter or sleeve height from the gauge pointer 293 to the nearest 0.01 inch (0.254 mm).

(d) Raise the platen 281 and remove the roll 285.

(e) Repeat for each roll or sleeve to be tested.

To calculate roll compression (RC) in percent, the following formula is used:

$$RC(\%) = 100 \times \frac{\text{(initial roll diameter} - \text{compressed roll diameter)}}{\text{initial roll diameter}}.$$

Dry tensile strengths (MD and CD), stretch, ratios thereof, modulus, break modulus, stress and strain are measured with a standard Instron test device or other suitable elongation tensile tester, which may be configured in various ways, typically, using 3 inch or 1 inch wide strips of tissue or towel, conditioned in an atmosphere of 23°±1° C. (73.4°±1° F.) at 50% relative humidity for 2 hours. The tensile test is run at a crosshead speed of 2 in/min. Break modulus is expressed in grams/3 inches/% strain or its SI equivalent of g/mm/% strain. % strain is dimensionless and need not be specified. Unless otherwise indicated, values are break values. GM refers to the square root of the product of the MD and CD values for a particular product. Tensile energy absorption (TEA), which is defined as the area under the load/elongation (stress/strain) curve, is also measured during the procedure for measuring tensile strength. Tensile energy absorption is related to the perceived strength of the product in use. Products having a higher TEA may be perceived by users as being stronger than similar products that have lower TEA values, even if the actual tensile strength of the two products are the same. In fact, having a higher tensile energy absorption may allow a product to be perceived as being stronger than one with a lower TEA, even if the tensile strength of the high-TEA product is less than that of the product having the lower TEA. When the term "normalized" is used in connection with a tensile strength, it simply refers to the appropriate tensile strength from which the affect of basis weight has been removed by dividing that tensile strength by the basis weight. In many cases, similar information is provided by the term "breaking length".

Tensile ratios are simply ratios of an MD value determined by way of the foregoing methods divided by the corresponding CD value. Unless otherwise specified, a tensile property is a dry sheet property.

"Upper", "upwardly" and like terminology is used purely for convenience and refers to a position or direction toward the caps of the dome structures, that is, the belt side of the web, which is generally opposite to the Yankee side, unless the context clearly indicates otherwise.

The wet tensile of the tissue of the present invention is measured generally following Technical Association of the Pulp and Paper Industry (TAPPI) Method T 576 pm 7, using a three-inch (76.2 mm) wide strip of tissue that is folded into a loop, clamped in a special fixture termed a Finch Cup, then immersed in water. A suitable Finch cup, 3-in., with base to fit a 3-in. grip, is available from:

High-Tech Manufacturing Services, Inc.
3105-B NE 65th Street
Vancouver, Wash. 98663
360-696-1611
360-696-9887 (FAX).

For fresh basesheet and finished product (aged 30 days or less for towel product, aged 24 hours or less for tissue product) containing wet strength additive, the test specimens are placed in a forced air oven heated to 105° C. (221° F.) for five minutes. No oven aging is needed for other samples. The Finch cup is mounted onto a tensile tester equipped with a 2.0 pound load cell with the flange of the Finch cup clamped by the tester's lower jaw and the ends of tissue loop clamped into the upper jaw of the tensile tester. The sample is immersed in water that has been adjusted to a pH of 7.0±0.1 and the tensile is tested after a 5 second immersion time using a crosshead speed of 2 inches/minute. The results are expressed in g/3 in., dividing the readout by two to account for the loop as appropriate.

A translating transfer surface refers to the surface from which the web is creped onto the creping belt. The translating transfer surface may be the surface of a rotating drum as described hereafter, or may be the surface of a continuous smooth moving belt or another moving fabric that may have surface texture, and so forth. The translating transfer surface needs to support the web and to facilitate the high solids creping, as will be appreciated from the discussion that follows.

Velocity delta means a difference in linear speed.

The void volume and/or void volume ratio, as referred to hereafter, are determined by saturating a sheet with a non-polar POROFIL™ liquid, available from Coulter Electronics Ltd., Beckman Coulter, Inc., 250 S. Kraemer Boulevard, P.O. Box 8000, Brea, Calif. 92822-8000 USA, and measuring the amount of liquid absorbed. The volume of liquid absorbed is equivalent to the void volume within the sheet structure. The % weight increase (PWI) is expressed as grams of liquid absorbed per gram of fiber in the sheet structure, times one hundred (100), as noted hereafter. More specifically, for each single-ply sheet sample to be tested, select 8 sheets and cut out a 1 inch by 1 inch square in the machine direction and 1 inch in the cross machine direction. For multi-ply product samples, each ply is measured as a separate entity. Multiple samples should be separated into individual single plies and 8 sheets from each ply position used for testing. Weigh and record the dry weight of each test specimen to the nearest 0.0001 gram. Place the specimen in a dish containing POROFIL™ liquid having a specific gravity of about 1.93 grams per cubic centimeter, also available from Coulter Electronics Ltd., Beckman Coulter, Inc., Part No. 9902458. After 10 seconds, grasp the specimen at the very edge (1-2 millimeters in) of one corner with tweezers and remove from the liquid. Hold the specimen with that corner uppermost and allow excess liquid to drip for 30 seconds. Lightly dab (less than ½ second contact) the lower corner of the specimen on #4 filter paper (Whatman Ltd., Maidstone, England) in order to remove any excess of the last partial drop. Immediately weigh the specimen, within 10 seconds, recording the weight to the nearest 0.0001 gram. The PWI for each specimen, expressed as grams of POROFIL™ liquid per gram of fiber, is calculated as follows:

$$PWI = \frac{(W_2 - W_1)}{W_1} \times 100$$

wherein
"$W_1$" is the dry weight of the specimen, in grams; and
"$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of fluid) to express the ratio as a percentage, whereas the void volume (gms/gm or g/g) is simply the weight increase ratio; that is, PWI divided by 100.

Water absorbency rate, or WAR, is measured in seconds and is the time that it takes for a sample to absorb a 0.1 gram droplet of water disposed on its surface by way of an automated syringe. The test specimens are preferably conditioned at 23° C.±1° C. (73.4±1.8° F.) at 50% relative humidity for 2 hours. For each sample, 4 test specimens 3"×3" are prepared. Each specimen is placed in a sample holder such that a high intensity lamp is directed toward the specimen. 0.1 ml of water is deposited on the specimen surface and a stop watch is started. When the water is absorbed, as indicated by a lack of further reflection of light from the drop, the stopwatch is stopped and the time recorded to the nearest 0.1 seconds. The procedure is repeated for each specimen and the results averaged for the sample. WAR is measured in accordance with TAPPI method T 432 cm-99.

Dry Lint Test

To quantify the amount of lint removed from towel, tissue and related products when used dry, a Sutherland Rub Tester with 4.0-lb rub block is used. This apparatus is available from Danilee Company, 27223 Starry Mountain Street, San Antonio, Tex. 78260, 830-438-7737; 800-438-7738 (FAX). The 4.0-lb rub block for the Rub Tester has dimensions of 2" by 4" so that the pressure exerted during testing is 0.5 psi.

After the samples to be evaluated are preconditioned at 10 to 35% RH at 22° to 40° C. for 24 hours, then conditioned at 50.0%±2.0% RH and 23.0±1.0° C. for 2 hours, all of the subsequent procedures are performed within the confines of a room maintained at between 48 to 53% RH and a temperature of between 22° C. and 24° C.

Two stacks of four 2.25-in.×4.5-in. test strips with 4.5-in length in the machine direction are cut from the sample with the top (exterior of roll) side up.

Two 2.5-in.×6-in. strips of black felt are cut with the 6-in. length in the machine direction, and the top side labeled with sample ID numbers.

A baseline reading for the felt is determined by taking one L* lightness color reading on the labeled side of each black felt strip used for testing in the middle of what will be the rubbed area using a GretagMacbeth® Ci5 spectrophotometer using the following settings on the spectrophotometer: Large area view; Specular component excluded; UV Source C; 2 degree observer; and Illuminant C. The GretagMacbeth® spectrophotometer Model Ci5 is available from: GretagMacbeth; 617 Little Britain Road, New Windsor, N.Y. 12553; 914-565-7660; 914-565-0390 (FAX); www.gretagmacbeth.com. The "before testing" reading is later compared to the "after testing" reading in the same area of the black felt strip on the same side, so particular care is taken to be sure that comparisons are made only between the same felt strips. "L*" as used in this connection relates to CIE 1976, also known as CIELAB measurement of lightness and should not be confused with Hunter lightness, typically denominated "L". In this connection, the asterisk "*" is not a reference mark directing the reader to some other location in this document, but a portion of the commonly used symbol for CIE 1976 lightness "L*".

To evaluate a specimen, the specimen is taped to the galvanized plate on the Sutherland Rub Tester with the top side up, so that rubbing will be in the machine direction with care being observed to ensure that each specimen is taped in the same rub area each time the test is performed. The first black felt specimen is taped, labeled side out, to the bottom of the 4.0-lb rub block of the Sutherland Rub Tester, the number of strokes on the rub tester is set to four, and the slow speed selected (#2 setting for 4 speed model or #1 setting for 2 speed model), the rub block is placed on the Sutherland Rub Tester carriage arm and the "Start" button pressed to start testing. After the four strokes are completed, the rub block is removed from the tester and the black felt is removed from the bottom of the rub block with the black felt being preserved for L* "after testing" color reading. The specimen is removed from the galvanized plate and discarded.

One L* color reading is taken on the labeled side of each black felt strip, reading the same spot used to obtain the "before testing" value, in the middle of the rubbed area. The "after testing" reading is paired up with the appropriate "before testing" reading to calculate a difference between the readings—"ΔL*".

For each sample, the average, standard deviation, minimum and maximum test results are recorded as measured to the nearest 0.01 L* unit for both the before testing and after testing values. The difference value of the after reading minus the before reading is indicative of the lint removal by the standardized dry rubbing procedure.

Wet Abrasion Lint Test

To evaluate a tissue sample for lint removal by wet abrasion, the sample is first subjected to simulated wet use against a sample of standard black felt with a Crockmeter Rub Tester, modified as described herein. Then, the area in mm$^2$ of the lint left on the felt is measured with an Epson, Perfection 4490 flat bed Scanner and Apogee, SpecScan Software, version 2.3.36.

The Crockmeter Rub available from SDL Atlas, LLC, 3934 Airway Drive, Rock Hill, S.C. 29732; (803) 329-2110. To be used to measure wet lint as described herein, the Crockmeter is modified to accept a 360 gram arm and a 1"×2" foot that exerts a pressure on the specimen of 0.435 psi. The weight of the rub block is 355 g for the weighted arm supported on one end, and 36 g for the rub foot. These weights are exerted on a 1"×2" area, for a pressure of 391 g/12.9 cm$^2$=30.3 g/cm$^2$. In contrast, the method of evaluating wet abrasion in the Bhat et al. and Luu patents referenced herein used a 135 g sled placed on a 2"×3" sample for a pressure of 135 g/38.7 cm$^2$=3.5 g/cm$^2$.

Research Dimensions at 1720 Oakridge Road, Neenah, Wis. 54956, 920-722-2289, will modify Crockmeter Rub Testers to conform hereto Suitable black felt is 3/16-inch thick, part #113308F-24 available from Aetna Felt Corporation, 2401 W. Emaus Avenue, Allentown, Pa. 18103; 800-526-4451.

Figure 20:
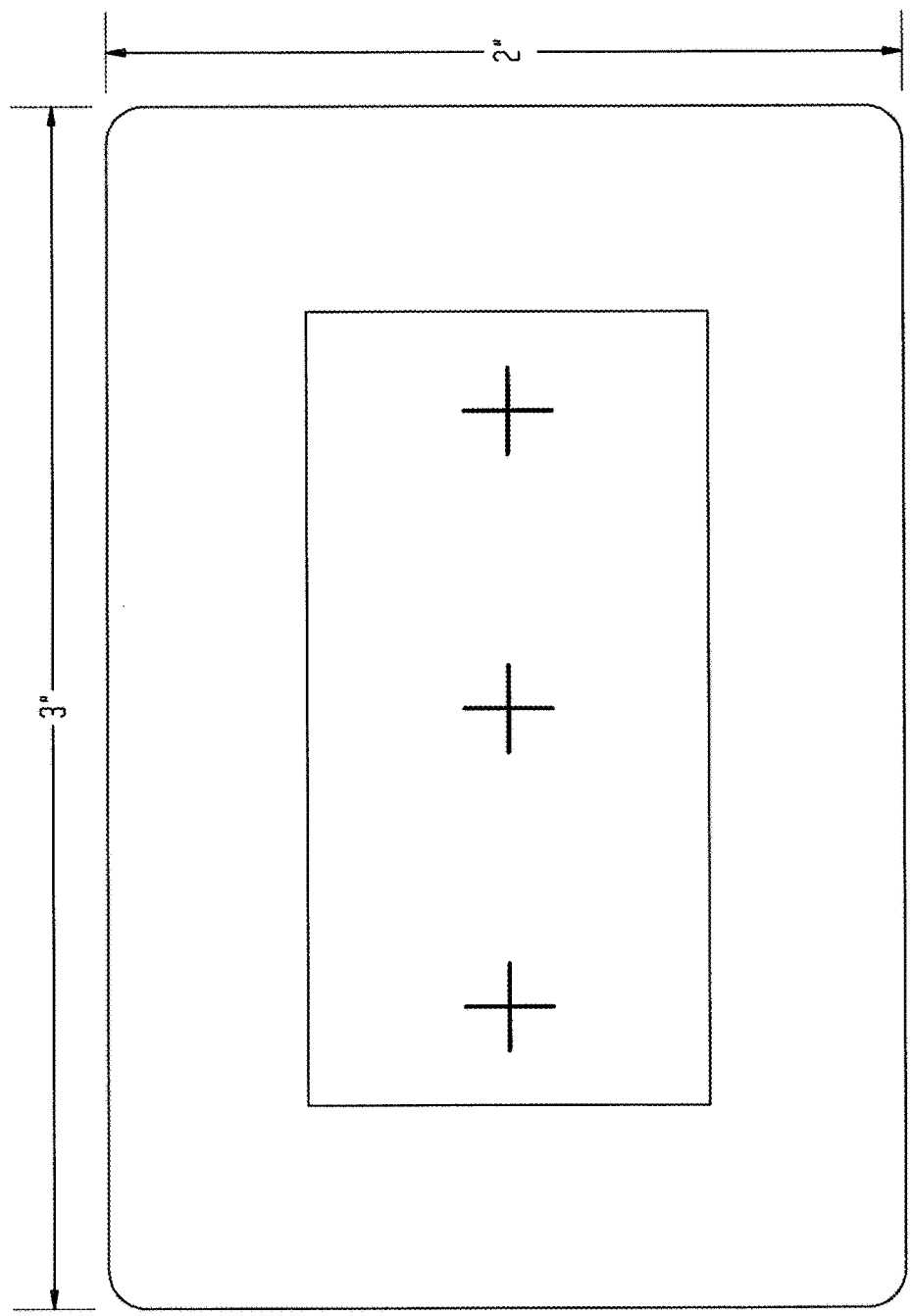
FIG. 20 is a schematic illustration of a glass microscope slide marked for use in the "Wet Abrasion Lint Test" test described herein.

To test a sample, the outer three layers of tissue are removed from the roll. Three sheets of tissue are cut at the perforations and placed in a stack using a paper cutter ensuring that the tissue sheets are placed in the same orientation relative to the direction and the side of the roll. From the stack, samples that are 2-inches by 2.5-inches are cut with the long dimension being the machine direction. Enough samples are cut for 4 replicates. The short (2") side of the tissue is marked with a small dot to indicate the surface of the tissue that was outwardly facing when on the roll. The foot is mounted to the arm of the Crockmeter with the short dimension parallel to the stroke of the Crockmeter and the stroke distance set at 4"±1/8 inch, and the stroke speed is set to strokes per minute. The black felt is cut into 3-inch by 6-inch pieces with the inside surface being marked along the short edge. In this test, the tissue sample to be tested will be rubbed against the inside of the felt starting at the mark. A 12-inch by 12-inch sheet of black acrylic, a 2-inch by 3-inch glass slide marked as shown in FIG. 20, tape, a pipette and a beaker of distilled water are located on any nearby convenient flat surface The Crockmeter is turned on, then turned off, to position the arm at its furthest back position. The spacer is placed under the arm to hold it above the rubbing surface. A clean piece of black felt is taped to the base of the Crockmeter over the rubbing surface with the marked surface oriented upward, with the marked end up adjacent to the beginning point of the stroke of the foot. A sample is taped along one shorter edge to the foot with the top side of the tissue facing up, and the length of the tissue is wrapped around the foot and attached to the arm of the Crockmeter with the taped side and the marked location on the tissue sample facing the operator at the forward portion of the Crockmeter. The type of tape used is not critical. Office tape commonly referred to as cellophane tape or sold under the trademark "Scotch® Tape" is suitable. The spacer is removed from under the arm, and the arm with the attached foot is set down on the black felt with the long dimension of the foot perpendicular to the rub direction, and the foot is fixed in place. The glass microscope slide is placed on the felt forward of the foot and 3 volumes of 200 µL of distilled water each are dispensed from the pipette onto the cross-marks on the glass slide. The sample, foot and arm are gently lifted, the glass slide is placed under the sample and the sample is lowered to allow the water to wet the sample for 5 seconds, after which time the arm is lifted, the glass slide removed and the Crockmeter activated to allow the sample to make three forward strokes on the felt with the arm being lifted manually at the beginning of each return stroke to prevent the sample from contacting the felt during the return strokes. After three forward strokes, the Crockmeter is inactivated and the spacer placed under the arm so that the black felt can be removed without disturbing the abraded lint thereupon. Three minutes after the felt is removed from the rubbing surface, it is scanned in a flat bed scanner using Apogee SpecScan Software with the software being set for "lint" in the "Scanner Settings" window, with "5" being set in the "Process Groups of:" window on the "Defaults panel", the "Resolution" being set at "600 dots/inch", the "Scanner Mode" being set to "256-Grayscale", the "Area Setting" being set to "Special", the "Scan Image" being set to "Reverse Image", the "Upper Limit" window on the "Dirt Histogram" panel being set to ">=5.000" the "Lower Limit" window of that panel being set to "0.013-0.020" and the "X Scale:" window being set to "25"; and the "PPM" window of the "Bad Handsheet" panel set to "2500.0". On the "Printout Settings:" panel, the "Gray-Summary", "Sheet Summary" and "Gray Histogram" boxes are checked, the "Copies" window is set to "1", while the "Dirt Histogram", "Categories" and "XY Location boxes on that panel are unchecked. Both the "Enable Display" and "Enable Zoom" boxes are checked on the Display Mode panel. On the "Scanner Setup" panel, the "White" box is set for "255" while the "Black" box is set for "0", the "Contrast Filter" box is set for "0.000", the upper "Threshold=" box is set for 80.0 [% percent of background plus] while the lower "Threshold=" box is set for "0.0" [grayscale value]. The "Percent of Background, plus offset" box on the "Scanner Setup" panel is checked while the "Manual Threshold Setting" and "Function of StdDev of Background" boxes are unchecked. If desired the "Grade Identification:" and "Reel/Load Number:" boxes may be used to record indicia related to the identification of the samples being tested. On the "Special Area Definition" panel, "Inches" is checked in the "Dimensions:" region while "Rectangular" is checked in the "Shape:" region. In the "Border at top and left:" region, "0.15" [in.] is entered in the "At the left side: (X)" box and "0.625" [in.] is entered in the "At the top: (Y)" box. In the "Area to scan:" regions "2.7" [in.] is entered in the "Width (X)" box and "5.2" [in.] is entered in the "Height (Y)" box. After scanning, the area in mm$^2$ of the abraded lint left on the black felt is output in the "SHEETS" Table in the "Total Area" column under the "Sample Sheet(s)" heading on the "Sheet & Category Summary" screen. This result is sometimes referred to herein as "WALA" for Wet Abraded Lint Area, which is reported in mm$^2$.

In other cases, the fiber removed will be washed off and the solution subjected to testing in an Optest Fiber Quality Analyzer to determine the number of fibers that are removed having a length in excess of 40 µm. The Optest Fiber Quality Analyzer has become a standard in the paper industry for determining fiber length distributions and fiber counts above a certain minimal length, (currently, at about 40 µm), which keeps decreasing as Optest continually upgrades their technique. The Optest Fiber Quality Analyzer is available from:
OpTest Equipment Inc.
900 Tupper SI.—Hawkesbury—ON—K6A 3S3—Canada
Phone: 613-632-5169; Fax: 613-632-3744.

Dispersibility Test

To determine how well bathroom tissue disintegrates in water under controlled agitation using a standard water solution, a sample of tissue is placed in a bottle of specified dimensions in a standardized water solution and subjected to controlled agitation using a standardized shaker that shakes the bottle for a preset number of shakes at 180±5 strokes per minute. One stroke is a complete cycle of back and forth. The bottle is then drained in a fixture adapted to hold the bottle with its centerline perpendicular. See FIGS. 1 and 2. More specifically, the test is conducted as follows.

The standardized bottle shaker 50 and bottle guide fixture 52 are available from Research Dimensions, 1720 Oakridge Road, Neenah, Wis. 54956, (920) 722-2289; FAX (920) 725-6874. A small mouth ($^{11}/_{16}$-inch diameter orifice) plastic bottle 54 with cap, 250 ml, is catalog number 02-924-6D, available from Fisher Scientific Company. The Standard Water Solution, catalog number NC9664362, is available from Fisher Scientific Company, 800-766-7000.

Remove and discard the first three layers of tissue from a roll of tissue. (The tissue sample to be tested may be taken from anywhere in the roll except for the three outer wraps and the last 20 sheets from the core.) If the tissue samples and/or base sheet samples are less than 24 hours old, they are to be oven cured for 5 minutes at 105° C.

For testing of a finished product: six 3-sheet strips are cut from the roll. If the product being tested is a multi-ply product, the plies are not separated from each other, but are tested still plied together.

For testing of a base sheet, specimens are to be cut equivalent to the length and width of the finished product for which they are intended. Three specimens are cut for one-ply product, six specimens are cut for two-ply product, and nine specimens are cut for three-ply product.

180±5 ml of standard water at 23° C. (73° F.) is transferred to the bottle 54.

Shaker 50 is set for an appropriate number of strokes. In the case of finished product testing, the three-sheet strip of tissue is folded in half, rolled up and inserted into the plastic bottle 54, which is then capped. In the case of a base sheet, the specimen is folded in half and one strip of tissue is rolled up when the intended finished product is 1-ply, two strips of tissue for 2-ply finished product, and 3 strips of tissue for 3-ply finished product. The roll is inserted into the plastic bottle 54, which is then capped.

Bottle 54 is placed in shaker 50 (FIG. 1) with bottom 51 toward the drive arm 58, and motor 60 started.

After shaker 50 has shaken bottle 54 for the set number of strokes, the contents are immediately checked for disintegration by inverting bottle 54 and placing it into bottle guide fixture 52 (FIG. 2) in one quick motion to see if the contents will pour out into a beaker. In order for the specimen to pass the test for that number of shakes, the entire contents of bottle 54 must empty within eight seconds without shaking or squeezing bottle 54. The test is replicated and a "pass" is recorded only if both specimens pass.

Regenerated Cellulose Microfiber

In accordance with the invention, regenerated cellulose fiber is prepared from a cellulosic dope comprising cellulose dissolved in a solvent comprising tertiary amine N-oxides or ionic liquids. The solvent composition for dissolving cellulose and preparing underivatized cellulose dopes suitably includes tertiary amine oxides such as N-methylmorpholine-N-oxide (NMMO) and similar compounds enumerated in U.S. Pat. No. 4,246,221 to McCorsley, the disclosure of which is incorporated herein by reference. Cellulose dopes may contain non-solvents for cellulose, such as water, alkanols or other solvents, as will be appreciated from the discussion that follows.

Suitable cellulosic dopes are enumerated in Table 1, below.

TABLE 1

| EXAMPLES OF TERTIARY AMINE N-OXIDE SOLVENTS | | |
|---|---|---|
| Tertiary Amine N-oxide | % water | % cellulose |
| N-methylmorpholine N-oxide | up to 22 | up to 38 |
| N,N-dimethyl-ethanol-amine N-oxide | up to 12.5 | up to 31 |
| N,N-dimethylcyclohexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amide N-oxide | 5-10 | 2-7.5 |
| N-methylpiperidine N-oxide | up to 17.5 | 5-17.5 |
| N,N-dimethylbenzylamine N-oxide | 5.5-17 | 1-20 |

See, also U.S. Pat. No. 3,508,941 to Johnson, the disclosure of which is incorporated herein by reference.

Details with respect to preparation of cellulosic dopes including cellulose dissolved in suitable ionic liquids and cellulose regeneration therefrom are found in U.S. patent application Ser. No. 10/256,521, U.S. Patent Application Publication No. 2003/0157351 of Swatloski et al., now U.S. Pat. No. 6,824,599, entitled "Dissolution and Processing of Cellulose Using Ionic Liquids", the disclosure of which is incorporated herein by reference. Here, again, suitable levels of non-solvents for cellulose may be included. There is generally described in this patent application a process for dissolving cellulose in an ionic liquid without derivatization and regenerating the cellulose in a range of structural forms. It is reported that the cellulose solubility and the solution properties can be controlled by the selection of ionic liquid constituents with small cations and halide or pseudohalide anions favoring solution. Preferred ionic liquids for dissolving cellulose include those with cyclic cations, such as the following cations: imidazolium, pyridinum, pyridazinium, pyrimidinium, pyrazinium, pyrazolium, oxazolium, 1,2,3-triazolium, 1,2,4-triazolium, thiazolium, piperidinium, pyrrolidinium, quinolinium, and isoquinolinium.

Processing techniques for ionic liquids/cellulose dopes are also discussed in U.S. Pat. No. 6,808,557 to Holbrey et al., entitled "Cellulose Matrix Encapsulation and Method", the disclosure of which is incorporated herein by reference. Note also, U.S. Patent Application Publication No. 2005/0288484, now U.S. Pat. No. 7,888,412, of Holbrey et al., entitled "Polymer Dissolution and Blend Formation in Ionic Liquids", as well as U.S. Patent Application Publication No. 2004/0038031, now U.S. Pat. No. 6,808,557, also of Holbrey et al., entitled "Cellulose Matrix Encapsulation and Method", the disclosures of which are incorporated herein by reference. With respect to ionic fluids, in general, the following documents provide further detail: U.S. Patent Application Publication No. 2006/0241287, now U.S. Pat. No. 7,763,715, of Hecht et al., entitled "Extracting Biopolymers From a Biomass Using Ionic Liquids"; U.S. Patent Application Publication No. 2006/0240727, of Price et al., entitled "Ionic Liquid Based Products and Method of Using The Same"; U.S. Patent Application Publication No. 2006/0240728, of Price et al., entitled "Ionic Liquid Based Products and Method of Using the Same"; U.S. Patent Application Publication No. 2006/0090271, of Price et al., entitled "Processes For Modifying Textiles Using Ionic Liquids"; and Patent Application Publication No. 2006/0207722, now U.S. Pat. No. 8,318,859, of Amano et al., entitled "Pressure Sensitive Adhesive Compositions, Pressure Sensitive Adhesive Sheets and Surface Protecting Films," the disclosures of which are incorporated herein by reference. Some ionic liquids and quasi-ionic liquids that may be suitable are disclosed by Imperato et al., Chem. Commun. 2005, 1170-1172, the disclosure of which is incorporated herein by reference.

"Ionic liquid" refers to a molten composition that includes an ionic compound that is preferably a stable liquid at temperatures of less than 100° C. at ambient pressure. Typically, such liquids have a very low vapor pressure at 100° C., less than 75 mBar or so and, preferably, less than 50 mBar or less than 25 mBar at 100° C. Most suitable liquids will have a vapor pressure of less than 10 mBar at 100° C. and often, the vapor pressure is so low that it is negligible and is not easily measurable, since it is less than 1 mBar at 100° C.

Suitable commercially available ionic liquids are Basionic™ ionic liquid products available from BASF (Florham Park, N.J.).

Cellulose dopes including ionic liquids having dissolved therein about 5% by weight underivatized cellulose are commercially available from Sigma-Aldrich Corp., St. Louis, Mo. (Aldrich). These compositions utilize alkylmethylimidazolium acetate as the solvent. It has been found that chorine-based ionic liquids are not particularly suitable for dissolving cellulose.

After the cellulosic dope is prepared, it is spun into fiber, fibrillated and incorporated into absorbent sheet as described later.

A synthetic cellulose, such as lyocell, is split into micro- and nano-fibers and added to conventional wood pulp. The fiber may be fibrillated in an unloaded disk refiner, for example, or any other suitable technique including using a Pulmac-Fiber (PFI) mill. Preferably, relatively short fiber is used and the consistency kept low during fibrillation. The beneficial features of fibrillated lyocell include, for example, biodegradability, hydrogen bonding, dispersibility, repulpability, and smaller microfibers than obtainable with meltspun fibers.

Fibrillated lyocell or its equivalent has advantages over splittable meltspun fibers. Synthetic microdenier fibers come in a variety of forms. For example, a 3 denier nylon/PET fiber in a so-called pie wedge configuration can be split into 16 or 32 segments, typically, in a hydroentangling process. Each segment of a 16-segment fiber would have a coarseness of about 2 mg/100 m versus eucalyptus pulp at about 7 mg/100 m. Unfortunately, a number of deficiencies have been identified with this approach for conventional wet laid applications. Dispersibility is less than optimal. Melt spun fibers must be split before sheet formation, and an efficient method is lacking. Most available polymers for these fibers are not biodegradable. The coarseness is lower than that of wood pulp, but still high enough that they must be used in substantial amounts and form a costly part of the furnish. Finally, the lack of hydrogen bonding requires other methods of retaining the fibers in the sheet.

Fibrillated lyocell has fibrils that can be as small as 0.1 to 0.25 microns (μm) in diameter, translating to a coarseness of 0.0013 to 0.0079 mg/100 m. Assuming these fibrils are available as individual strands—separate from the parent fiber—the furnish fiber population can be dramatically increased at various addition rates. Even fibrils not separated from the parent fiber may provide benefit. It is greatly preferred, however, that the fibrils be independent of the parent fiber from which they are split off. Dispersibility, repulpability, hydrogen bonding, and biodegradability remain product attributes, since the fibrils are cellulose.

Fibrils from lyocell fiber have important distinctions from wood pulp fibrils. The most important distinction is the length of the lyocell fibrils. Wood pulp fibrils are only perhaps microns long, and, therefore, act in the immediate area of a fiber-fiber bond. Wood pulp fibrillation from refining leads to stronger, denser sheets. Lyocell fibrils, however, are potentially as long as the parent fibers. These fibrils can act as independent fibers and improve the bulk while maintaining or improving strength. Southern pine and mixed southern hardwood (MSHW) are two examples of fibers that are disadvantaged relative to premium pulps with respect to softness. The term "premium pulps" used herein refers to northern softwoods and eucalyptus pulps commonly used in the tissue industry for producing the softest bath, facial, and towel grades. Southern pine is coarser than northern softwood kraft, and mixed southern hardwood is both coarser and higher in fines than market eucalyptus. The lower coarseness and lower fines content of premium market pulp leads to a higher fiber population, expressed as fibers per gram (N or $N_{i>0.2}$) in Table 3. The coarseness and length values in Table 2 were obtained with an OpTest Fiber Quality Analyzer. Definitions are as follows:

$$L_n = \frac{\sum_{all\ fibers} n_i L_i}{\sum_{all\ fibers} n_i} \quad L_{n,i>0.2} = \frac{\sum_{i>0.2} n_i L_i}{\sum_{i>0.2} n_i} \quad C = 10^5 \times \frac{sampleweight}{\sum_{all\ fibers} n_i L_i}$$

$$N = \frac{100}{CL} [=] million fibers/gram$$

Northern bleached softwood kraft (NBSK) and eucalyptus have more fibers per gram than do southern pine and hardwood. Lower coarseness leads to higher fiber populations and smoother sheets.

TABLE 2

Fiber Properties

| Sample | Type | C, mg/100 m | Fines, % | $L_n$, mm. | N, MM/g | $L_{n,i>0.2\ mm}$ | $N_{i>0.2\ mm}$ MM/g |
|---|---|---|---|---|---|---|---|
| Southern HW | Pulp | 10.1 | 21 | 0.28 | 35 | 0.91 | 11 |
| Southern HW - low | Pulp | 10.1 | 7 | 0.54 | 18 | 0.94 | 11 |
| Aracruz Eucalyptus | Pulp | 6.9 | 5 | 0.50 | 29 | 0.72 | 20 |
| Southern SW | Pulp | 18.7 | 9 | 0.60 | 9 | 1.57 | 3 |
| Northern SW | Pulp | 14.2 | 3 | 1.24 | 6 | 1.74 | 4 |
| Southern (30 SW/70 | Base | 11.0 | 18 | 0.31 | 29 | 0.93 | 10 |
| 30 Southern SW/70 | Base | 8.3 | 7 | 0.47 | 26 | 0.77 | 16 |

For comparison, the "parent" or "stock" fibers of unfibrillated lyocell have a coarseness of 16.6 mg/100 m before fibrillation and a diameter of about 11 to about 12 µm.

The fibrils of fibrillated lyocell have a coarseness on the order of 0.001 to 0.008 mg/100 m. Thus, the fiber population can be dramatically increased at relatively low addition rates. Fiber length of the parent fiber is selectable, and fiber length of the fibrils can depend on the starting length and the degree of cutting during the fibrillation process.

The dimensions of the fibers passing the 200 mesh screen are on the order of 0.2 micron by 100 micron long. Using these dimensions, one calculates a fiber population of 200 billion fibers per gram. For perspective, southern pine might be three million fibers per gram and eucalyptus might be twenty million fibers per gram. (See Table 2.) It appears that these fibers are the fibrils that are broken away from the original unrefined fibers. Different fiber shapes with lyocell intended to readily fibrillate could result in 0.2 micron diameter fibers that are perhaps 1000 microns or more long instead of 100. As noted above, fibrillated fibers of regenerated cellulose may be made by producing "stock" fibers having a diameter of 10-12 microns or so followed by fibrillating the parent fibers. Alternatively, fibrillated lyocell microfibers have recently become available from Engineered Fibers Technology (Shelton, Conn.) having suitable properties. Particularly preferred materials are more than 40% fiber that is finer than 14 mesh and exhibit a very low coarseness (low freeness). For ready reference, mesh sizes appear in Table 3, below. The current limitations on minimum length detectable by the OpTest make it difficult to precisely ascertain the fiber length distribution of the very short fibrils. It does appear, however, that these are quite important in providing the improved sheet properties of the tissues of the present invention.

TABLE 3

Mesh Size

| Sieve Mesh # | Inches | Microns |
|---|---|---|
| 14 | .0555 | 1400 |
| 28 | .028 | 700 |
| 60 | .0098 | 250 |
| 100 | .0059 | 150 |
| 200 | .0029 | 74 |

Details as to fractionation using the Bauer-McNett Classifier appear in Gooding et al., "Fractionation in a Bauer-McNett Classifier", *Journal of Pulp and Paper Science*; Vol. 27, No. 12, December 2001, the disclosure of which is incorporated herein by reference.

In connection with the present invention, an absorbent paper web is made by dispersing papermaking fibers into an aqueous furnish (slurry) and depositing the aqueous furnish onto the forming wire of a papermaking machine. Any suitable forming scheme might be used. For example, an extensive, but non-exhaustive, list in addition to Fourdrinier formers, includes a crescent former, a C-wrap twin wire former, an S-wrap twin wire former, or a suction breast roll former. The forming fabric can be any suitable foraminous member including single layer fabrics, double layer fabrics, triple layer fabrics, photopolymer fabrics, and the like. Non-exhaustive background art in the forming fabric area includes U.S. Pat. Nos. 4,157,276; 4,605,585; 4,161,195; 3,545,705; 3,549,742; 3,858,623; 4,041,989; 4,071,050; 4,112,982; 4,149,571; 4,182,381; 4,184,519; 4,314,589; 4,359,069; 4,376,455; 4,379,735; 4,453,573; 4,564,052; 4,592,395; 4,611,639; 4,640,741; 4,709,732; 4,759,391; 4,759,976; 4,942,077; 4,967,085; 4,998,568; 5,016,678; 5,054,525; 5,066,532; 5,098,519; 5,103,874; 5,114,777; 5,167,261; 5,199,261; 5,199,467; 5,211,815; 5,219,004; 5,245,025; 5,277,761; 5,328,565; and 5,379,808, all of which are incorporated herein by reference in their entireties. One forming fabric particularly useful with the present invention is Voith Fabrics Forming Fabric 2164 made by Voith Fabrics Corporation, Shreveport, La.

Foam-forming of the aqueous furnish on a forming wire or fabric may be employed as a means to form sheets comprising fibers that are somewhat difficult to disperse in conventional aqueous furnishes. Foam forming may be especially advantageous if formation issues are encountered. Foam-forming techniques are disclosed in U.S. Pat. Nos. 6,500,302; 6,413,368; 4,543,156 and Canadian Patent No. 2,053,505, the disclosures of which are incorporated herein by reference. The foamed fiber furnish is made up from an aqueous slurry of fibers mixed with a foamed liquid carrier just prior to its introduction to the headbox. The pulp slurry supplied to the system has a consistency in the range of from about 0.5 to about 7 weight % fibers, preferably, in the range of from about 2.5 to about 4.5 weight %. The pulp slurry is added to a foamed liquid comprising water, air and surfactant containing 50 to 80% air by volume, forming a foamed fiber furnish having a consistency in the range of from about 0.1 to about 3 weight % fiber by simple mixing from natural turbulence and mixing inherent in the process elements. The addition of the pulp as a low consistency slurry results in excess foamed liquid recovered from the forming wires. The excess foamed liquid is discharged from the system and may be used elsewhere or treated for recovery of surfactant therefrom.

The furnish will almost always contain chemical additives to alter the physical properties of the paper produced. These chemistries are well understood by the skilled artisan and may be used in any known combination. Such additives may be surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof, the chemicals optionally comprising polyols, starches, PPG esters, PEG esters, phospholipids, surfactants, polyamines, HMCP (Hydrophobically Modified Cationic Polymers), HMAP (Hydrophobically Modified Anionic Polymers), or the like.

The pulp can be mixed with strength adjusting agents such as wet strength agents, dry strength agents, debonders/softeners, and so forth. Suitable wet strength agents are known to the skilled artisan. A comprehensive, but non-exhaustive, list of useful strength aids includes urea-formaldehyde resins, melamine formaldehyde resins, glyoxylated polyacrylamide resins, polyamide-epichlorohydrin resins, and the like. Thermosetting polyacrylamides are produced by reacting acrylamide with diallyl dimethyl ammonium chloride (DADMAC) to produce a cationic polyacrylamide copolymer that is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entireties. Resins of this type are commercially available under the trade name of PAREZ 631NC by Bayer Corporation (Pittsburgh, Pa.). Different mole ratios of acrylamide/-DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin wet strength resins, an example of which is sold under the trade names Kymene 557LX and Kymene 557H by Hercules Incorporated of Wilmington, Del., and Amres® from Georgia-Pacific Resins, Inc. These resins and the process for making the resins are described in U.S. Pat. No. 3,700,623 and U.S. Pat. No. 3,772,076, each of which is incorporated herein by reference in its entirety. An extensive description of polymeric epihalohydrin resins is given in "Chapter 2: Alkaline-Curing Polymeric Amine-Epichlorohydrin" by Espy in *Wet Strength Resins and Their Application* (L. Chan, Editor, 1994), herein incorporated by reference in its entirety. A reasonably comprehensive list of wet strength resins is described by Westfelt in *Cellulose Chemistry and Technology*, volume 13, page 813, 1979, which is also incorporated herein by reference.

Suitable temporary wet strength agents for use in the practice of the present invention include aliphatic and aromatic aldehydes, including glyoxal, malonic dialdehyde, succinic dialdehyde, glutaraldehyde and dialdehyde starches, as well as substituted or reacted starches, disaccharides, polysaccharides, chitosan, or other reacted polymeric reaction products of monomers or polymers having aldehyde groups, and optionally, nitrogen groups. Representative nitrogen containing polymers, which can suitably be reacted with the aldehyde containing monomers or polymers, includes vinyl-amides, acrylamides and related nitrogen containing polymers. These polymers impart a positive charge to the aldehyde containing reaction product. In addition, other commercially available temporary wet strength agents, such as, PAREZ FJ98, a low molecular weight slightly cationic glyoxalated polyacrylamide manufactured by Kemira (Atlanta, Ga.), can be used, along with those disclosed, for example, in U.S. Pat. No. 4,605,702.

The temporary wet strength resin may be any one of a variety of water-soluble organic polymers comprising aldehydic units and cationic units used to increase dry and wet tensile strength of a paper product. Such resins are described in U.S. Pat. Nos. 4,675,394; 5,240,562; 5,138,002; 5,085,736; 4,981,557; 5,008,344; 4,603,176; 4,983,748; 4,866,151; 4,804,769 and 5,217,576, the disclosures of which are incorporated herein in their entireties. Modified starches sold under the trademarks CO-BOND® 1000 and CO-BOND® 1000 Plus, by National Starch and Chemical Company of Bridgewater, N.J., may be used. Prior to use, the cationic aldehydic water soluble polymer can be prepared by preheating an aqueous slurry of approximately 5% solids, maintained at a temperature of approximately 240° F. and a pH of about 2.7 for approximately 3.5 minutes. Finally, the slurry can be quenched and diluted by adding water to produce a mixture of approximately 1.0% solids at less than about 130° F.

Other temporary wet strength agents, also available from National Starch and Chemical Company are sold under the trademarks CO-BOND® 1600 and CO-BOND® 2300. These starches are supplied as aqueous colloidal dispersions and do not require preheating prior to use.

To the extent that dry strength agents are added, suitable dry strength agents include starch, guar gum, polyacrylamides, carboxymethyl cellulose, and the like. Of particular utility is carboxymethyl cellulose, an example of which is sold under the trade name Hercules® CMC, by Hercules Incorporated of Wilmington, Del.

Suitable debonders are likewise known to the skilled artisan. Debonders or softeners may also be incorporated into the pulp or sprayed upon the web after its formation. The present invention may also be used with softener materials including, but not limited to, the class of amido amine salts derived from partially neutralized amines. Such materials are disclosed in U.S. Pat. No. 4,720,383. Evans, *Chemistry and Industry*, 5 Jul. 1969, pages 893-903; Egan, *J. Am. Oil Chemist's Soc.*, Vol. 55 (1978), pages 118-121; and Trivedi et al., *J. Am. Oil Chemist's Soc.*, June 1981, pages 754-756, incorporated by reference in their entireties, indicate that softeners are often available commercially only as complex mixtures rather than as single compounds. While the following discussion will focus on the predominant species, it should be understood that commercially available mixtures would generally be used in practice.

Hercules® TQ 218 or equivalent is a suitable softener material, which may be derived by alkylating a condensation product of oleic acid and diethylenetriamine. Synthesis conditions using a deficiency of alkylation agent (e.g., diethyl sulfate) and only one alkylating step, followed by pH adjustment to protonate the non-ethylated species, result in a mixture consisting of cationic ethylated and cationic non-ethylated species. A minor proportion (e.g., about 10%) of the resulting amido amine cyclize to imidazoline compounds. Since only the imidazoline portions of these materials are quaternary ammonium compounds, the compositions as a whole are pH-sensitive. Therefore, in the practice of the present invention with this class of chemicals, the pH in the head box should be approximately 6 to 8, more preferably, from about 6 to about 7 and, most preferably, from about 6.5 to about 7.

Quaternary ammonium compounds, such as dialkyl dimethyl quaternary ammonium salts, are also suitable, particularly, when the alkyl groups contain from about 10 to 24 carbon atoms. These compounds have the advantage of being relatively insensitive to pH.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entireties. Biodegradable ester quats are suitable. These softeners are biodegradable by virtue of hydrolyzable ester linkages and are usually made by esterifying ethanol amines (i.e., di- and tri-ethanolamines) with a fatty acid followed by quaternization with dimethyl sulfate, or, more popularly, because of safety, diethyl sulfate. A methylated example of such an ester quat has the following structural formula:

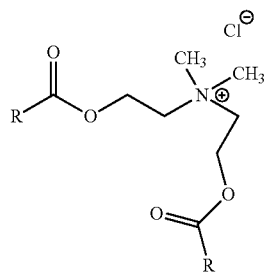

wherein R can conveniently be either an oleyl group, $CH_2(CH_2)_6CH=CH(CH_2)_7CH_3$, or an erucyl group, $CH_2(CH_2)_{10}CH=CH(CH_2)_7CH_3$, as these can be derived from oleic and erucic acids. In some embodiments, a particularly preferred debonder composition includes a quaternary amine component as well as a nonionic surfactant.

The nascent web may be compactively dewatered on a papermaking felt. Any suitable felt may be used. For example, felts can have double-layer base weaves, triple-layer base weaves, or laminated base weaves. Preferred felts are those having a laminated base weave design. A wet-press-felt that may be particularly useful with the present invention is Vector 3 made by Voith Fabric (Appleton, Wis.). Background art in the press felt area includes U.S. Pat. Nos. 5,657,797; 5,368,696; 4,973,512; 5,023,132; 5,225,269; 5,182,164; 5,372,876; and 5,618,612. A differential pressing felt as is disclosed in U.S. Pat. No. 4,533,437 to Curran et al. may likewise be utilized.

Preferred Embodiments

Figure 29:
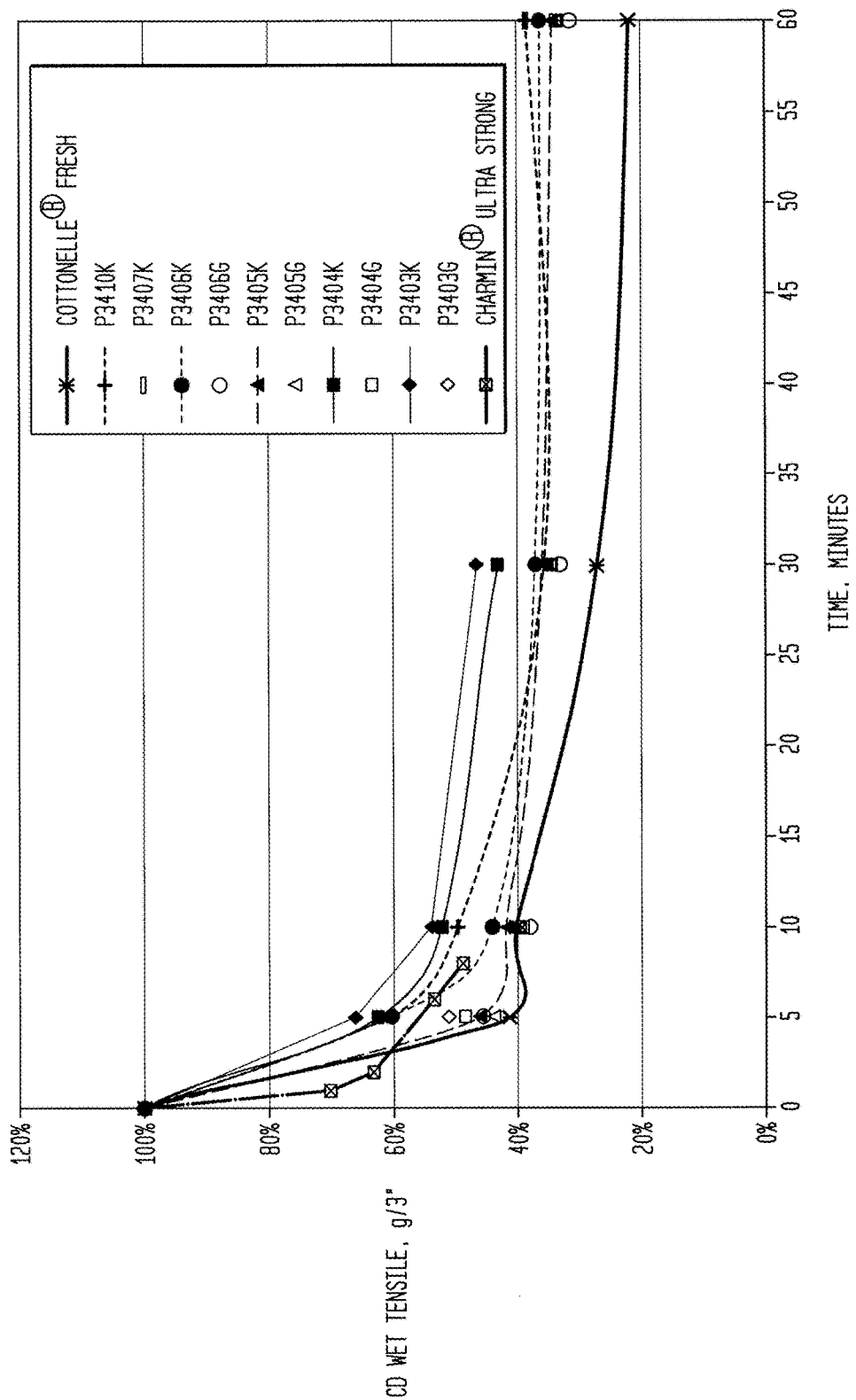
FIG. 29 illustrates the decay of CD wet tensile of various products evaluated herein.

The products of this invention are advantageously produced in accordance with the teachings of U.S. Patent Application Publication No. 2010/0186913, now U.S. Pat. No. 8,293,072, "Belt-Creped, Variable Local Basis Weight Absorbent Sheet Prepared With Perforated Polymeric Belt", wherein, after dewatering, a wet-laid, compactively dewatered web is belt creped at a consistency of from 30-60% as described therein. For purposes of this invention, the creping belt employed is a perforated polymer belt of the class shown in FIGS. 3, 10 and 11. Other suitable belts are described in U.S. Patent Application Publication No. 2010/0186913, now U.S. Pat. No. 8,293,072. Belts having a staggered interpenetrating array of perforations as shown in FIGS. 29G and 41 of U.S. Patent Application Publication No. 2010/0186913 are particularly preferred.

Figure 3:
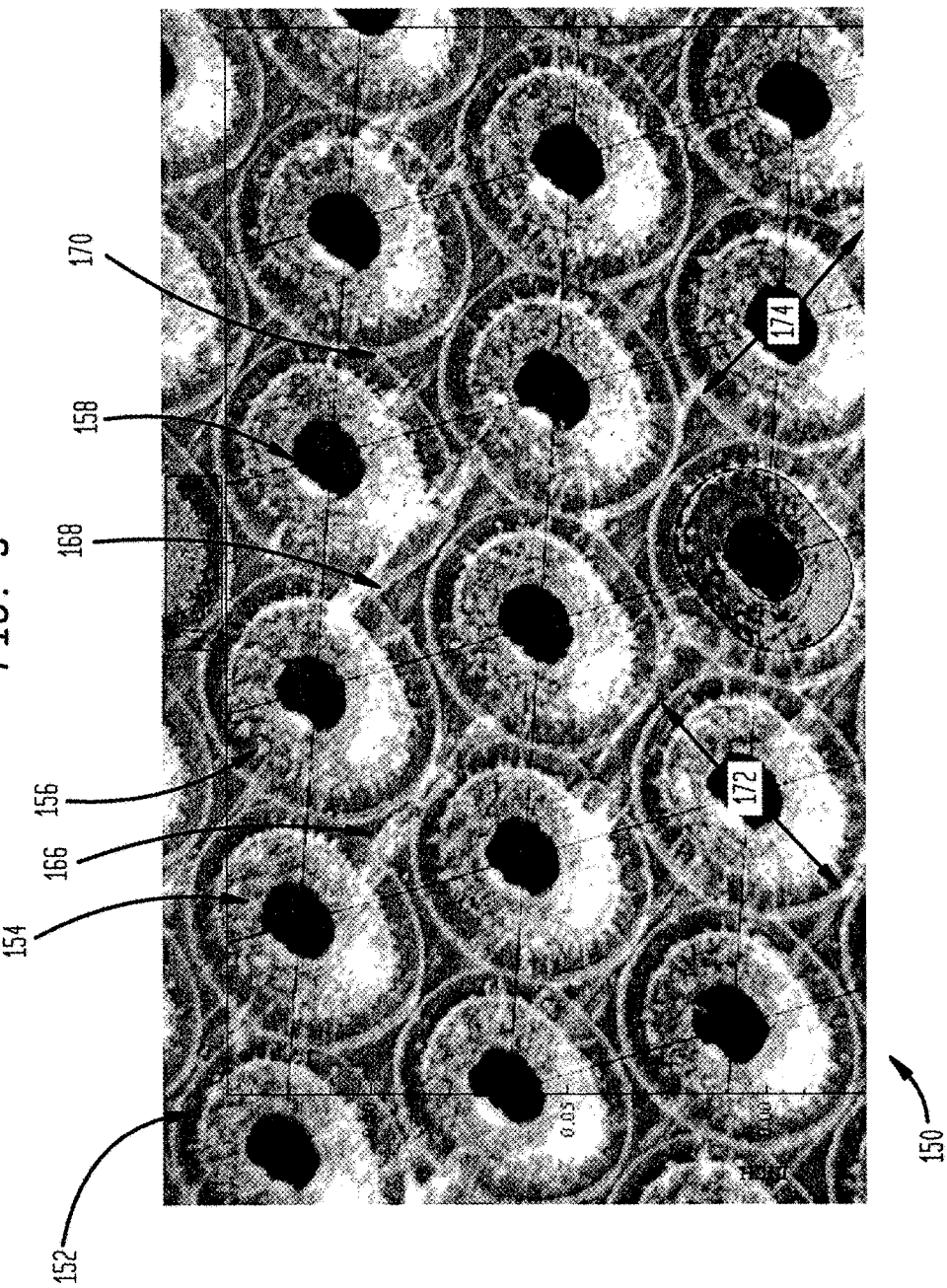
FIG. 3 is photomicrograph of a perforated polymeric belt suitable for the practice of the present invention.

FIG. 3 is a plan view photograph of a portion of a first polymer belt 150 having an upper surface 152 that is generally planar and a plurality of tapered perforations 154, 156 and 158. The belt has a thickness of about 0.2 mm to 1.5 mm. Perforations 154, 156 and 158 may be surrounded by lips as shown in U.S. Patent Application Publication No. 2010/0186913, now U.S. Pat. No. 8,293,072, FIGS. 4 through 9, but this is not required. The perforations on the upper surface are separated by a plurality of flat portions or lands 166, 168 and 170 therebetween that separate the perforations. In the embodiment shown in FIG. 3, each of the upper portions of the perforations 154, 156 and 158 (sheet contacting side) has an open area of about 1500 square mils or so, and are oval in shape with a length of about 50 mils mm along a longer axis 172 and a width of about 36 mils or so along a shorter axis 174 of the perforations 154, 156 and 158, while those on the lower surface (roll contacting side) have an open area of approximately 300 square mils with a length of about 22 mils and a width of about 15 mils. It is greatly preferred that the perforations form a staggered interpenetrating array to provide flexibility to belt 150, to accommodate the varying lengths of the fabric that run across the width of the paper machine. The belt shown in FIG. 3 has about 321 perforations per square inch and an open area of approximately 50% on the sheet contact side and about 10% on the roll contact side of the belt. It is not necessary that the perforations be oval shaped.

Figure 4:
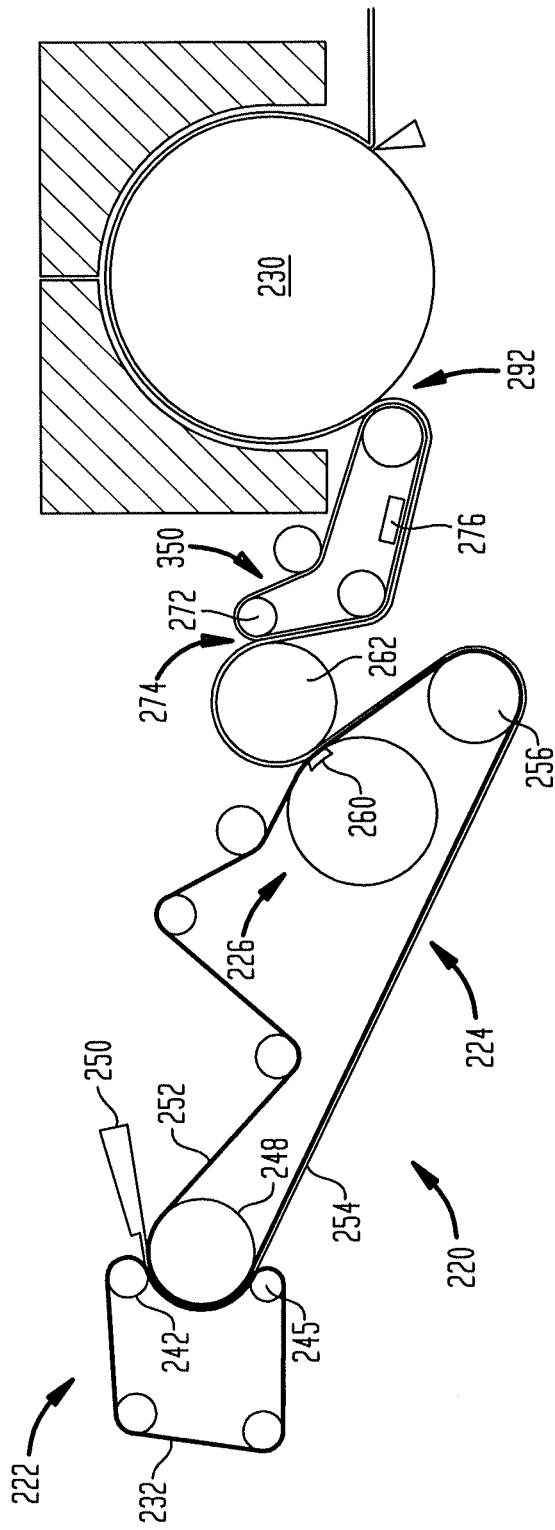
FIGS. 4 and 5 are schematic illustrations of papermachine configurations suitable for the practice of the present invention, FIG. 4 being a so-called crescent former and FIG. 5 being a twin wire.

FIG. 4 shows a papermachine 220 for use in connection with the present invention. Papermachine 220 is a three fabric loop machine having a forming section 222 generally referred to in the art as a crescent former. Forming section 222 includes headbox 250 depositing a furnish on forming wire 232 supported by a plurality of rolls, such as rolls 242, 245. The forming section also includes a forming roll 248 that supports papermaking felt 252, such that web 254 is formed directly on felt 252. Press section 226 includes felt 252, suction roll 256, press shoe 260 and backing roll 262. Felt run 224 extends to shoe press section 226, wherein the moist web is deposited on backing roll 262 and wet-pressed concurrently with the transfer. Thereafter, web 254 is creped onto belt 350 (top side large openings) in belt crepe nip 274 at roll 272 before being optionally vacuum drawn by suction box 276 and then deposited on Yankee dryer 230 in another press nip 292 using a creping adhesive as noted above. Transfer to a Yankee from the creping belt differs from conventional transfers in a CWP from a felt to a Yankee. In a CWP process, pressures in the transfer nip may be 500 PLI or so, and the pressured contact area between the Yankee surface and the web is close to or at 100%. The press roll may be a suction roll, which may have a P&J hardness of 25 to 30. On the other hand, a belt crepe process of the present invention typically involves transfer to a Yankee with a 4 to 40% pressured contact area between the web and the Yankee surface at a pressure of 250 to 350 PLI. No suction is applied in the transfer nip and a softer pressure roll is used, P&J hardness of 35 to 45. The system includes a suction roll 256, in some embodiments. The three loop system, however, may be configured in a variety of ways in which a turning roll is not necessary. This feature is particularly important in connection with the rebuild of a papermachine, inasmuch as the expense of relocating associated equipment, i.e., the headbox, pulping or fiber processing equipment, and/or the large and expensive drying equipment, such as the Yankee dryer or plurality of can dryers would make a rebuild prohibitively expensive, unless the improvements could be configured to be compatible with the existing facility.

Figure 5:
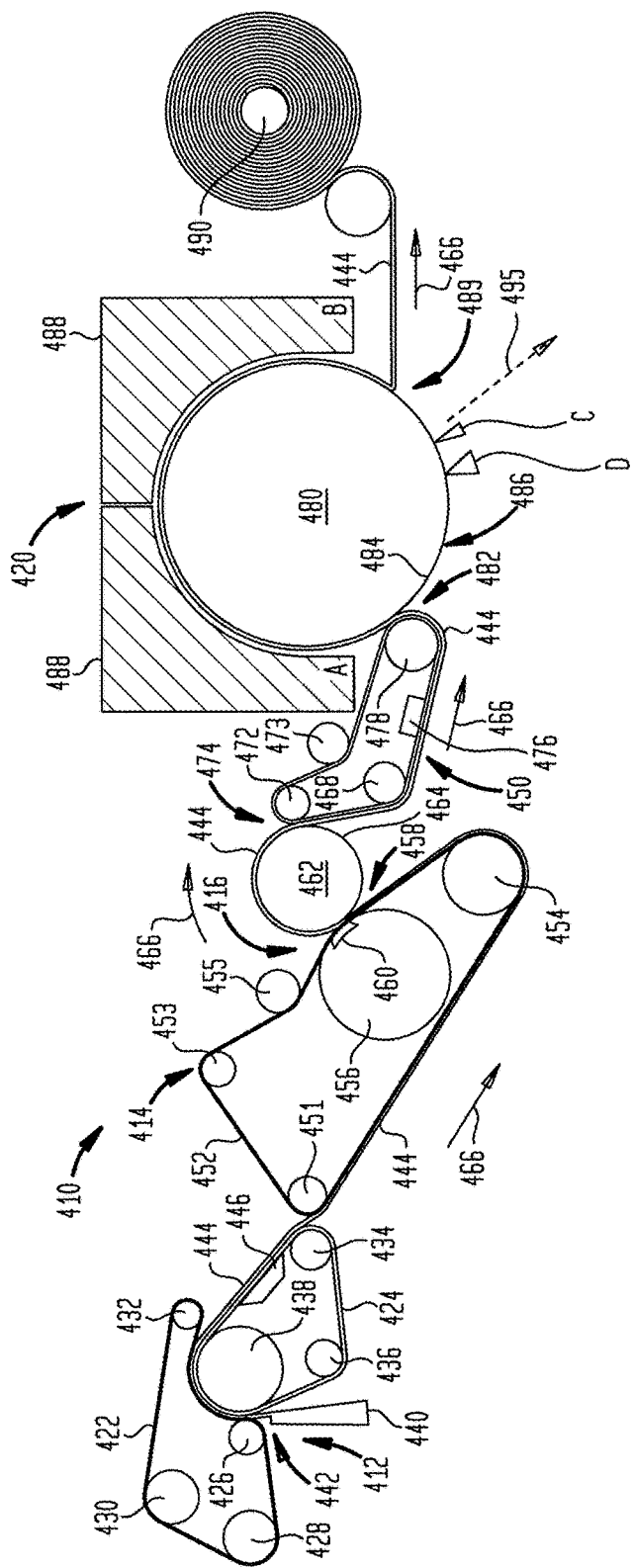
Figure 6A:
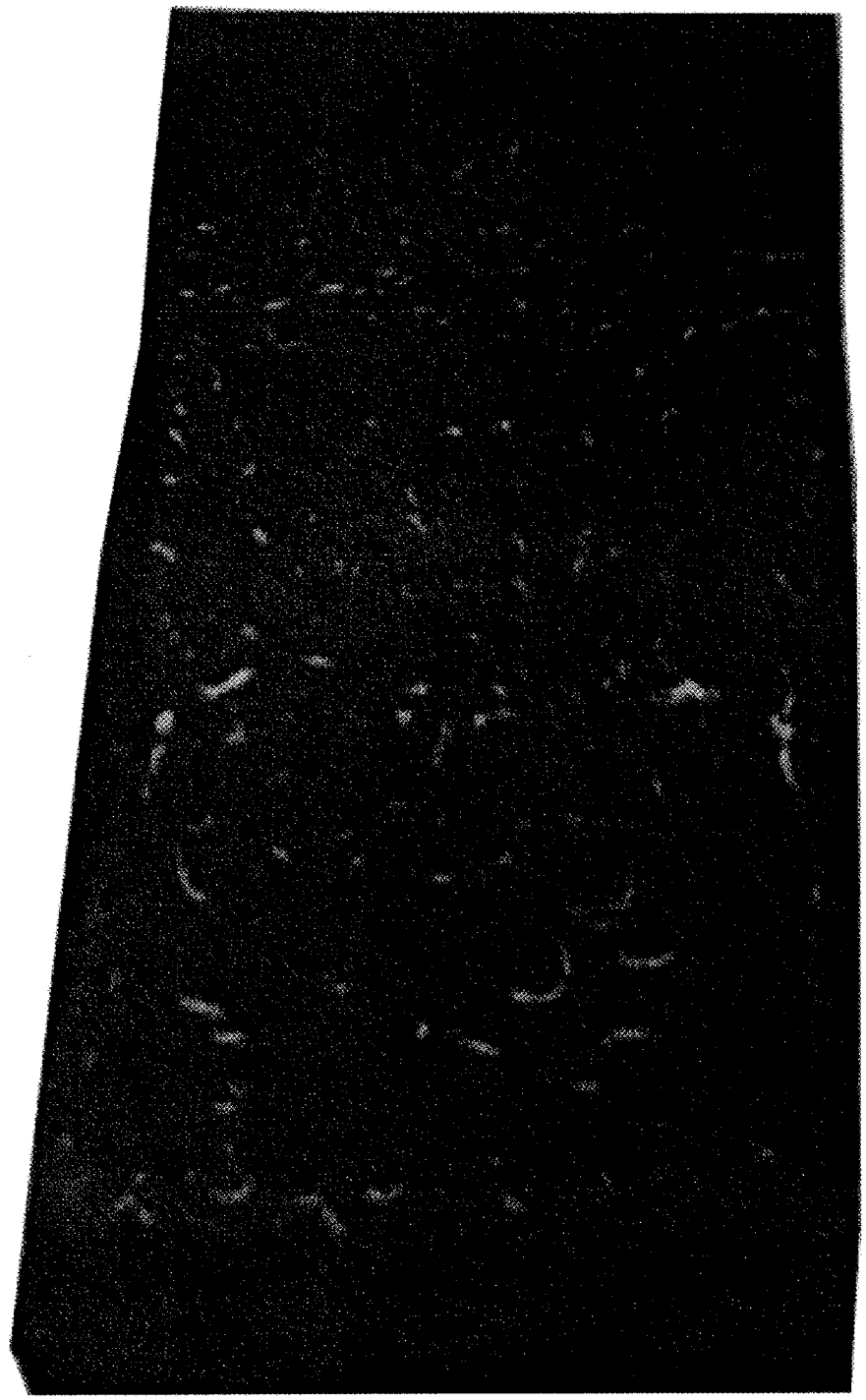
FIGS. 6A to 6D are photographs of black felts used in the "Dry Lint Test" described herein.
Figure 6B:
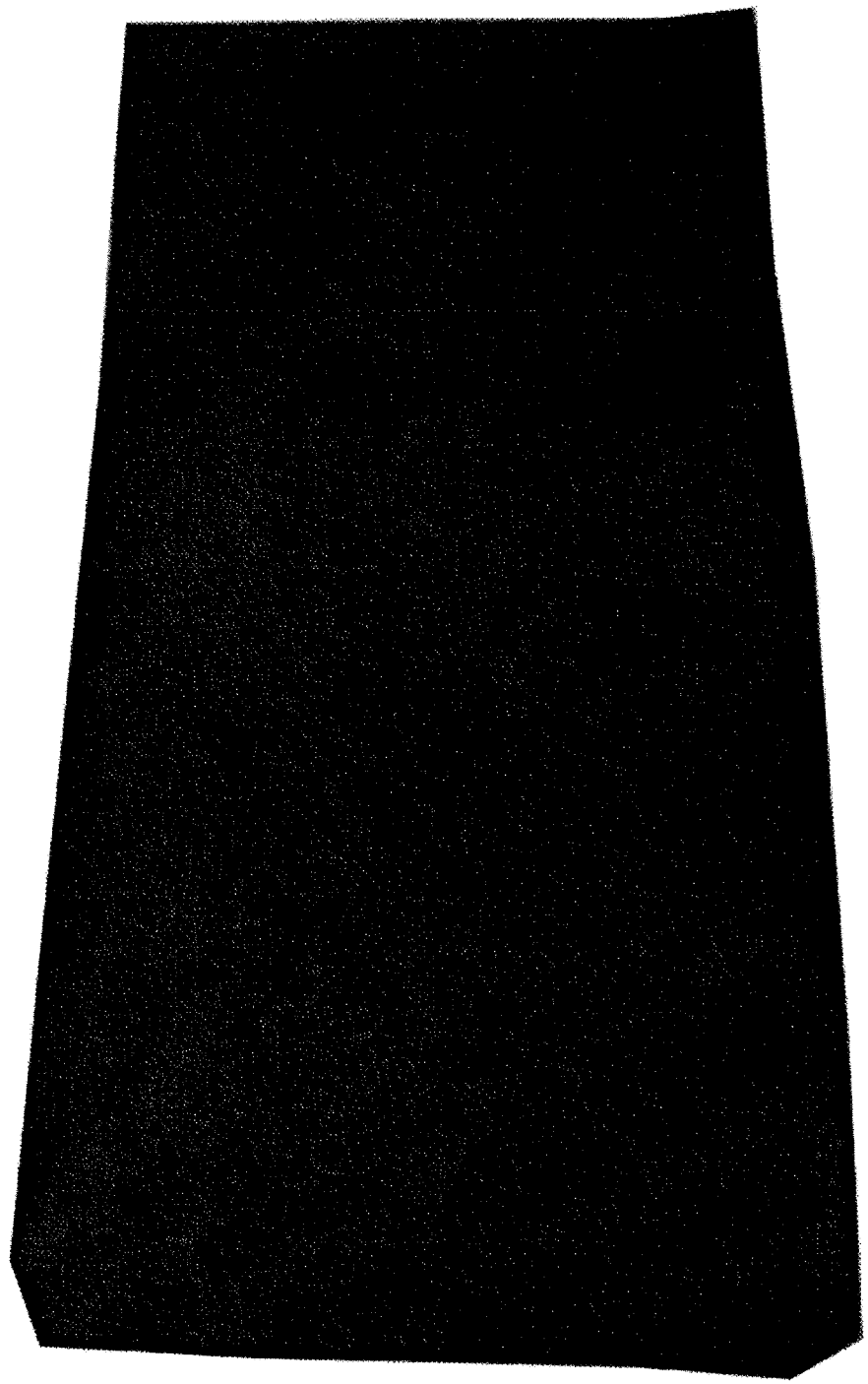
Figure 6C:
Figure 6D:
Figure 7:
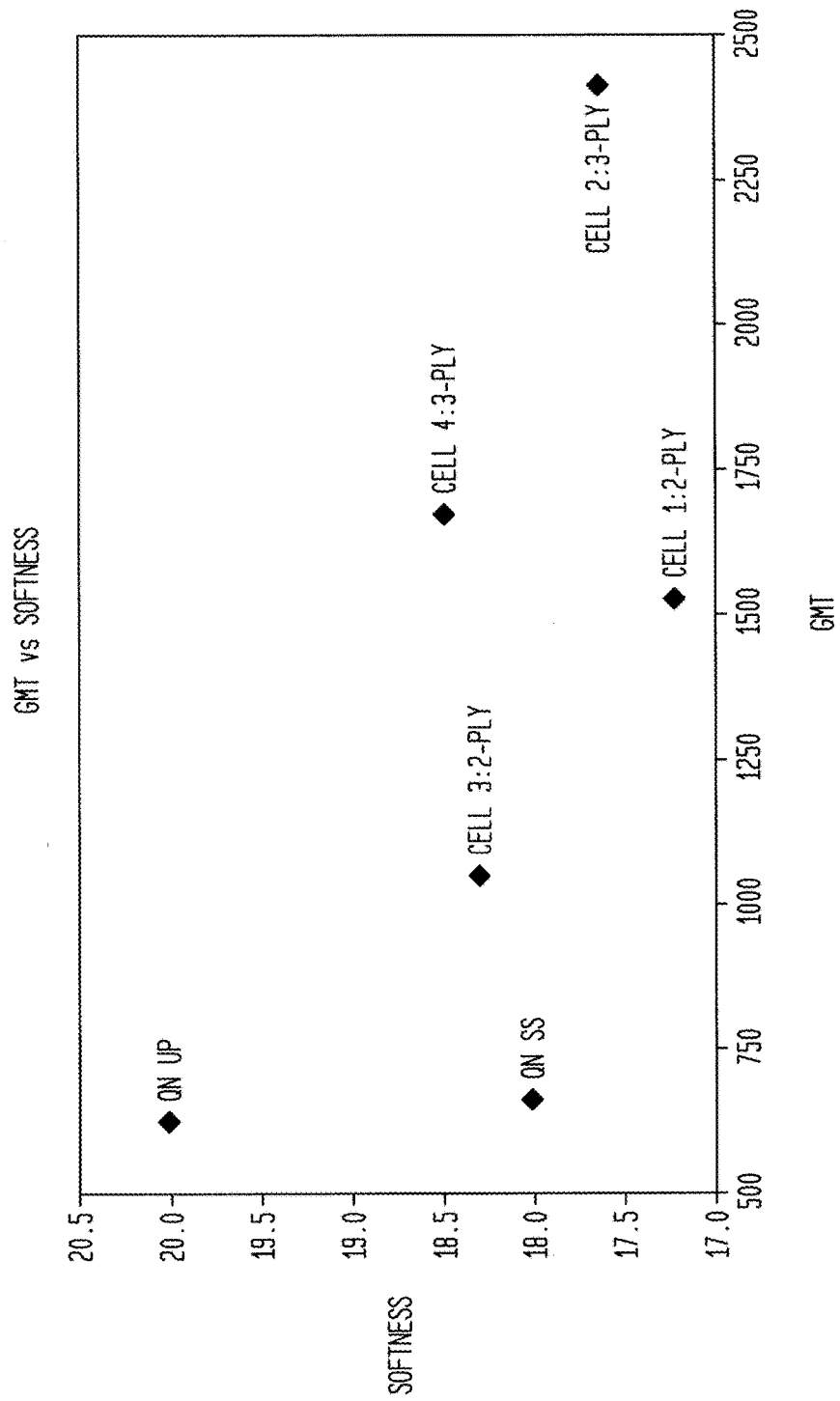
FIG. 7 is a graphical representation of results of softness and tensile testing described in Example 1 hereof, wherein QN UP represents Quilted Northern® Ultra Plush and QN SS represents Quilted Northern® Soft & Strong.

FIG. 5 is a schematic diagram of a papermachine 410 having a conventional twin wire forming section 412, a felt run 414, a shoe press section 416, a creping belt 450 and a Yankee dryer 420 suitable for practicing the present invention. Forming section 412 includes a pair of forming fabrics 422, 424 supported by a plurality of rolls 426, 428, 430, 432, 434, 436 and a forming roll 438. A headbox 440 provides papermaking furnish issuing therefrom as a jet in the machine direction to a nip 442 between forming roll 438 and roll 426 and the fabrics. The furnish forms a nascent web 444 that is dewatered on the fabrics with the assistance of suction, for example, by way of suction box 446.

The nascent web is advanced to a papermaking felt 452, which is supported by a plurality of rolls 451, 453, 454, 455, and the felt is in contact with a shoe press roll 456. The web is of a low consistency as it is transferred to the felt. Transfer may be assisted by suction, for example, roll 451 may be a suction roll, if so desired, or a pickup or suction shoe, as is known in the art. As the web reaches the shoe press roll, it may have a consistency of 10 to 25%, preferably, 20 to 25% or so as it enters nip 458 between shoe press roll 456 and backing roll 462. Backing roll 462 may be a heated roll if so desired. It has been found that increasing steam pressure to backing roll 462 helps to lengthen the time between required stripping of excess adhesive from the cylinder of Yankee dryer 420. Suitable steam pressure may be about 95 psig or so, bearing in mind that backing roll 462 is a crowned roll and creping roll 472 has a negative crown to match, such that the contact area between the rolls is influenced by the pressure in backing roll 462. Thus, care must be exercised to maintain matching contact between rolls 462, 472 when elevated pressure is employed.

Instead of a shoe press roll, roll 456 could be a conventional suction pressure roll. If a shoe press roll is employed, it is desirable and preferred that roll 454 be a suction roll effective to remove water from the felt prior to the felt entering the shoe press nip, since water from the furnish will be pressed into the felt in the shoe press nip. In any case, using a suction roll at 454 is typically desirable to ensure that the web remains in contact with the felt during the direction change as one of skill in the art will appreciate from the diagram.

Web 444 is wet-pressed on the felt in nip 458 with the assistance of press shoe 460. The web is thus compactively dewatered at nip 458, typically, by increasing the consistency by fifteen or more points at this stage of the process. The configuration shown at nip 458 is generally termed a shoe press, in connection with the present invention, backing roll 462 is operative as a transfer cylinder that operates to convey web 444 at a high speed, typically, 1000 fpm to 6000 fpm, to the creping belt. Nip 458 may be configured as a wide or an extended nip shoe press, as is detailed, for example, in U.S. Pat. No. 6,036,820 to Schiel, et al., the disclosure of which is incorporated herein by reference.

The use of particular adhesives cooperates with a moderately moist web (25 to 70% consistency) to adhere it to the Yankee sufficiently, to allow for high velocity operation of the system and high jet velocity impingement air drying, and subsequent peeling of the web from the Yankee. In this connection, a poly(vinyl alcohol)/polyamide adhesive composition, as noted above, is applied at any convenient location between cleaning doctor D and nip 482, such as at location 486, as needed, preferably, at a rate of less than about 40 mg/m² of sheet.

The web is dried on Yankee cylinder 480, which is a heated cylinder, and by high jet velocity impingement air in Yankee hood 488. Hood 488 is capable of variable temperatures. During operation, the web temperature may be monitored at wet-end A of the hood 488 and dry end B of the hood 488 using an infra-red detector, or any other suitable means if so desired. As the cylinder rotates, web 444 is peeled from the cylinder at 489 and wound on a take-up reel 490. Reel 490 may be operated at 5 to 30 fpm (preferably, 10 to 20 fpm) faster than the Yankee cylinder at steady-state when the line speed is 2100 fpm, for example. Instead of peeling the sheet, a creping doctor C may be used to conventionally dry-crepe the sheet. In any event, a cleaning doctor D mounted for intermittent engagement is used to control build up. When adhesive build-up is being stripped from Yankee cylinder 480, the web is typically segregated from the product on reel 490, preferably, being fed to a broke chute at 495 for recycle to the production process.

Backing roll 462 has a smooth transfer surface 464 that may be provided with adhesive (the same as the creping adhesive used on the Yankee cylinder) and/or release agents, if needed. Web 444 is adhered to transfer surface 464 of backing roll 462 that is rotating at a high angular velocity as the web continues to advance in the machine-direction indicated by arrows 466. On the cylinder, web 444 has a generally random apparent distribution of fiber orientation.

Direction 466 is referred to as the machine direction (MD) of the web as well as that of papermachine 410. Whereas, the cross machine direction (CD) is the direction in the plane of the web perpendicular to the MD.

Web 444 enters nip 458, typically, at consistencies of 10-25% or so, and is dewatered and dried to consistencies of from about 25 to about 70 by the time it is transferred to the top side of the creping belt 450, as shown in the diagram.

Creping belt 450 is supported on a plurality of rolls 468, 472, 473 and a press nip roll 478 and forms a belt crepe nip 474 with backing roll 462, as shown.

The creping belt defines a creping nip over the distance in which creping belt 450 is adapted to contact backing roll 462. That is, a significant pressure is applied to the web against the transfer cylinder. To this end, creping roll 472 may be provided with a soft deformable surface that will increase the width of the creping nip and increase the belt creping angle between the belt and the sheet at the point of contact, or a shoe press roll could be used as creping roll 472 to increase effective contact with the web in high impact belt creping nip 474 when web 444 is transferred to creping belt 450 and advanced in the machine-direction.

The nip pressure in crepe nip 474, that is, the loading between creping roll 472 and backing roll 462 is suitably 20 to 200, preferably, 40 to 70 pounds per linear inch (PLI). A substantial pressure in the nip of about 10 PLI or 20 PLI or more is preferable. One of skill in the art, however, will appreciate that, in a commercial machine, the maximum pressure may be as high as possible, limited only by the particular machinery employed. Thus, pressures in excess of 100 PLI, 500 PLI, 1000 PLI or more may be used, if practical and provided a sufficient velocity delta can be maintained between the transfer roll and creping belt.

After belt creping, the web 444 continues to advance along MD 466 where it is wet-pressed onto Yankee cylinder 480 in transfer nip 482. Optionally, suction is applied to the web by way of a suction box 476, to draw out minute folds, as well as to expand the dome structure discussed hereafter.

Transfer at nip 482 occurs at a web consistency of generally from about 25 to about 70%. At these consistencies, it is difficult to adhere the web to surface 484 of Yankee cylinder 480 firmly enough to remove the web from the belt thoroughly. This aspect of the process is important, particularly when it is desired to use a high velocity drying hood.

The products of the invention are produced with or without application of a vacuum to draw out minute folds to restructure the web and with or without calendering. In many cases, however, it is desirable to use both to promote a more absorbent and uniform product.

Bath tissue of the present invention preferably comprises cellulosic fibers chosen from the group consisting of chemically pulped fibers and mechanically pulped fibers, and from about 5 to about 50% by weight of eucalyptus fibers having a lignin content of at least about 15% by weight, more preferably, from about 10 to about 50% by weight of eucalyptus fibers having a lignin content of at least about 20% by weight, and from about 3 to about 10% by weight of regenerated cellulosic microfiber having a fiber count of greater than 100 million fibers per gram. Typically, paper making fibers useful in the present invention include cellulosic fibers commonly known as wood pulp fibers. Applicable wood pulps include chemical pulps, such as kraft, sulfite and sulfate pulps, as well as mechanical pulps including groundwood, thermomechanical pulp, chemically modified, and the like. Chemical pulps may be used in tissue embodiments since they are known to those of skill in the art to impart a superior tactile sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Additionally, fibers derived from wood pulp, such as cotton linters, bagasse, and the like, can be used. Additionally, fibers derived from recycled paper, which may contain any or all of the categories, as well as other non-fibrous materials, such as fillers and adhesives used to manufacture the original paper product, may be used in the present web.

Figure 14:
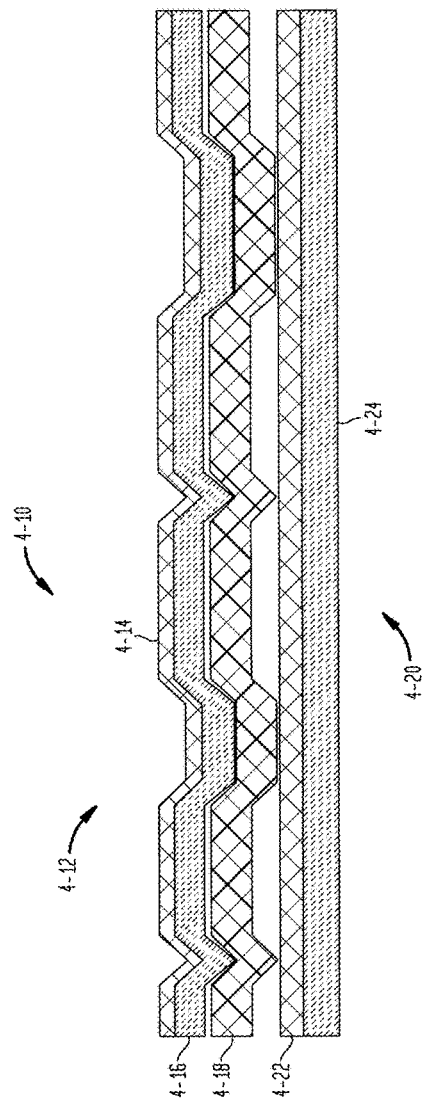
FIG. 14 illustrates a schematic sectional view of a three-ply tissue with two stratified outer plies and a homogeneous inner ply, wherein eucalyptus alkaline peroxide mechanical pulp (APMP) is incorporated in all three plies.

In one embodiment, particularly, if a two-ply structure is being formed, the plies of the multi-ply fibrous structure may be of the same basesheet formulation or the plies may comprise differing basesheets combined to create desired consumer benefits. In one embodiment, the fibrous structures comprise two plies of substantially identical tissue basesheet. In a preferred embodiment, the fibrous structure comprises a first ply, a second ply, and at least one inner ply, as shown in FIG. 14. A particularly preferred construction is that shown in U.S. Patent Application Publication No. 2009/0297781, now U.S. Pat. No. 8,287,986, in the name of Richard D. Huss et al., entitled "Ultra Premium Bath Tissue", published Dec. 3, 2009. In many embodiments of the present invention, the web has a plurality of embossments formed therein. In one embodiment, the embossment pattern is applied only to two plies that are bonded either by knurling or glue lamination to a third ply that is either unembossed or far more lightly embossed than the other two. In such structures, the points of the embossed structure of the two embossed sheets are usually in contact with the unembossed or lightly embossed backing sheet, as shown in Dwiggins, U.S. Pat. No. 6,896,768, discussed below. Often, such structures are referred to as having "points to the inside". In another embodiment, the fibrous structure product is a two-ply product wherein both plies comprise a plurality of embossments, either in a nested structure or a point to point structure. Nested products are disclosed in U.S. Pat. No. 6,413,614 to Giesler et al., "High Softness Embossed Tissue" issued Jul. 2, 2002. Variations or combinations of the rigid-to-resilient and/or rigid-to-rigid embossing processes are well understood by the skilled artisan and could be appropriately used in conjunction with the present invention. For example, nested embossing, point-to-point embossing, and multi-nip embossing processes are also within those configurations appropriate for use with the present invention. See, for example, U.S. Pat. Nos. 5,093,068, 5,091,032, 5,269,983 and 5,030,081 to Galyn A. Schulz.

In one embodiment, the fibrous structure product comprises two or more plies of fibrous structure, wherein at least one of the plies has a plurality of embossments thereon comprising an embossment height from about 600 μm to about 1,200 μm. In another embodiment, the embodiment height is from about 700 μm to about 1,100 μm, and the backing roll is either lightly embossed on unembossed, as disclosed in U.S. Pat. No. 6,896,768 to Dwiggins et al., entitled "Soft Bulky Multi-Ply Product and Method of Making Same", issued May 24, 2005. The multi-ply fibrous structure product may be in roll form. When in roll form, the multi-ply fibrous structure product may be wound about a core or may be wound without a core.

EXAMPLE 1

Base sheets having the composition set out in Table 4 were manufactured on a low speed pilot machine using conventional wet press (i.e., CWP) technology, then converted into multi-ply products having the constructions set forth in Table 5.

TABLE 4

| | | | | | Varisott GP-C debonder, lb/t | Caliper 8 Sheet mils/ 8 sht | Basis Weight lb/3000 ft$^2$ | Tensile MD g/3 in. | Stretch MD % | Tensile CD g/3 in. |
|---|---|---|---|---|---|---|---|---|---|---|
| Sample | Desc. | Marathon | CMF | FJ98, lb/ton | | | | | | |
| 30.1 | 4882-28 | 754 | 50 | 50 | 20 | 0 | 29.5 | 9.1 | 2024 | 28.5 | 831 |
| 31-1 | 4882-29 | 814 | 50 | 50 | 20 | 3 | 26.5 | 9.3 | 2045 | 27.6 | 744 |
| 32-1 | 4882-30 | 833 | 50 | 50 | 20 | 3 | 27.4 | 9.8 | 2284 | 29.5 | 851 |
| 33-1 | 4882-31 | 850 | 50 | 50 | 20 | 3 | 29.0 | 10.1 | 2248 | 28.3 | 927 |
| 34-1 base | 4882-32 | 915 | 50 | 50 | 20 | e | 26.7 | 8.1 | 1487 | 27.1 | 573 |
| 35-1 base | 4882-33 | 941 | 50 | 50 | 20 | 6 | 26.4 | 8.9 | 1659 | 28.9 | 604 |
| 36-1 base | 4882-34 | 1000 | 50 | 50 | 20 | 6 | 27.0 | 9.5 | 1787 | 27.2 | 706 |
| 37.1 base | 4882-35 | 1018 | 50 | 50 | 23 | 7 | 22.8 | 7.0 | 882 | 25.7 | 462 |
| 38-1 base | 4882-36 | 1035 | 50 | 50 | 23 | 7 | 23.4 | 7.0 | 1036 | 27.2 | 444 |
| 39.1 base | 4882-37 | 1057 | 50 | 50 | 23 | 7 | 24.7 | 7.0 | 989 | 27.8 | 444 |

| Sample | Stretch CD % | Tensile GM g/3 in. | CD Wet Tens Finch Cured- g/3 in. | Break Modulus GM g/% | TEA CD mm-g/ mm$^2$ | TEA MD mm-g/ mm$^2$ | Break Mod. CD g/% | Break Mod. MD g/% | Wet/Dry |
|---|---|---|---|---|---|---|---|---|---|
| 30.1 | 7.7 | 1296 | 164 | 91 | 0.503 | 2.772 | 111 | 74 | 0.20 |
| 31-1 | 7.1 | 1233 | 180 | 88 | 0.420 | 2,305 | 104 | 74 | 0.24 |
| 32-1 | 6.8 | 1393 | 216 | 100 | 0.442 | 2.669 | 127 | 79 | 0.25 |
| 33-1 | 7.9 | 1444 | 235 | 97 | 0.568 | 2.591 | 118 | 80 | 0.25 |

TABLE 4-continued

| | | basesheet | | | | | | | |
|---|---|---|---|---|---|---|---|---|---|
| 34-1 base | 7.4 | 921 | 154 | 67 | 0.327 | 1.803 | BO | 56 | 0.27 |
| 35-1 base | 8.0 | 1000 | 177 | 68 | 0.379 | 1.876 | BO | 59 | 0.29 |
| 36-1 base | 8.2 | 1121 | 157 | 73 | 0.472 | 2.062 | 82 | 65 | 0.22 |
| 37.1 base | 8.1 | 649 | 125 | 44 | 0.314 | 1.215 | 58 | 34 | 0.26 |
| 38-1 base | 7.5 | 677 | 114 | 48 | 0.250 | 1.329 | 59 | 39 | 0.26 |
| 39.1 base | 8.8 | 662 | 105 | 42 | 0.315 | 1.265 | 51 | 35 | 0.24 |

TABLE 5

Converted Product Construction

| | Description | Caliper 8 Sheet mils/8 sht | Basis Weight lb/3000 ft² | Tensile MD g/3 in. | Stretch MD % | Tensile CD g/3 in. | Stretch CD % | Tensile GM g/3 in. | Wet Tens g/3 in. | Break Modulus GM g/% | FQA Fiber Count Number |
|---|---|---|---|---|---|---|---|---|---|---|---|
| Condition 1 Average | 4882-32 | 26.65 | 8.14 | 1487 | 27.1 | 573 | 7.4 | 921 | 206 | 66.83 | 435 |
| | 4882-33 | 26.35 | 8.92 | 1659 | 28.9 | 604 | 8.0 | 1000 | 165 | 68.38 | 494 |
| | 4882-34 | 27.73 | 9.45 | 1787 | 27.2 | 706 | 8.2 | 1121 | 201 | 72.79 | 468 |
| | | 26.91 | 8.84 | 1644 | 27.72 | 627 | 7.86 | 1014 | 190.48 | 69.33 | 466 |
| Condition 2 Average | 4882-35 | 22.78 | 6.98 | 882 | 25.7 | 482 | 8.1 | 649 | 138 | 43.97 | 383 |
| | 4882-36 | 23.43 | 7.03 | 1036 | 27.2 | 444 | 7.5 | 677 | 123 | 47.88 | 363 |
| | 4882-37 | 24.68 | 7.00 | 989 | 27.8 | 444 | 8.8 | 662 | 132 | 42.25 | 305 |
| | | 23.63 | 7.00 | 969 | 26.89 | 456 | 8.15 | 663 | 130.85 | 44.70 | 350 |

When tested for physical properties, Dry Linting and Wet Abrasion Resistance, as set forth above, the results set forth in Table 6 were obtained:

TABLE 6

| | Base Sheet Condition 1 | | Base Sheet Condition 2 | |
|---|---|---|---|---|
| Description | Cell 1 2-Ply | Cell 2 3-Ply | Cell 3 2-Ply | Cell 4 3-Ply |
| Basis Weight (lbs/ream) | 17.14 | 26.11 | 13.93 | 20.45 |
| Caliper (mils/8 sheets) | 60.28 | 108.00 | 55.58 | 88.41 |
| MD Dry Tensile (g/3 in.) | 2198 | 3528 | 1384 | 2507 |
| CD Dry Tensile (g/3 in. | 1069 | 1662 | 793 | 1133 |
| Geometric Mean Tensile (g/3 in.) | 1533 | 2420 | 1047 | 1683 |
| MD Stretch (%) | 16.70 | 19.14 | 16.74 | 18.94 |
| CD Stretch (%) | 7.43 | 7.47 | 7.59 | 8.35 |
| Perforation Tensile (g/3 in.) | 866 | 1380 | 652 | 972 |
| Wet Tensile (g/3 in.) | 311 | 477 | 213 | 332 |
| GM Break Modulus (g/% strain) | 137.56 | 202.50 | 93.92 | 134.23 |
| MB 3100 Brightness (%) | 92.12 | 92.25 | 92.15 | 91.71 |
| MB 3100 b* | 2.26 | 2.35 | 2.06 | 2.34 |
| Opacity | 73.98 | 82.39 | 67.12 | 76.09 |
| Wet Abrasion FQA Lint Count | 500 | 495 | 346 | 444 |
| Dry Lint L * Difference | −0.26 | −0.37 | −0.43 | −0.43 |
| TMI Fric GMMMD 4 Scan-W (Unitless) | 0.47 | 0.49 | 0.38 | 0.49 |
| Sensory Softness | 17.22 | 17.61 | 18.29 | 18.47 |

Dry Lint: No data is shown in Table 4 for dry linting of the base sheets as the finished product. Dry-lint metrics as shown in Table 6 are all negative, indicating that the lint on the black felt was under the non-detect limit of the scanner. If it is taken that no dry lint was observed for the finished product, then it is extremely likely that the lint from the base sheets would similarly be under the detection limit.

Wet Abrasion Lint: At the time this data was collected, we were still in the process of developing a quantitative wet lint test, and so we used a qualitative wet abrasion test based on digital pictures taken to show the lint left behind prior to washing the sample for quantitative—FQA—testing that we were considering at that time. Accordingly, no statistical analysis was conducted to compare the linting of the CMF prototypes to the commercial products. From a comparison of FIGS. 6A-6D, however, it can be appreciated that Quilted Northern® Ultra Plush (FIG. 6A) and Quilted Northern® Soft & Strong (FIG. 6C) left behind large amounts of lint as compared to the two sheets containing 50% CMF which were, however, deemed not sufficiently dispersible, as it was determined that in excess of 2000 shakes would be required to disperse these sheets—if they could be dispersed at all.

Softness: The softness scores of the four prototypes are set forth in FIG. 7. It is apparent that cells 3 and 4 made from condition 2 base sheet are softer than cells 1 and 2. These two are also softer than Quilted Northern® Soft & Strong, Assignee's premium two-ply product, but not as soft as Quilted Northern® Ultra Plush, Assignee's Ultra Premium three-ply product, but are far stronger than either.

EXAMPLE 2

Based upon the results from Example 1, it was determined to evaluate whether product designs satisfying the criteria of low lint, high softness, and dispersibility could be achieved using 20 to 50% CMF, 3 to 7 lb/t FJ98, and 7 to 8.5 lb/ream basis weight.

It was further determined that three-ply glue lamination was an unexpectedly desirable converting configuration for CMF sheets, as unexpectedly high caliper was obtained out of low basis weight sheets. Accordingly, basesheets were made having the properties set forth in Table 7 using CWP technology. When converted into finished three-ply glue laminated rolls, as set forth in Table 8, the products had the physical properties set forth in Table 9. While these products achieve significantly improved levels of softness, strength and resistance to linting whether wet or dry, it can be appreciated that none of those presented so far has met the ultimate goal of producing a tissue that is as soft as the softest available commercial tissues, but has sufficient resistance to wet linting to be usable pre-moistened.

TABLE 7

Basesheet Properties

| Cell | Roll | Cell | CMF | FJ98 | BW | SW | 8 Sheet Caliper mils/8 sht | BW lb/3000 ft² | MD Tensile g/3 in. | MD Stretch | CD Tensile g/3 in. | CD Stretch | Cured-Wet Tens Finch CD g/3 in. | Disp. # of Shakes | GM Tensile g/3 in. | GM Break Modulus g/% |
|---|---|---|---|---|---|---|---|---|---|---|---|---|---|---|---|---|
| 3 | 4885-12 | 4 | 25 | 4 | 9 | 50 | 30.0 | 9.2 | 775 | 26.5 | 384 | 5.3 | 98 | 800 | 545 | 47 |
|  | 4885-13 | 4 | 25 | 4 | 9 | 50 | 31.5 | 9.4 | 834 | 23.2 | 384 | 4.9 | 104 | 800 | 563 | 53 |
|  | 4885-14 | 4 | 25 | 4 | 9 | 50 | 28.7 | 8.7 | 716 | 24.8 | 340 | 5.8 | 95 | 800 | 493 | 41 |
|  | Average |  |  |  |  |  | 30.1 | 9.1 | 775 | 24.8 | 369 | 5.3 | 99 | 800 | 534 | 47 |
| 4 | 4885-33 | 7 | 50 | 4 | 9 | 50 | 27.8 | 8.06 | 658 | 25.3 | 349 | 6.8 | 76 |  | 479 | 37 |
|  | 4885-34 | 7 | 50 | 4 | 9 | 50 | 29.9 | 8.74 | 905 | 27.8 | 386 | 6.8 | 83 | 500 | 591 | 42 |
|  | 4885-35 | 7 | 50 | 4 | 9 | 50 | 32.6 | 9.76 | 1074 | 27.6 | 423 | 6.1 | 95 | 600 | 673 | 51 |
|  | Average |  |  |  |  |  | 30.1 | 8.9 | 879 | 26.9 | 386 | 6.6 | 84 | 550 | 581 | 43 |

TABLE 8

Converted Product Construction

| cell | Front Roll | Middle Roll | Back Roll |
|---|---|---|---|
| 3 | 4885-12 | 4885-13 | 4885-14 |
| 4 | 4885-34 | 4885-33 | 4885-35 |

TABLE 9 part 1, Converted Product Physical Properties

| Description | Softness Panel | Dispersibility # of Shakes | Lint Black Felt Unitless | Basis Weight lb/3000 ft² | Caliper 8 Sheet mils/8 sht | MD Tensile g/3 in. | CD Tensile g/3 in. | MD Stretch % | CD Stretch % | CD Wet Tens Finch g/3 in. | Break Modulus GM g/% |
|---|---|---|---|---|---|---|---|---|---|---|---|
| Cell 3, 3-ply | 18.7 | 713 | 1.92 | 24.9 | 164 | 1011 | 672 | 11.8 | 7.0 | 140 | 92 |
| Cell 3, 3-ply | 18.7 | 663 | 1.73 | 25.1 | 158 | 1063 | 651 | 13.0 | 6.5 | 149 | 90 |
| Cell 4, 3-ply | 18.6 | 788 | 0.35 | 24.4 | 160 | 1645 | 848 | 15.2 | 9.3 | 156 | 100 |
| Cell 4, 3-ply | 18.6 | 800 | 0.12 | 23.4 | 154 | 1478 | 844 | 15.6 | 9.1 | 157 | 97 |
| Cell 3 Average | 18.7 | 688 | 1.83 | 25.0 | 161 | 1037 | 662 | 12.4 | 6.8 | 144 | 91 |
| Cell 4 Average | 18.6 | 794 | 0.24 | 23.9 | 157 | 1561 | 846 | 15.4 | 9.2 | 156 | 98 | part 2, Converted Product Physical Properties

| | Opacity MacBeth Opacity Units | TMI Ply Bond. g | Void Volume Wt Inc % | Break Modulus MD g/% | Break Modulus CD g/% | Void Volume Ratio | TEA MD mm-gm/mm² | TEA CD mm-gm/mm² | FQA Fiber Count Number | FQA Fiber Len $L_w$ mm | FQA Fine Len $L_w$ % |
|---|---|---|---|---|---|---|---|---|---|---|---|
| Cell 3, 3-ply | 79 | 10.9 | 1,353 | 88 | 97 | 7.2 | 0.76 | 0.37 | 2408 | 0.80 | 9.0 |
| Cell 3, 3-ply | 80 | 6.5 | 1,399 | 82 | 99 | 7.4 | 0.94 | 0.33 | 2011 | 0.79 | 9.1 |
| Cell 4, 3-ply | 82 | 7.6 | 1,399 | 108 | 93 | 6.9 | 1.65 | 0.61 | 1563 | 0.64 | 17.7 |
| Cell 4, 3-ply | 82 | 9.5 | 1,373 | 98 | 95 | 7.3 | 1.21 | 0.60 | 2985 | 0.78 | 10.4 |
| Cell 3 Average | 79 | 8.7 | 1376 | 85 | 98 | 7.3 | 0.85 | 0.35 | 2209 | 0.80 | 9.0 |
| Cell 4 Average | 82 | 8.5 | 1386 | 103 | 94 | 7.1 | 1.43 | 0.60 | 2274 | 0.71 | 14.0 |

Table 10 shows a comparison of converted low-lint CWP, CMF containing products with an ultra-premium retail tissue, Assignee's Quilted Northern® Ultra Plush and a competitive product which, judging from its name, is apparently promoted at least partially on the basis of its strength, Charmin® Ultra Strong. Three-ply CWP products with CMF were able to at least slightly surpass the performance of Charmin® Ultra Strong in several ways: higher bulk, higher wet strength, higher opacity, and much lower lint, achieving these advantages at equal weight and softness. The softness difference, however, is not sufficiently large, so that it is entirely certain that the difference could be replicated in subsequent panels testing the same products. It is clear, however, that the softness of the CMF containing protocepts was significantly inferior to that of Quilted Northern® Ultra Plush even though their bulk, wet and dry strength, opacity and linting resistance were improved.

TABLE 10

| Comparison of Converted Product | | | | | |
|---|---|---|---|---|---|
| | Quilted Northern ® Ultra Plush | Charmin ® Ultra Strong | Previous low-lint protocept Comparative Example 1 | Current 25% CMF Protocept | Current 50% CMF Protocept |
| CMF, % | | | 50 | 25 | 50 |
| SW, % | | | 50 | 37.5 | 25 |
| Euc, % | | | 0 | 37.5 | 25 |
| FJ98, lb/t | | | 20 | 4 | 4 |
| Basesheet BW, lb/ream | 12-12.5 | | 7 | 9 | 9 |
| Emboss | | | HVS-9 knurl | HVS-9 glue | HVS-9 glue |
| Caliper mils/8 sheet | 144 | 140 | 88 | 161 | 157 |
| Caliper, cc/g | 7.8 | 11.4 | 8.4 | 12.6 | 12.9 |
| Void Volume, % increase | | 1,301 | | 1,376 | 1,386 |
| Basis Weight, lb/3000 ft$^2$ | 36 | 23.9 | 20.4 | 25.0 | 23.9 |
| MDDT, g/3 in. | 1200 | 1,373 | 2507 | 1,037 | 1561 |
| MD str, % | | 16.56 | 18.9 | 12.4 | 15.4 |
| CDDT, g/3 in. | 450 | 699 | 1133 | 662 | 846 |
| CD Str, % | | 11.1 | 8.4 | 6.8 | 9.2 |
| CDWT, g/3 in. | 40 | 79 | 332 | 144 | 156 |
| GMT, g/3 in | 735 | 980 | 1685 | 828 | 1149 |
| GM Break Modulus, g/%/3 in. | 59 | 73 | 134 | 91 | 98 |
| Opacity | 77 | 67 | | 79 | 82 |
| Softness | 20.0 | 18.6 | 18.5 | 18.7 | 18.6 |
| Dispersibility, # of Shakes | <700 | | 2000+ | 688 | 794 |
| Dry Lint (Delta L*) | 10.2 | 3.0 | −0.4 | 1.8 | 0.24 |
| Wet Lint (Fiber Count) | 15000 | 8,480 | 444 | 2209 | 2274 |

It can be appreciated that the protocept (trial product produced in the laboratory that may not necessarily be commercially or economically practical to manufacture in commercial equipment) with 25% CMF exhibited quite good levels of softness, linting, opacity, dispersibility and strength. The softest products, however, were somewhat deficient in softness compared to Quilted Northern® Ultra Plush.

EXAMPLE 3

As the protocepts of Examples 1 and 2 were unable to match the softness performance of Assignee's ultra premium product, Quilted Northern® Ultra Plush, exploratory work was done using the paper-making technology disclosed in U.S. Patent Application Publication No. 2010/0186913, in conjunction with lower CMF content furnishes, to determine the possible interaction of this new belt-creping technology with CMF containing furnishes and to determine whether the two technologies were compatible, and, if so, whether the use of the two together had advantages in the formation of a pre-wettable bath tissue. It had been hoped that, if this effort were successful, it might be possible to develop a pre-wettable bath tissue that, even though it might not match Quilted Northern® Ultra Plush in absolute level of softness, might be close enough that any deficiency would not be easily perceptible. So, rather improved softness was desired to exceed the 18.7 panel softness achieved in Comparative Example 2 and more closely approach the Panel softness value of 20 achieved by Quilted Northern® Ultra Plush.

Accordingly, basesheet samples were prepared using a belt similar to that illustrated in FIG. 3 on a pilot scale paper machine using a furnish comprising 65% northern bleached softwood kraft, 15% eucalyptus, and 20% CMF with temporary wet strength with process parameters set as described in Table 11. The properties of those basesheets are set forth in Table 12. Using the scheme set forth in Table 13, the basesheets were converted into finished product, as set forth in Table 14, the properties of which, as determined by physical properties testing and sensory panels, are set forth in Table 15.

Table 16 sets forth the dispersibility, wet tensile strength and basis weight of several commercial products along with those of many products produced in this Example. See FIG. 29 as well.

TABLE 11

| Process Data | | | | | | | | | | |
|---|---|---|---|---|---|---|---|---|---|---|
| Roll# | 64551 lb/s | 64601 lb/s | PVOH lb/t | GPB100 lb/t | GP C lb/t | F398 lb/t | Jet Spd fpm | Form Roll Speed, fpm | Yankee Speed, fpm | Reel Speed, fpm |
| 22910 | 1.0 | 0.5 | 7.3 | 6.0 | 0.0 | 2.4 | 2633 | 1933 | 1601 | 1523 |
| 22911 | 1.0 | 0.5 | 7.3 | 5.8 | 0.0 | 3.0 | 2634 | 1933 | 1601 | 1523 |
| 22912 | 1.0 | 0.5 | 7.3 | 5.8 | 0.0 | 3.0 | 2634 | 1933 | 1601 | 1523 |
| 22918 | 1.3 | 0.6 | 9.0 | 7.1 | 0.0 | 3.7 | 2633 | 1933 | 1601 | 1523 |
| 22919 | 1.2 | 0.6 | 8.6 | 6.7 | 0.0 | 3.6 | 2633 | 1933 | 1601 | 1523 |
| 22920 | 1.2 | 0.6 | 8.5 | 6.6 | 0.0 | 3.7 | 2633 | 1933 | 1601 | 1523 |
| 22921 | 1.2 | 0.6 | 8.4 | 6.6 | 0.0 | 8.9 | 2633 | 1933 | 1601 | 1523 |
| 22922 | 1.2 | 0.6 | 8.4 | 6.9 | 0.0 | 9.0 | 2633 | 1933 | 1601 | 1523 |

TABLE 11-continued

Process Data

| | | | | | | | | | | |
|---|---|---|---|---|---|---|---|---|---|---|
| 22923 | 1.2 | 0.6 | 8.5 | 6.5 | 0.0 | 8.9 | 2632 | 1933 | 1601 | 1523 |
| 22928 | 1.2 | 0.6 | 7.8 | 4.8 | 0.0 | 14.4 | 2643 | 1939 | 1601 | 1523 |
| 22929 | 1.2 | 0.6 | 7.8 | 5.1 | 0.0 | 14.5 | 2644 | 1939 | 1601 | 1523 |
| 22931 | 1.2 | 0.6 | 7.9 | 4.9 | 0.0 | 14.5 | 2639 | 1939 | 1601 | 1523 |
| 22932 | 1.2 | 0.6 | 7.9 | 4.9 | 0.0 | 14.4 | 2639 | 1939 | 1601 | 1523 |
| 22933 | 1.2 | 0.6 | 7.9 | 5.0 | 0.0 | 14.4 | 2640 | 1939 | 1601 | 1523 |
| 22948 | 1.4 | 0.7 | 9.5 | 1.1 | 0.0 | 3.9 | 2430 | 1697 | 1401 | 1334 |
| 22949 | 1.4 | 0.7 | 9.7 | 0.9 | 0.0 | 4.0 | 2448 | 1697 | 1401 | 1332 |
| 22950 | 1.4 | 0.7 | 9.7 | 1.0 | 0.0 | 4.0 | 2480 | 1697 | 1401 | 1333 |
| 22960 | 1.0 | 0.5 | 6.3 | 2.1 | 0.0 | 2.8 | 2565 | 1939 | 1601 | 1523 |
| 22961 | 1.0 | 0.5 | 6.3 | 2.5 | 0.0 | 2.7 | 2565 | 1939 | 1601 | 1523 |
| 22966 | 1.5 | 0.8 | 10.0 | 2.7 | 0.0 | 2.2 | 2526 | 1939 | 1601 | 1523 |
| 22968 | 1.5 | 0.8 | 10.0 | 2.8 | 0.0 | 2.2 | 2515 | 1939 | 1601 | 1523 |
| 22969 | 1.5 | 0.8 | 10.0 | 2.8 | 0.0 | 2.2 | 2515 | 1939 | 1601 | 1523 |
| 22973 | 1.4 | 0.7 | 9.5 | 2.9 | 0.6 | 2.1 | 2514 | 1939 | 1601 | 1523 |
| 22974 | 1.4 | 0.7 | 9.5 | 3.3 | 0.7 | 2.0 | 2514 | 1939 | 1601 | 1523 |
| 22975 | 1.4 | 0.7 | 9.5 | 2.8 | 0.9 | 2.0 | 2514 | 1939 | 1601 | 1523 |
| 22981 | 1.0 | 0.5 | 6.2 | 1.8 | 4.1 | 2.1 | 2619 | 1939 | 1601 | 1523 |
| 22982 | 1.3 | 0.6 | 3.8 | 2.8 | 6.3 | 2.5 | 2619 | 1939 | 1601 | 1262 |

| Roll# | JetWire Ratio | Slice Opening inches | Total HB Flow, gpm | Refiner HP | WE Yankee Hood Temp., F. | DE Yankee Hood Temp., F. | Suction roll vacuum, in. Hg. | Mokling Box Vacuum, in. Hg. | ViscoNip Load. FLI |
|---|---|---|---|---|---|---|---|---|---|
| 22910 | 1.36 | 0.779 | 1727 | 14.7 | 430 | 381 | 11.4 | 11.1 | 558 |
| 22911 | 1.36 | 0.779 | 1731 | 14.7 | 392 | 342 | 11.5 | 11.1 | 600 |
| 22912 | 1.36 | 0.779 | 1729 | 14.7 | 392 | 338 | 11.5 | 11.2 | 600 |
| 22918 | 1.36 | 0.779 | 1737 | 34.6 | 323 | 205 | 11.2 | 12.0 | 600 |
| 22919 | 1.36 | 0.779 | 1733 | 34.7 | 325 | 203 | 11.3 | 12.2 | 600 |
| 22920 | 1.36 | 0.779 | 1733 | 34.8 | 328 | 202 | 11.3 | 12.2 | 600 |
| 22921 | 1.36 | 0.779 | 1733 | 34.8 | 326 | 201 | 11.3 | 12.3 | 600 |
| 22922 | 1.36 | 0.779 | 1731 | 34.8 | 325 | 200 | 11.4 | 12.3 | 600 |
| 22923 | 1.36 | 0.779 | 1728 | 33.7 | 325 | 200 | 11.4 | 12.4 | 600 |
| 22928 | 1.36 | 0.767 | 1698 | 35.3 | 348 | 192 | 11.7 | 12.2 | 600 |
| 22929 | 1.36 | 0.767 | 1698 | 35.4 | 353 | 193 | 11.7 | 12.2 | 600 |
| 22931 | 1.36 | 0.774 | 1696 | 35.5 | 352 | 194 | 11.8 | 12.1 | 600 |
| 22932 | 1.36 | 0.775 | 1701 | 35.6 | 344 | 195 | 11.8 | 21.7 | 600 |
| 22933 | 1.36 | 0.775 | 1700 | 35.4 | 350 | 195 | 11.8 | 23.2 | 600 |
| 22948 | 1.43 | 0.753 | 1307 | 10.3 | 419 | 378 | 11.8 | 19.5 | 375 |
| 22949 | 1.44 | 0.753 | 1312 | 10.3 | 393 | 338 | 11.7 | 24.2 | 375 |
| 22950 | 1.46 | 0.753 | 1332 | 10.3 | 399 | 347 | 11.7 | 24.3 | 375 |
| 22960 | 1.32 | 0.876 | 2307 | 10.1 | 598 | 558 | 11.7 | 23.6 | 600 |
| 22961 | 1.32 | 0.876 | 2308 | 10.1 | 602 | 546 | 11.8 | 23.7 | 600 |
| 22966 | 1.30 | 0.876 | 2252 | 31.2 | 398 | 343 | 11.2 | 22.7 | 600 |
| 22968 | 1.30 | 0.876 | 2235 | 34.2 | 398 | 353 | 10.6 | 22.8 | 600 |
| 22969 | 1.30 | 0.876 | 2242 | 35.3 | 396 | 343 | 10.6 | 22.8 | 600 |
| 22973 | 1.30 | 0.910 | 2242 | 22.5 | 401 | 341 | 10.8 | 23.0 | 600 |
| 22974 | 1.30 | 0.910 | 2242 | 22.5 | 399 | 358 | 10.8 | 23.1 | 600 |
| 22975 | 1.30 | 0.910 | 2239 | 22.4 | 399 | 345 | 10.8 | 23.1 | 600 |
| 22981 | 1.35 | 0.753 | 1564 | 10.1 | 600 | 548 | 11.7 | 23.9 | 350 |
| 22982 | 1.35 | 0.753 | 1569 | 10.0 | 602 | 551 | 11.9 | 20.7 | 350 |

TABLE 12

Basesheet Data

| TL2009-2041 Parent Roll | Basesheet CMF % | FJ98, lb/ton | 8 Sheet Caliper mils/8 sht | Basis Weight lb/3000 ft$^2$ | Tensile MD g/3 in. | Stretch MD % | Tensile CD g/3 in. | Stretch CD % | Tensile GM g/3 in. | Finch CD g/3 in. | Break Modulus GM g/% | TEA GM mm-gm/mm$^2$ | W/D | Void Volume Wt Inc. % | Lint Black Felt Unitless |
|---|---|---|---|---|---|---|---|---|---|---|---|---|---|---|---|
| 22910 | 20 | 2.4 | 54.5 | 9.0 | 359 | 30.4 | 260 | 8.2 | 306 | 30 | 19.4 | 0.289 | 0.11 | 999 | 2.94 |
| 22911 | 20 | 3.0 | 53.7 | 9.1 | 399 | 31.3 | 263 | 7.9 | 324 | 34 | 20.7 | 0.308 | 0.13 | 1,093 | 2.68 |
| 22912 | 20 | 3.0 | 52.3 | 8.6 | 341 | 29.1 | 289 | 8.1 | 314 | 41 | 19.7 | 0.293 | 0.14 | 1,013 | 2.51 |
| 22918 | 20 | 3.7 | 39.9 | 7.1 | 361 | 27.2 | 286 | 7.6 | 321 | 40 | 21.8 | 0.285 | 0.14 | 1,084 | 1.00 |
| 22919 | 20 | 3.6 | 42.5 | 7.2 | 392 | 26.8 | 307 | 8.0 | 347 | 41 | 23.6 | 0.295 | 0.13 | 1,103 | 0.58 |
| 22920 | 20 | 3.7 | 40.1 | 7.1 | 414 | 28.0 | 309 | 7.1 | 358 | 42 | 25.7 | 0.309 | 0.14 | 1,075 | 0.71 |
| 22921 | 20 | 8.9 | 41.6 | 7.2 | 510 | 27.2 | 401 | 7.0 | 452 | 90 | 33.2 | 0.390 | 0.22 | 1,010 | 0.51 |
| 22922 | 20 | 9.0 | 40.2 | 7.3 | 493 | 26.0 | 409 | 7.9 | 449 | 91 | 31.0 | 0.409 | 0.22 | 971 | 0.20 |
| 22923 | 20 | 8.9 | 40.6 | 7.3 | 526 | 26.2 | 384 | 7.1 | 450 | 83 | 33.0 | 0.380 | 0.22 | 1,020 | 0.33 |
| 22928 | 20 | 14.4 | 41.8 | 7.4 | 632 | 28.5 | 517 | 7.4 | 571 | 144 | 39.8 | 0.531 | 0.28 | 938 | 0.02 |
| 22929 | 20 | 14.5 | 41.4 | 7.2 | 591 | 27.7 | 503 | 8.1 | 544 | 160 | 37.5 | 0.533 | 0.32 | 922 | −0.17 |
| 22931 | 20 | 14.5 | 43.4 | 7.3 | 643 | 28.8 | 481 | 7.9 | 556 | 139 | 37.1 | 0.541 | 0.29 | 908 | 0.12 |

TABLE 12-continued

Basesheet Data

| TL2009-2041 Parent Roll | Basesheet CMF % | FJ98, lb/ton | 8 Sheet Caliper mils/8 sht | Basis Weight lb/3000 ft² | Tensile MD g/3 in. | Stretch MD % | Tensile CD g/3 in. | Stretch CD % | Tensile GM g/3 in. | Finch CD g/3 in. | Break Modulus GM g/% | TEA GM mm-gm/mm² | W/D | Void Volume Wt Inc. % | Lint Black Felt Unitless |
|---|---|---|---|---|---|---|---|---|---|---|---|---|---|---|---|
| 22932 | 20 | 14.4 | 47.6 | 7.2 | 577 | 27.1 | 425 | 7.4 | 494 | 136 | 35.0 | 0.443 | 0.32 | | |
| 22933 | 20 | 14.4 | 47.1 | 7.2 | 545 | 26.6 | 464 | 8.0 | 503 | 144 | 34.9 | 0.476 | 0.31 | | |
| 22948 | 20 | 3.9 | 69.7 | 12.1 | 663 | 35.0 | 347 | 11.0 | 479 | 71 | 24.9 | 0.542 | 0.20 | | |
| 22949 | 20 | 4.0 | 74.0 | 12.0 | 662 | 32.6 | 376 | 10.1 | 498 | 57 | 27.5 | 0.529 | 0.15 | | |
| 22950 | 20 | 4.0 | 71.7 | 11.9 | 662 | 33.5 | 414 | 9.9 | 523 | 82 | 28.9 | 0.554 | 0.20 | | |
| 22960 | 0 | 2.8 | 83.0 | 14.8 | 496 | 22.8 | 394 | 5.2 | 442 | 45 | 41.1 | 0.251 | 0.11 | | |
| 22961 | 0 | 2.7 | 84.2 | 14.7 | 531 | 24.1 | 461 | 6.1 | 495 | 63 | 40.0 | 0.395 | 0.14 | | |
| 22966 | 0 | 2.2 | 57.4 | 8.9 | 321 | 22.7 | 260 | 7.1 | 289 | 25 | 23.0 | 0.239 | 0.10 | | |
| 22968 | 0 | 2.2 | 55.7 | 9.0 | 353 | 20.5 | 285 | 6.2 | 317 | 30 | 28.5 | 0.237 | 0.10 | | |
| 22969 | 0 | 2.2 | 57.7 | 9.1 | 324 | 19.6 | 294 | 6.4 | 308 | 26 | 27.5 | 0.230 | 0.09 | | |
| 22973 | 10 | 2.1 | 56.0 | 9.2 | 410 | 22.9 | 272 | 4.8 | 333 | 24 | 32.2 | 0.229 | 0.09 | | |
| 22974 | 10 | 2.0 | 57.3 | 9.7 | 495 | 24.1 | 399 | 6.4 | 444 | 33 | 36.2 | 0.357 | 0.08 | | |
| 22975 | 10 | 2.0 | 56.1 | 9.7 | 434 | 23.6 | 347 | 6.3 | 388 | 33 | 32.1 | 0.310 | 0.10 | | |
| 22981 | 10 | 2.1 | 82.8 | 14.6 | 451 | 27.6 | 272 | 5.7 | 350 | 45 | 28.5 | 0.010 | 0.17 | | |
| 22982 | 10 | 2.5 | 78.7 | 14.7 | 530 | 30.3 | 297 | 5.5 | 396 | 48 | 29.9 | 0.005 | 0.16 | | |

TABLE 13

Basesheet Configuration

| Cell | Marathon/Euc/CMF | Basis wt. | FJ98, lb/t | Notes | Parent rolls |
|---|---|---|---|---|---|
| 1 | 65/15/20 | 9 | Low | Softest | 22910, 22911, 22912 |
| 2 | 65/15/20 | 7 | Low | Some durability | 22918, 22919, 22920 |
| 3 | 65/15/20 | 7 | Med. | More durable | 22921, 22922, 22923 |
| 4 | 65/15/20 | 7 | High | Most durable | 22928, 22929, 22931 |
| 5 | 65/15/20 | 7 | High | Aperture | 22932, 22933 |
| 6 | 65/15/20 | 15 | Low | Ultra | 22948, 22949, 22950 |
| 7 | 35/65/zero | 15 | Low | Ultra 2-ply Control | 22960, 22961 |
| 8 | 35/65/zero | 9 | Low | Ultra 3-ply Control | 22966, 22968, 22969 |
| 9 | 35/65/10 | 9 | Low | Ultra 3-ply | 22973, 22974, 22975 |
| 10 | 35/65/10 | 15 | Low | Ultra 2-ply | 22981, 22982 |

TABLE 14

Converting Configuration

| Cell No. | #1 Unwind Base Sheet | #2 Unwind Base Sheet | #3 Unwind Base Sheet | Product Description | Converting Process |
|---|---|---|---|---|---|
| P3403 | 22910 | 22911 | 22912 | Wet durable | "K" = 3-Ply Unembossed, knurled; "G" = 3-ply HVS U19, glued |
| P3404 | 22918 | 22919 | 22920 | Wet durable | "K" = 3-Ply Unembossed, knurled; "G" = 3-ply HVS U19, glued |
| P3405 | 22921 | 22922 | 22923 | Wet durable | "K" = 3-Ply Unembossed, knurled; "G" = 3-ply HVS U19, glued |
| P3406 | 22928 | 22929 | 22931 | Wet durable | "K" = 3-Ply Unembossed, knurled; "G" = 3-ply HVS U19, glued |
| P3407 | 22932 | 22949 | 22933 | Wet durable, aperture* | "K" = 3-Ply Unembossed, knurled |
| P3408 | 22948 | 22949 | 22950 | Ultra | "K" = 3-Ply Unembossed, knurled; "G" = 3-ply HVS U19, glued |
| P3409 | 22948 | 22949 | | Ultra | "K" = 2-Ply Unembossed, knurled; "G" = 2-ply HVS U19, glued |
| P3410 | 22932 | 22911 | 22933 | Wet durable, aperture* | "K" = 3-Ply Unembossed, knurled |
| P3411 | 22960 | 22961 | | Ultra | "K" = 2-Ply Unembossed, knurled; "G" = 2-ply HVS U19, glued |
| P3412 | 22966 | 22968 | 22969 | Ultra | "K" = 3-Ply Unembossed, knurled; "G" = 3-ply HVS U19, glued |
| P3413 | 22973 | 22974 | 22975 | Ultra | "K" = 3-Ply Unembossed, knurled; "G" = 3-ply HVS U19, glued |
| P3415 | 22981 | | 22982 | Ultra | "K" = 2-Ply Unembossed, knurled; "G" = 2-ply HVS U19, glued |
| P3416 | 22981 | 22960 | 22982 | Ultra | "K" = 3-Ply Unembossed, knurled; "G" = 3-ply HVS U19, glued |

Figure 2:
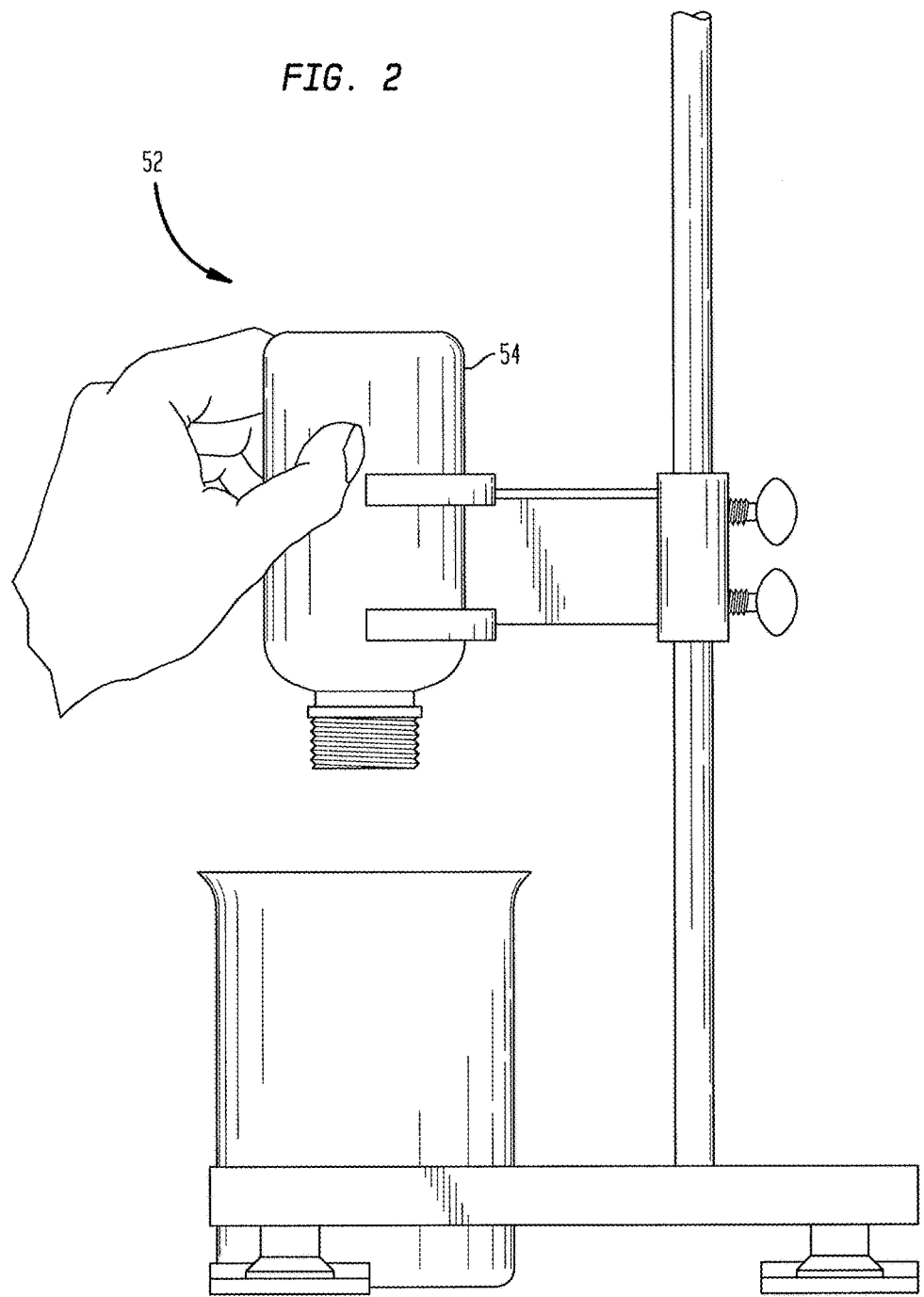
FIG. 2 is a schematic illustration of a fixture used for holding the test bottle used in the "Dispersibility Test" upright, while the contents are being drained therefrom.

*aperture basesheet -- a very open, porous construction similar to that shown in FIG. 1 of US 2004/0238135, but heavier.

TABLE 15

Finished Product Data

| Description | Basis Weight lb/3000 ft² | | Caliper 8 Sheet mils/8 sheet | | Softness Panel | | Tensile GM g/3 in. | | Wet Tens Finch CD (g/3 in.) | | Dry Lint BlackFelt (ΔL*) | | Dispersibility #shakes | |
|---|---|---|---|---|---|---|---|---|---|---|---|---|---|---|
| | Knurled | Glued | Knurled | Glued | Knurled | Glued | Knurled | Glued | Knurled | Glued | Knurled | Glued | Knurled | Glued |
| Wet Durable | | | | | | | | | | | | | | |
| P3403 (20% CMF) | 26.7 | 26.3 | 152 | 145 | 20.1 | 19.3 | 841 | 932 | 104 | 113 | 4.0 | 5.4 | 600 | 600 |
| P3404 (20% CMF) | 21.9 | 21.7 | 117 | 115 | 19.5 | 18.6 | 1,060 | 1,155 | 139 | 152 | 0.8 | 1.1 | 575 | 550 |
| P3405 (20% CMF) | 22.4 | 21.6 | 121 | 114 | 19.2 | 18.2 | 1,409 | 1,394 | 268 | 281 | 0.4 | 0.8 | 1,600 | 2,000 |
| P3406 (20% CMF) | 23.1 | 22.3 | 125 | 119 | 18.7 | 17.9 | 1,719 | 1,672 | 439 | 432 | −0.1 | 0.5 | 3,700 | 3,600 |
| P3407 (20% CMF) | 27.4 | | 161 | | 18.9 | | 1,406 | | 321 | | 0.2 | | 2,800 | |
| P3410 (20% CMF) | 24.2 | | 141 | | 19.2 | | 1,312 | | 287 | | 0.2 | | 1,800 | |
| 3-Ply Ultra, I.C. and Parity | | | | | | | | | | | | | | |
| P3412 (no CMF) | 28.1 | 27.5 | 166 | 155 | 19.2 | 18.7 | 903 | 946 | 86 | 86 | 2.3 | 2.4 | | |
| P3413 (10% CMF) | 29.4 | 28.8 | 168 | 157 | 19.5 | 18.3 | 1129 | 1,169 | 113 | 103 | 1.9 | 2.3 | | |
| 3-Ply Ultra, Superior | | | | | | | | | | | | | | |
| P3416 (13% CMF) | 45.2 | 43.9 | 236 | 204 | 19.7 | 18.9 | 1164 | 1,218 | 163 | 141 | 7.4 | 7.6 | | |
| 2-ply Ultra | | | | | | | | | | | | | | |
| P3411 (no CMF) | 30.7 | 31.0 | 151 | 154 | 19.2 | 18.5 | 917 | 909 | 117 | 101 | 4.5 | 6.2 | | |
| P3415 (10% CMF) | 29.7 | 29.2 | 152 | 150 | 19.7 | 19.3 | 706 | 700 | 91 | 90 | 7.2 | 5.8 | | |
| Other | | | | | | | | | | | | | | |
| 3-ply P3408 (20% CMF) | 37.1 | 35.1 | 206 | 179 | 19.6 | 18.0 | 1,434 | 1,714 | 226 | 274 | 4.4 | 5.2 | | |
| 2-ply P3409 (20% CMF) | 24.6 | 24.0 | 134 | 132 | 19.3 | 18.7 | 973 | 973 | 155 | 154 | 4.6 | 4.2 | | |

Knurled product is Unembossed. Glued product is embossed with U19

TABLE 16

| Description | Dispersibility # of Shakes | CD Wet Tensile Finch (gms/3-in.) | Basis weight, lb/3000 ft² |
|---|---|---|---|
| P3403K | 600 | 104 | 26.7 |
| P3404K | 575 | 139 | 21.9 |
| P3405K | 1600 | 268 | 22.4 |
| P3406K | 3700 | 439 | 23.1 |
| P3407K | 2800 | 321 | 27.4 |
| P3410K | 1800 | 287 | 24.2 |
| P3403G | 600 | 113 | 26.3 |
| P3404G | 550 | 152 | 21.7 |
| P3405G | 2000 | 281 | 21.6 |
| P3406G | 3600 | 432 | 22.3 |
| Charmin ® Ultra Soft | 400 | 71 | 29.0 |
| Quilted Northern ® Ultra Plush | 850 | 40 | 36.0 |
| Cottonelle ® Ultra Ave | 56 | 23 | 27.7 |
| Charmin ® Ultra Soft Ave | 349 | 61 | 28.9 |
| Charmin ® Ultra Strong Ave | 297 | 69 | 24.4 |
| QUILTED NORTHERN ® ULTRA | 997 | 42 | 36.8 |
| Charmin ® Basic Ave | 250 | 53 | 18.0 |
| Cottonelle ® Fresh | 20000+ | 710 | 48.0 |

The results, as set forth in Table 15, were considered unexpectedly good—especially in terms of softness. It was surprisingly found that not only was it possible to achieve close parity to Quilted Northern® Ultra Plush, but that, in one case, at least numerical superiority was achieved even though the margin of superiority was slight. Table 10, above, shows properties of an ultra-premium retail tissue, Assignee's Quilted Northern® Ultra Plush, and a competitive product that is apparently promoted at least partially on the basis of its strength, Charmin® Ultra Strong. Several knurled three-ply CWP products with CMF of this example were able to surpass the performance of Charmin® Ultra Strong in several ways: softness, higher bulk, higher wet strength, higher opacity, and much lower lint achieving these advantages at equal weights. The softness difference for P3406K, however, is not sufficiently large that it is entirely certain that the difference could be replicated in subsequent panels testing the same products. (Typically, we find that an improvement of 0.5 points of softness on the scales reported by our sensory panels will consistently be considered distinctly and noticeably softer.) The softness of the glued products was lower than what we would normally expect in comparison to the knurled. The reason for this deficiency is not known, but could easily lie more in the embossing and gluing techniques used rather than in the basesheets themselves. Even more surprisingly, it was found that the strength of P3403K was actually significantly higher than that of Quilted Northern® Ultra Plush, even though the basis weight of the softer, but stronger sheet, was less than 75% of Quilted Northern® Ultra Plush. Further, the sheet was dispersible, but exhibited sufficient wet strength to be usable pre-wetted. In terms of dry lint, this product also surpassed Quilted Northern® Ultra Plush, exhibiting a ΔL* of 4.0 as compared to 10.2 for Quilted Northern® Ultra Plush.

FIGS. 8A to 8D provide graphic comparisons of the most significant properties of the tissues to Quilted Northern® Ultra Plush, Quilted Northern® Soft & Strong, Charmin® Ultra Soft and Charmin® Ultrastrong.

Figure 8A:
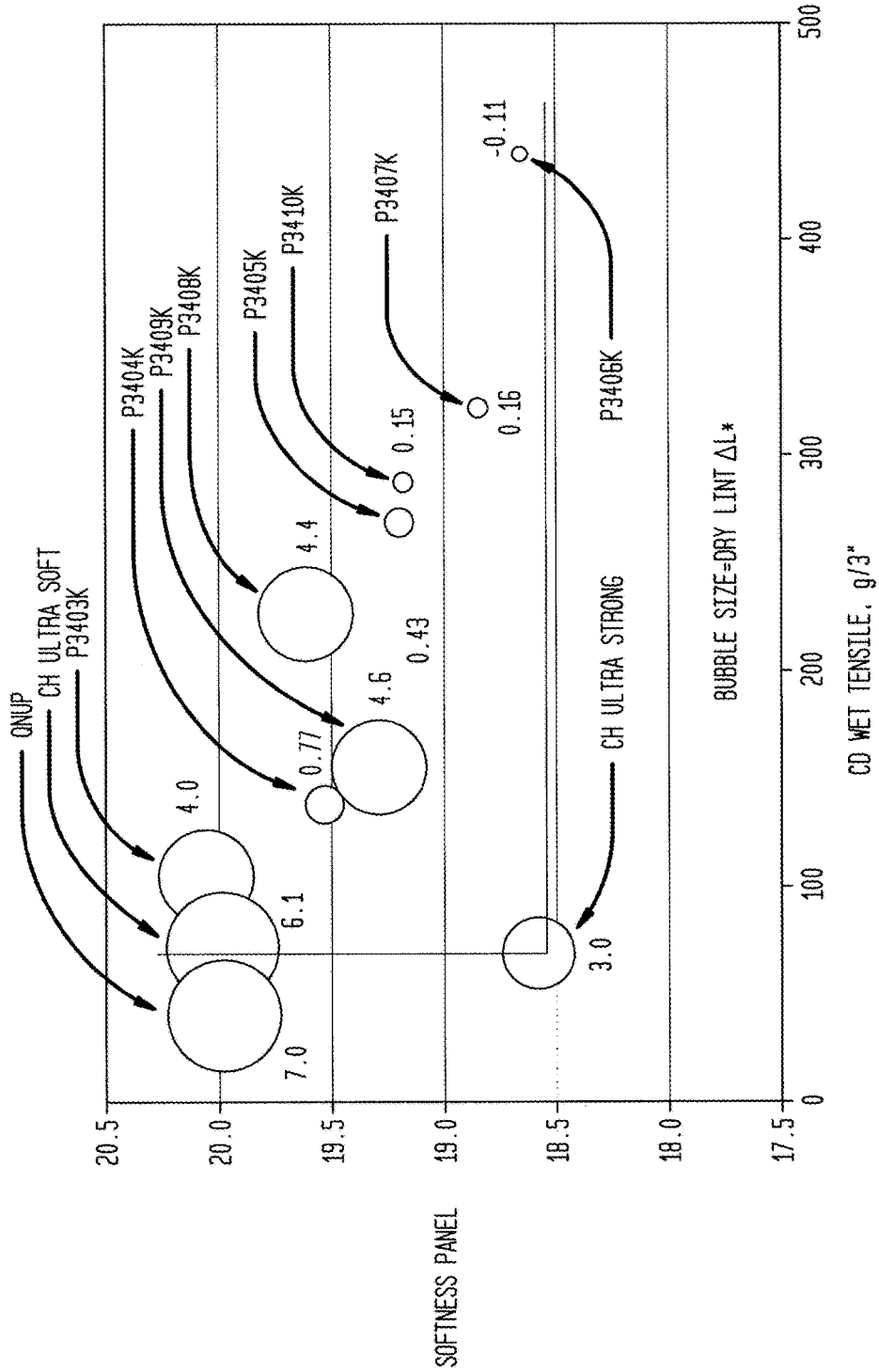
Figure 8B:
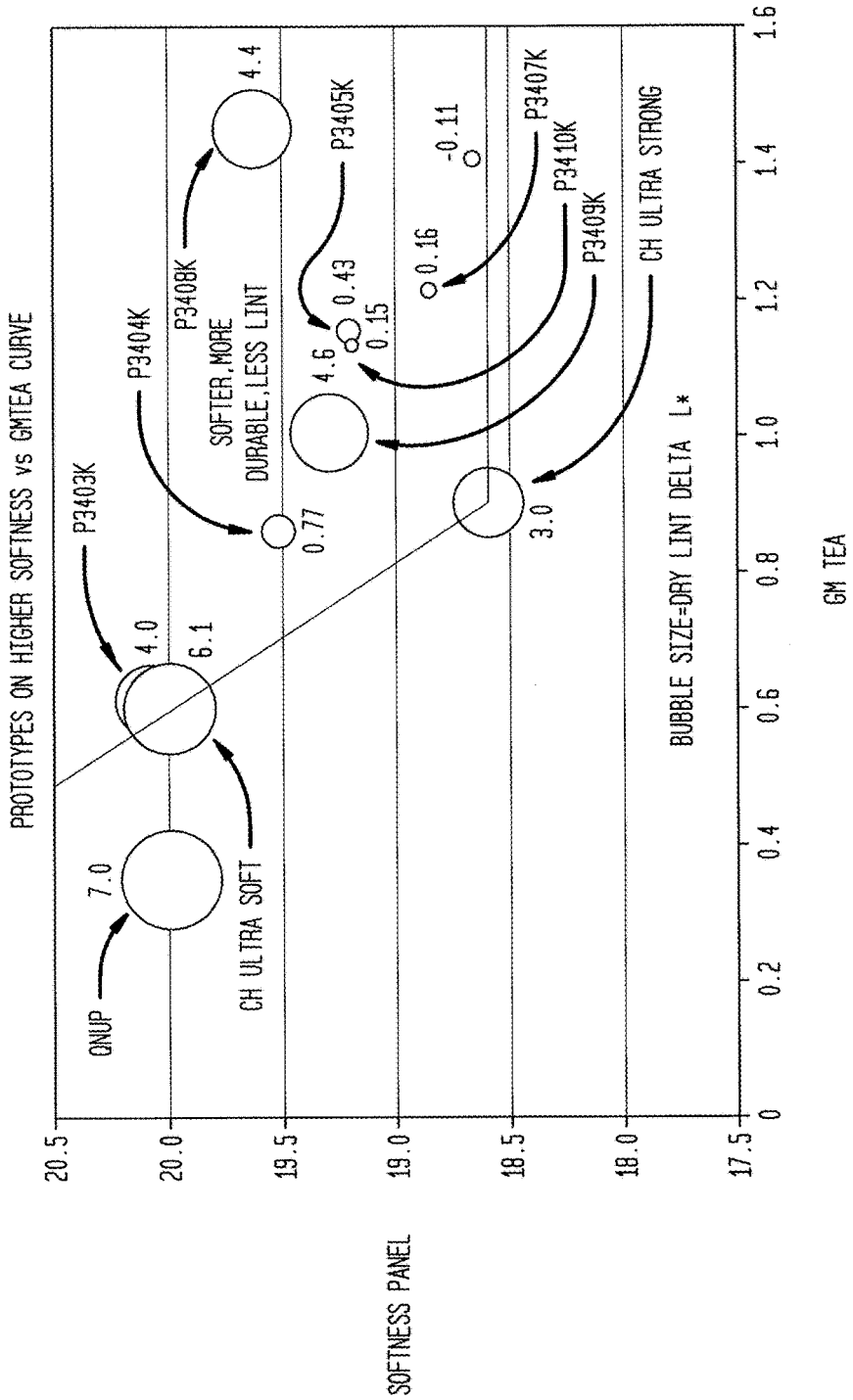
Figure 8D:
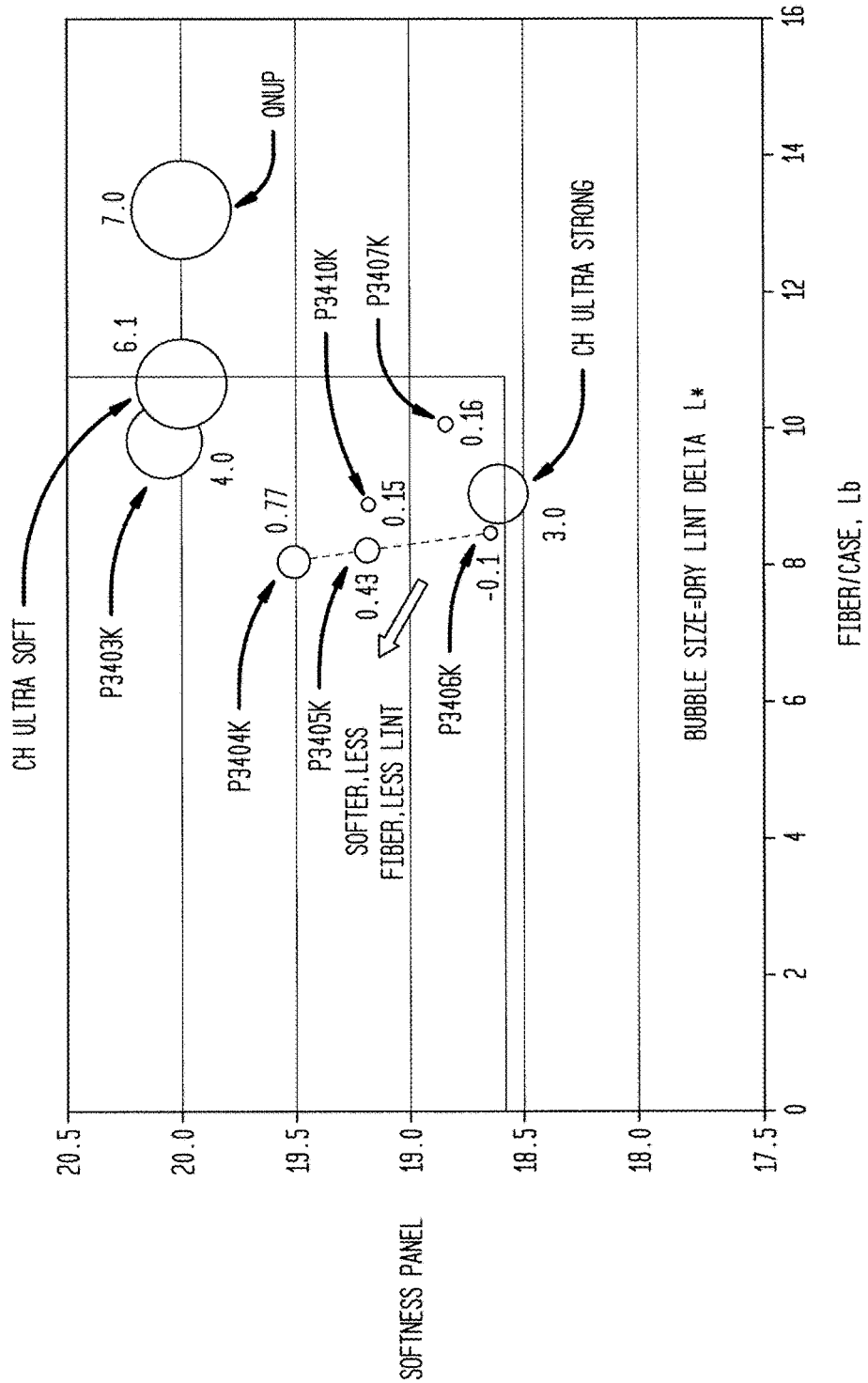
Figure 9A:
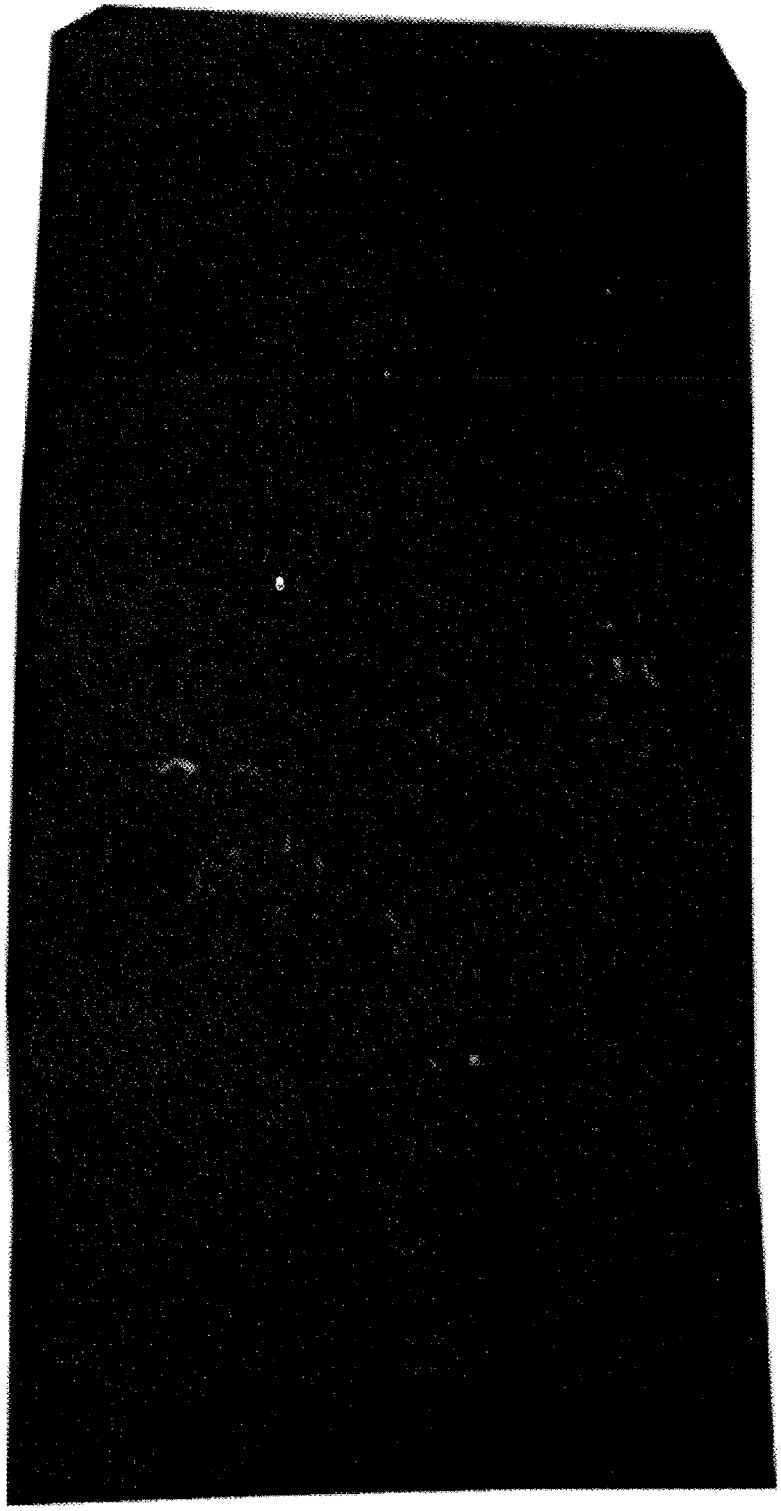
FIGS. 9A to 9E are photographs of black felts used in the "Wet Abrasion Lint Test" described herein, of tissues described in Example 3 hereof
Figure 9B:
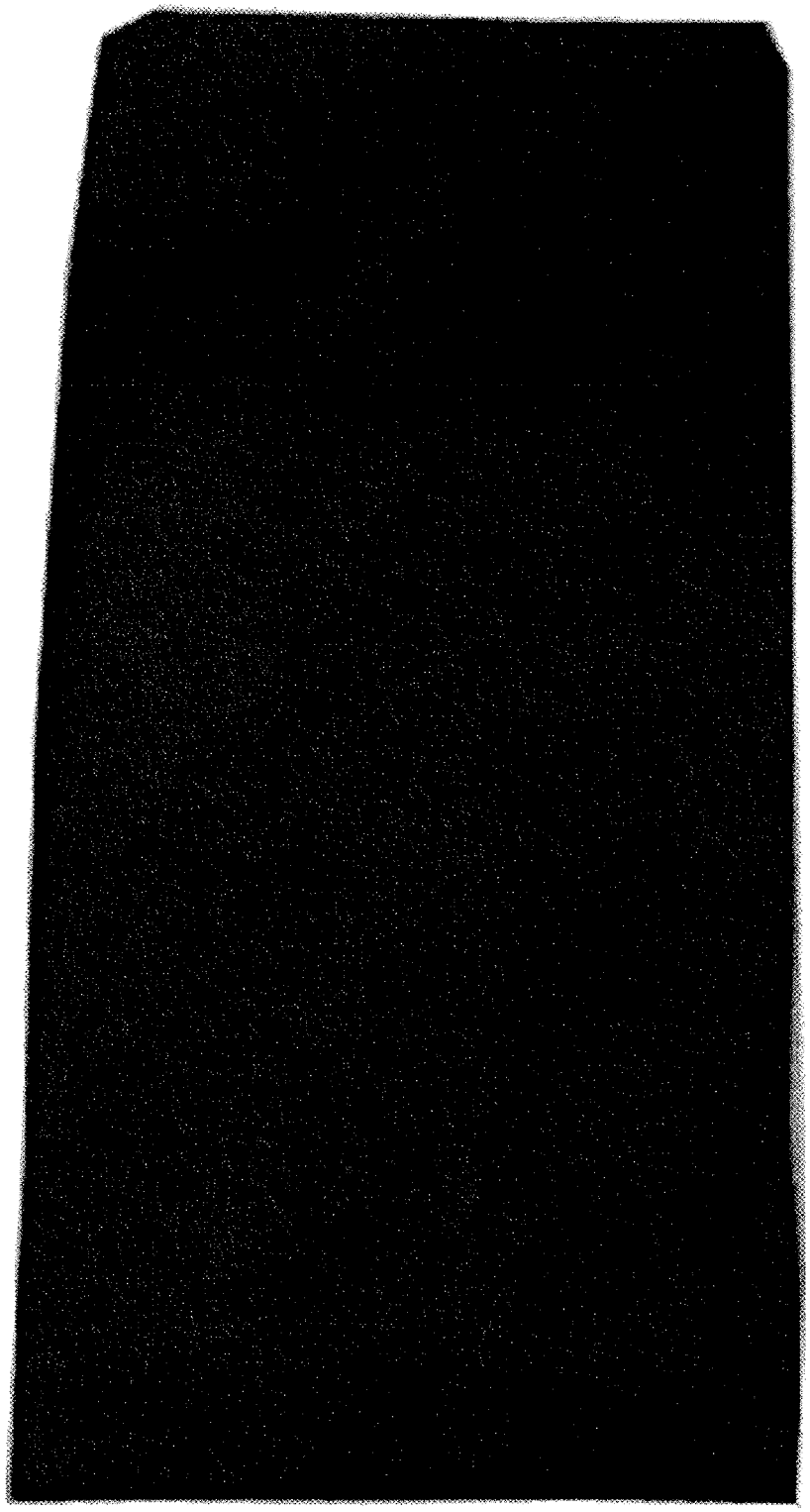
Figure 9C:
Figure 9D:
Figure 9E:
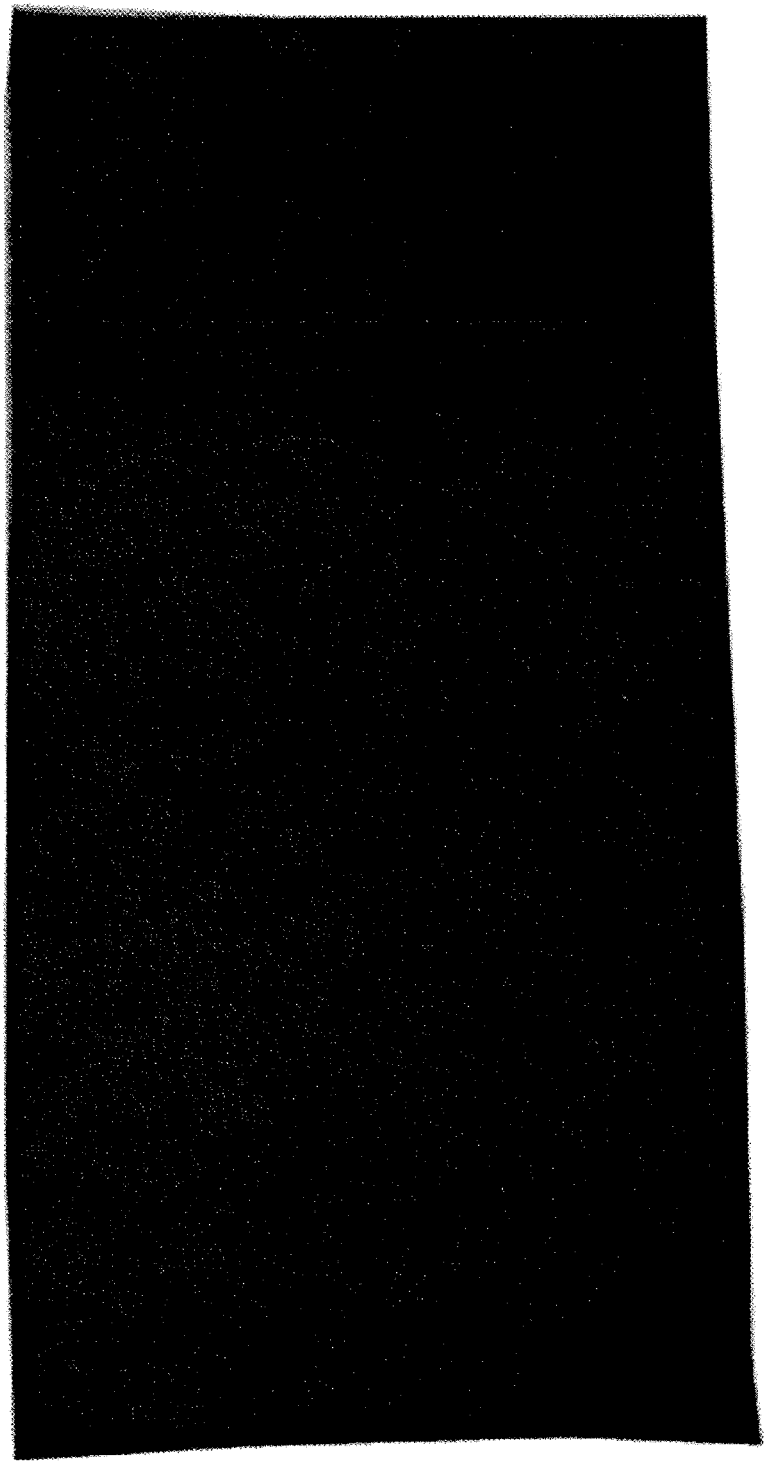

FIG. 8A demonstrates that P3403K, the wet linting of which is shown in FIG. 9A, is comparable in softness to Quilted Northern® Ultra Plush and Charmin® Ultra Soft, both of which currently are generally perceived as having very high softness by Assignee's sensory softness testing panels, while a comparison of FIGS. 9A and 9C demonstrates that Charmin® Ultra Soft is quite susceptible to wet linting, indicating that it would not generally be considered to be satisfactory for use pre-moistened, while P3405K leaves behind far less lint and so might be deemed to be acceptable for that use. FIG. 8A also illustrates that the dry linting of P3403K is somewhat less than that of either Charmin® Ultra Soft or Quilted Northern® Ultra Plush, which are not perceived as having significant quality issues in this regard. The comparison shown in FIGS. 9A to 9E visually portrays the qualitative results that considerable lint is left on the felt with the two Charmin® products, a much smaller, but detectable amount of lint is left behind with P3403K, while it is quite difficult to detect lint left behind with either P3405K or the Kimberly-Clark Cottonelle® Fresh. It is considered quite significant that P3405K achieves softness clearly exceeding that of Charmin® Ultra Strong, while leaving almost no lint behind on either of the wet linting test or the dry. See FIG. 9B. Quilted Northern® Ultra Plush and Quilted Northern® Soft & Strong are roughly comparable in wet linting to the two Charmin® products. FIG. 8B illustrates that P3403K achieves Total Energy Absorption, (TEA, a measure of toughness), equivalent to Charmin® Ultra Soft while P3405K, in addition to its remarkable resistance to linting, clearly surpasses Charmin® Ultra Strong both in toughness and softness. FIG. 8C illustrates the same advantages in term of tensile strength rather than toughness. FIG. 8D compares the fiber required for a statistical case among the various tissues examined, although it should be noted that this does not translate into savings due to the increased cost of the CMF as compared to wood pulp. Preliminary testing, done before the procedures for measuring dispersibility and wet lint were developed, indicated that high linting products, such as the two Charmin® tissues, were quite easily dispersed, as were the very soft products P3403G and P3403K, which exhibited moderate linting. The very low lint CMF containing products of this Example could be dispersed without undue difficulty, while the non-wovens, Cottonelle® Fresh and Always were far more difficult to disperse, if dispersible at all.

EXAMPLE 4

Figure 11:
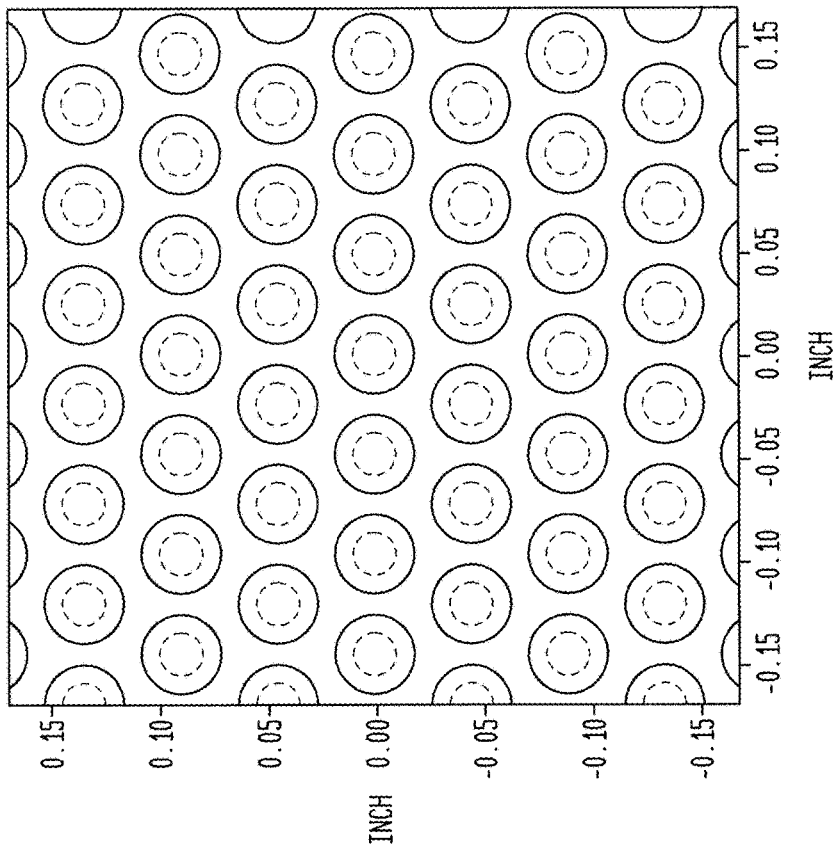
FIG. 11 is a schematic scale drawing of the perforated polymeric belt shown in FIG. 10.
Figure 10:
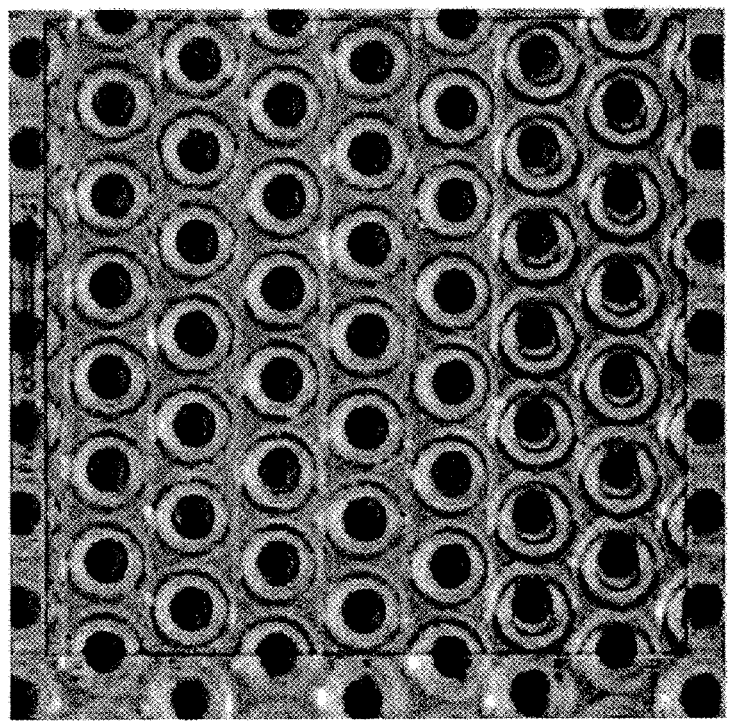

In an attempt to improve upon earlier wet-durable tissue made with the belt of FIG. 3, bath tissue was made with cellulose microfiber (CMF) and temporary wet strength using the belt shown in FIGS. 10 and 11. Table 17 below sets forth important parameters of the belt construction.

TABLE 17

Belt Geometry

| Parameters | Units | Dimensions |
|---|---|---|
| Sheet Side Hole CD Diameter | mm | 0.9652 |
| Sheet Side Hole MD Diameter | mm | 0.9652 |
| Sheet Side Hole CD/MD | CD/MD (unitless) | 1.0 |
| Sheet Side Hole Unit Area | mm$^2$ | 0.732 |
| Top Hole Rim Thickness | mm | |
| Sheet Side Hole % Open Area | % | 52.7 |
| Air Side Hole CD Diameter | mm | 0.5461 |
| Air Side Hole MD Diameter | mm | 0.5461 |
| Air Side Hole CD/MD | CD/MD (unitless) | 1.00 |
| Air Side Hole Unit Area | mm$^2$ | 0.234 |
| Air Side Hole % Open Area | % | 16.9 |
| Sheet Side/Air Side Area Ratio | Top/Bottom | 3.1 |
| Side Wall Angle CD 1 | ° (Degrees) | 67.3 |
| Side Wall Angle CD 2 | ° (Degrees) | 67.3 |
| Side Wall Angle MD 1 | ° (Degrees) | 67.3 |
| Side Wall Angle MD 2 | ° (Degrees) | 67.3 |
| Unit Volume | mil$^3$ | 15863 |
| Unit Volume | mm$^3$ | 0.260 |
| % Material Volume Removed | % | 37.5% |
| MD Land Distance | mm | 1.3016 |
| MD Land/MD Dia. Ratio | % | 134.9% |
| CD Land Distance | mm | 0.2589 |
| CD Land/CD Dia. Ratio | % | 26.82% |
| 1./width | Columns/cm | 8.17 |
| 1/height | Rows/cm | 8.82 |
| Holes per cm$^2$ | #/cm$^2$ | 72 |

Basesheets were made using generally those procedures used in Example 3. Basesheet properties are set forth in Table 18.

TABLE 18

Basesheet

| Description | 8 Sheet Caliper mils/8 sht | Basis Weight lb/3000 ft$^2$ | MD Tensile g/3 in. | MD Stretch % | CD Tensile g/3 in. | CD Stretch % | CD Wet Tens Finch Cured g/3 in. | GM Tensile g/3 in. | GM Break Modulus gms/% | CD Tensile Wet/Dry Unitless |
|---|---|---|---|---|---|---|---|---|---|---|
| 24482 | 48.7 | 8.0 | 467 | 31.8 | 374 | 9.5 | 104 | 418 | 24.3 | 0.28 |
| 24483 | 50.2 | 8.0 | 508 | 31.2 | 390 | 9.1 | 98 | 445 | 26.1 | 0.25 |
| 24484 | 47.0 | 8.0 | 507 | 30.7 | 387 | 9.5 | 98 | 443 | 26.3 | 0.25 |
| 24496* | 88.1 | 13.7 | 483 | 33.9 | 360 | 6.0 | 85 | 417 | 29.7 | 0.24 |
| 24499 | 73.6 | 13.5 | 595 | 29.8 | 444 | 5.4 | 113 | 513 | 40.3 | 0.25 |
| 24500 | 71.7 | 13.9 | 490 | 29.0 | 403 | 6.5 | 89 | 444 | 32.7 | 0.22 |
| 24501 | 71.1 | 13.6 | 527 | 28.3 | 462 | 6.4 | 108 | 493 | 35.5 | 0.23 |

*uncalendered

These products were converted into three-ply tissue product using the converting scheme set forth in Table 19, the finished tissue having the properties set forth in Table 20.

TABLE 19

(U19 Glue Laminated)

| Front Roll # | Middle Roll # | Back Roll # | Marry Roll Nip Open/Closed | Caliper | Roll Diameter |
|---|---|---|---|---|---|
| 24482 | 24483 | 24484 | open | 134 | 4.9 |
| 24500 | 24483 | 24484 | open | 153 | 4.9 |
| 24500 | 24496 | 24483 | open | 180 | |
| 24499 | 24501 | | open | 132 | |
| 24499 | 24501 | | open | | |
| 24482 | 24483 | 24484 | | | |
| 24496 | 24483 | 24484 | | | |

TABLE 20

Finished Product Properties

| Cell | Basis Weight lb/3000 ft² | 8 Sheet Caliper mils/ 8 sht | Tensile GM g/3 in. | Lint Black Felt Unitless | CD Wet Tens Finch Cured- g/3 in. | Softness Panel | Dispers. # of Shakes | MD Tensile g/3 in. | CD Tensile g/3 in. | GM Break Modulus g/% | Opacity MacBeth Opacity Units | Sheet Length in | Sheet Width in |
|---|---|---|---|---|---|---|---|---|---|---|---|---|---|
| 1 | 24.5 | 142 | 1,417 | 1.1 | 342 | 18.4 | 2,500 | 1,606 | 1,251 | 92.3 | 75.4 | 4.1 | 4.0 |
| 2 | 29.5 | 158 | 1,229 | 1.2 | 269 | 18.6 | 2,100 | 1,475 | 1,027 | 90.4 | 79.1 | 4.1 | 4.1 |
| 3 | 34.9 | 184 | 1,261 | 1.5 | 275 | 18.0 | 3,200 | 1,508 | 1,059 | 102.9 | 81.6 | 4.2 | 4.1 |
| 4 | 26.6 | 135 | 962 | 2.3 | 222 | 17.7 | 2,000 | 1,130 | 819 | 80.3 | 76.3 | 4.2 | 4.1 |
| 5 | 24.0 | 136 | 1,412 | 0.6 | 315 | 18.5 | 1,500 | 1,591 | 1,255 | 92.7 | 75.1 | 7.3 | 4.8 |
| 6 | 29.1 | 161 | 1,315 | 1.3 | 293 | 18.6 | 1,500 | 1,510 | 1,145 | 97.9 | 78.5 | 7.4 | 4.8 |
| 8 | 26.5 | 137 | 913 | 2.2 | 208 | 17.6 | 1,500 | 1,064 | 785 | 75.2 | 75.9 | 7.4 | 4.8 |

Even though the bath tissue of Example 3 made using the belt described and illustrated in FIG. 3 had a desirable combination of softness, wet durability, and low lint, achieving both premium softness as a dry tissue and sufficient wet tensile to be used for wet cleansing without pilling, the amount of temporary wet strength resin in the sheets was quite high, ranging up to 14 lb/ton resulting in a finished product with a wet tensile up to 439 g/3 in. Accordingly, we wished to investigate whether we could achieve satisfactory properties with a more moderate level of temporary wet strength resin.

Figure 12:
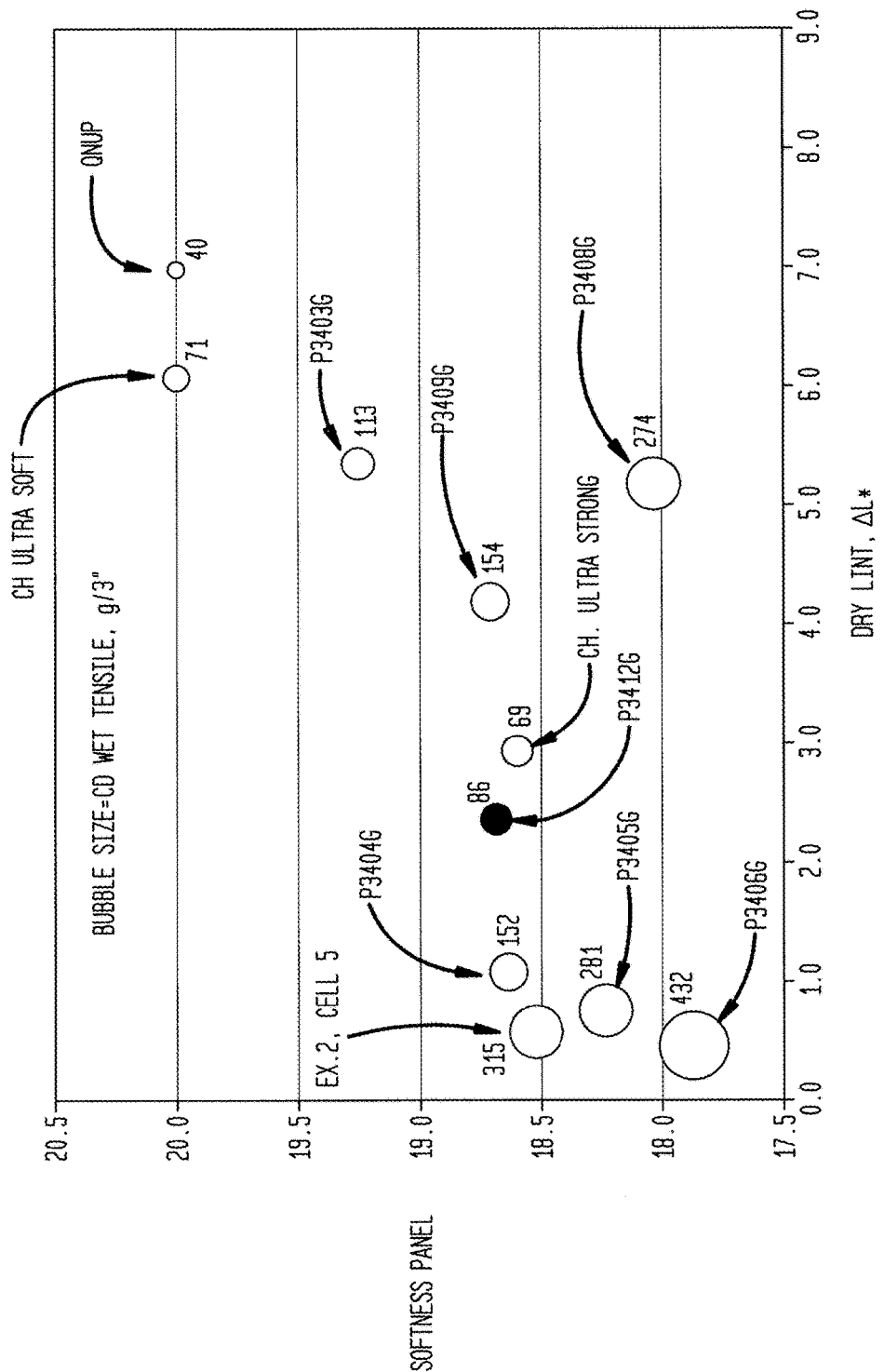
FIGS. 12 and 13 compare the Dry and Wet Lint properties of tissues of the present invention to commercially available tissues.
Figure 13:
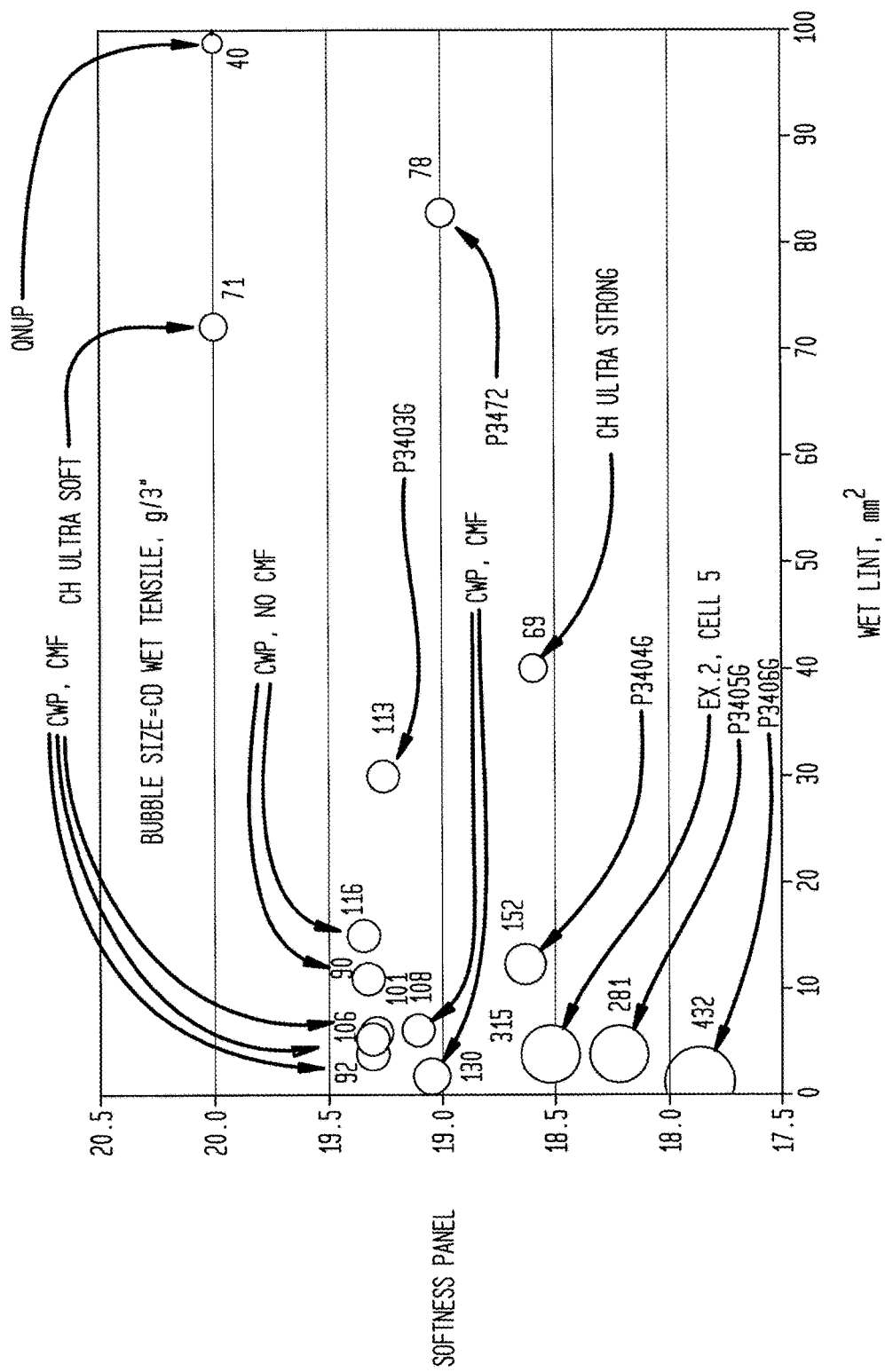

Several adjustments were made relative to the preceding trial. Basis weight was increased slightly, eucalyptus was increased in the Yankee layer, stretch was increased, and bulky fiber was added to the air layer (for stratified conditions). Basesheets at 7 lb/ream using the belt of FIG. 3 had caliper around 40 mil/8 sheets, and three-ply product had caliper around 120 mil/8 sheets. Increasing basis weight to 8 lb/ream was intended to get basesheet caliper into the upper 40's and finished product around 145 mil/8 sheets. The previous low-lint furnish comprising 60% NBSK, 15% eucalyptus, and 20% CMF yielded very low lint when combined with higher levels of temporary wet strength. In this Example 4, eucalyptus content was increased to 40%, to impart an even smoother surface, while maintaining low lint. Higher crepe was used to lower modulus. Hardwood BCTMP was used in the air layer in one cell for additional bulk. A glue-laminated three-ply prototype was made with a very desirable combination of softness, wet strength, and low pilling tendency: 18.4 softness panel rating, 342 g/3 in. CD wet tensile, 1.1 ΔL* dry lint. FIGS. 12 and 13 present the results of cell 5 of this Example 4 along with data from the previous Examples. It can be appreciated that the CD wet tensile is still quite high—ranging from 208 to 342, so even though these sheets had excellent softness, there is still the possibility of achieving higher softness by going to lower CD wet tensile as for most of these sheets. That works out to between 10 and 13 g/3 in. per pound of basis weight and we have discovered that about 8.5 g/3 in. per pound of basis weight is sufficient to render these CMF containing sheets usable pre-wetted.

Figure 21:
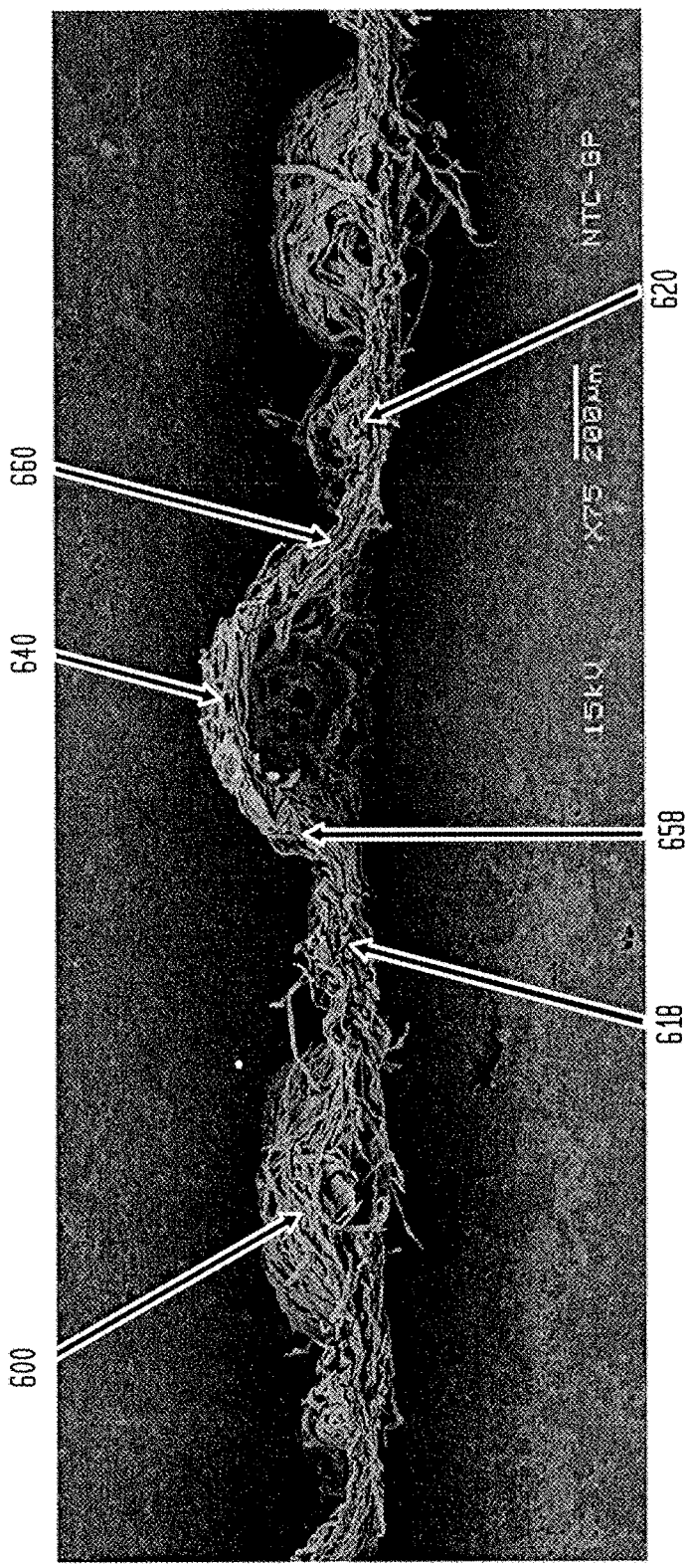
FIGS. 21 to 23 are sectional scanning electron micrographs (SEM's) illustrating domed structures having consolidated regions formed therein.
Figure 22:
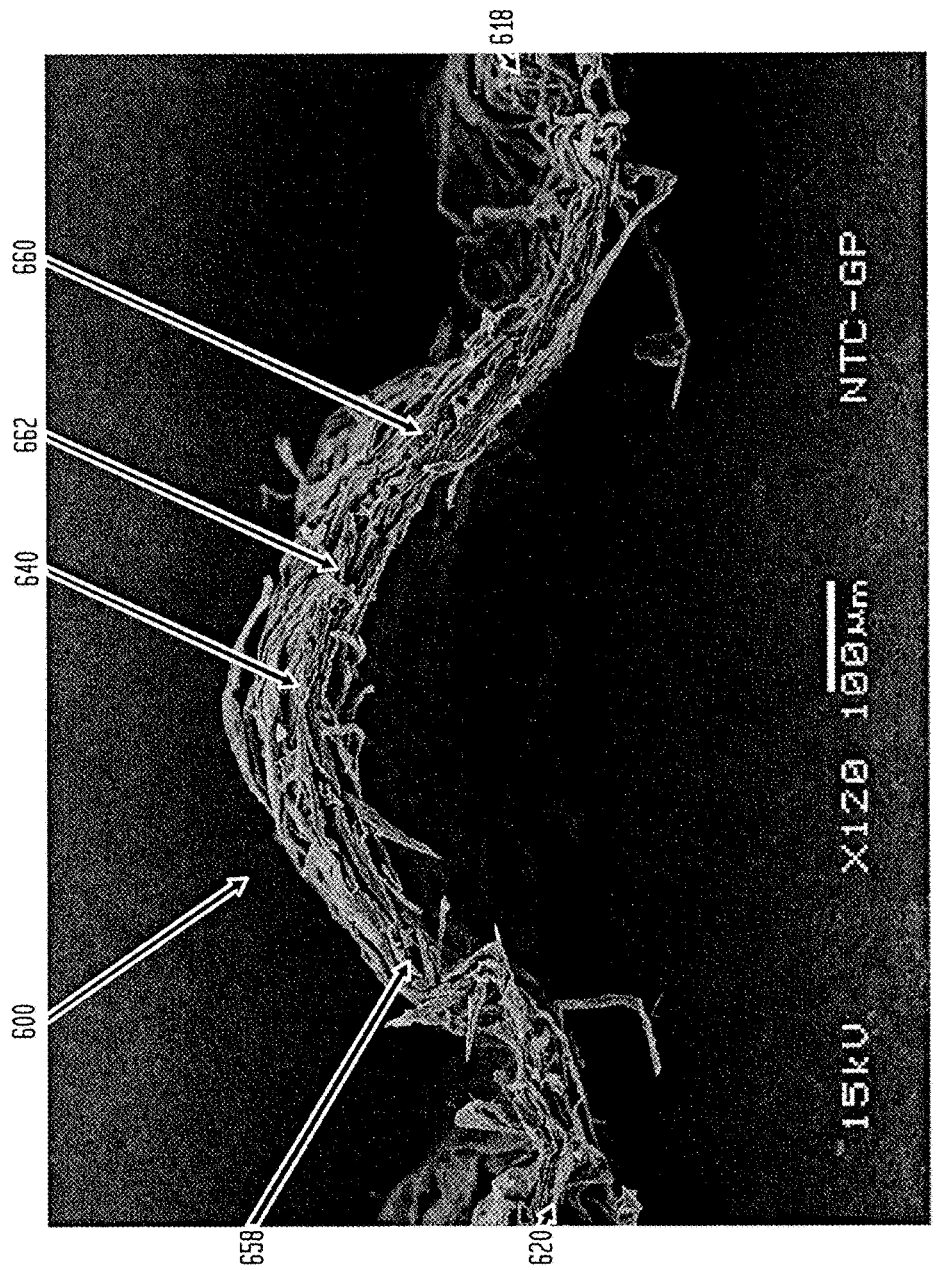
Figure 23:
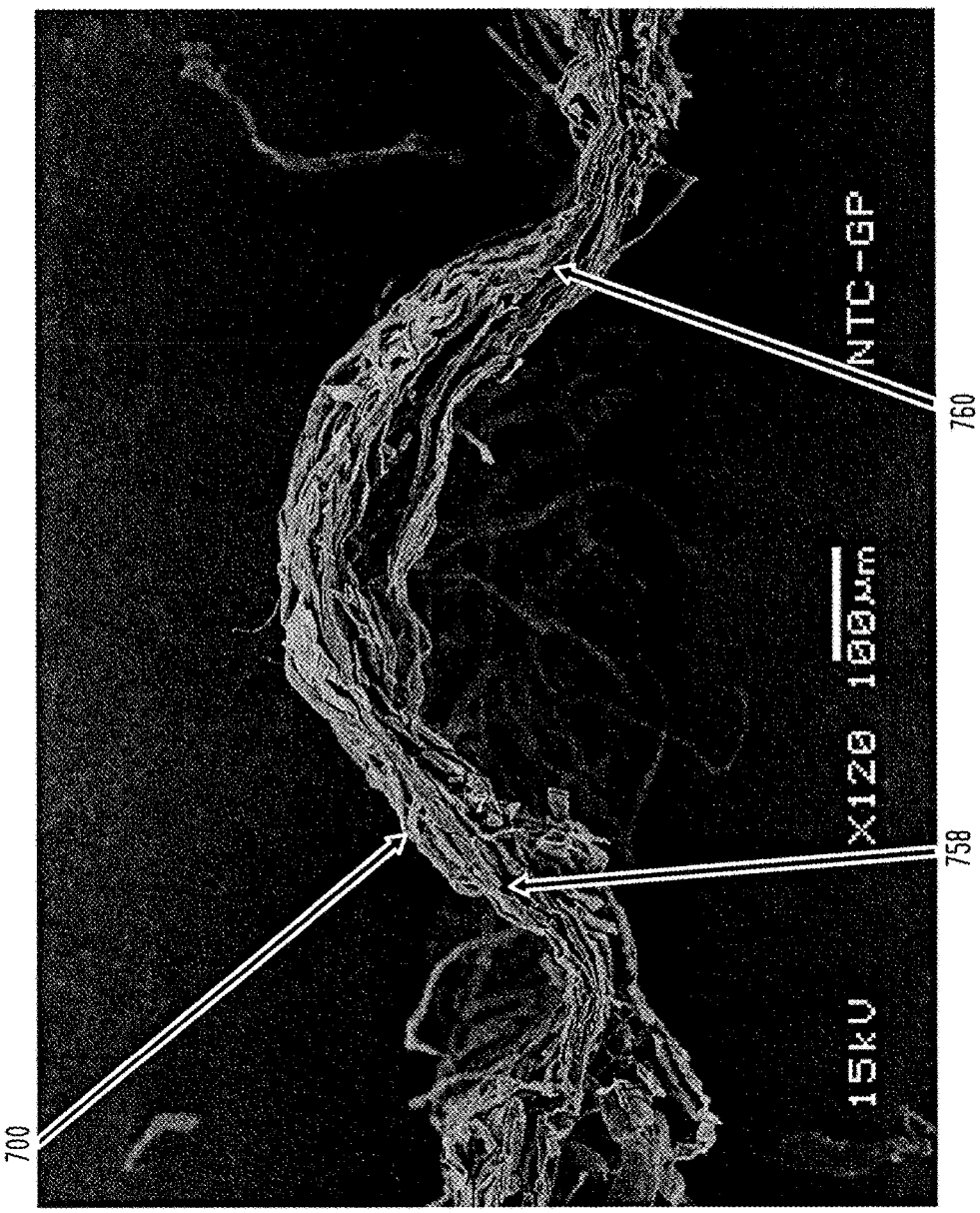

FIGS. 21 to 23 illustrate domed structures having consolidated regions formed therein. FIG. 21 is an SEM section (75×) along the machine direction (MD) of perforated polymeric belt creped basesheet 600, showing a domed area corresponding to a belt perforation as well as the densified pileated structure of the sheet. It is seen in FIG. 21 that the domed regions, such as region 640, have a "hollow" or domed structure with inclined and at least partially densified sidewall areas, while surrounding areas 618, 620 are densified, but less so than transition areas. Sidewall areas 658, 660 are inflected upwardly and inwardly and are so highly densified as to become consolidated, especially, about the base of the dome. It is believed that these regions contribute to the very high caliper and roll firmness observed. The consolidated sidewall areas form transition areas from the densified fibrous, planar network between the domes to the domed features of the sheet and form distinct regions that may extend completely around and circumscribe the domes at their bases, or may be densified in a horseshoe or bowed shape only around a portion of the bases of the domes. At least portions of the transition areas are consolidated and also inflected upwardly and inwardly.

FIG. 22 is another SEM (120×) along the MD of basesheet 600 showing hollow 640, as well as consolidated sidewall areas 658 and 660. It is seen in this SEM that the cap 662 is fiber-enriched, of a relatively high basis weight as compared with areas 618, 620, 658, 660. CD fiber orientation bias is also apparent in the sidewalls and dome.

FIG. 23 is an SEM section (120×) along the machine direction (MD) of basesheet 700, in which consolidated sidewall areas 758, 760 are densified and are inflected inwardly and upwardly.

Figure 24:
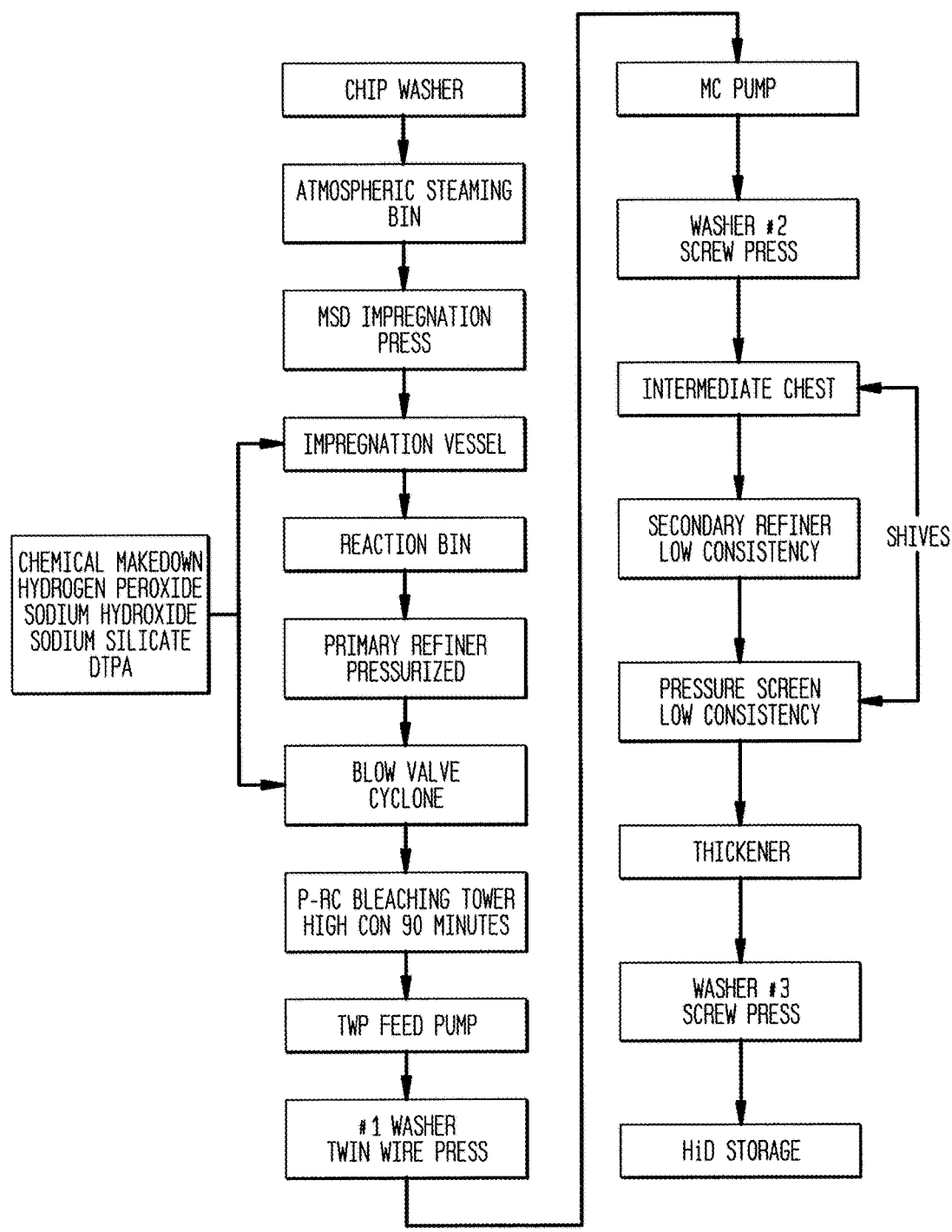
FIG. 24 is a schematic of the process of preparing eucalyptus APMP.

As illustrated in FIG. 24, the process for producing high lignin eucalyptus by pre-conditioning refiner chemical alkaline peroxide mechanical pulping consists of five main process steps:

1. Impregnation: Wood chips (or plant fibers) are compressed in a large screw press and discharged into an inclined (atmospheric) impregnation vessel. The vessel contains a mixture of chelant, hydrogen peroxide and caustic. The chemicals soften the chips and begin the bleaching process.

2. High Consistency Pressurized Refining: The impregnated chips drain as they are lifted out of the impregnation vessel and are fed through a high consistency refiner. The refiner separates the chips into individual fibers and provides heat to drive the bleaching reactions. Hydrogen peroxide is injected into the refiner discharge to boost the brightness. The hot pulp is discharged into an atmospheric tank and achieves full brightness after 30 to 90 minutes of retention.

3. Low consistency secondary refining: A final refining pass is done at low consistency to develop the desired fiber properties and to complete fiberization of any shives.

4. Shive Screening: The pulp is screened to separate shives from the fully individualized fibers. The rejects are fed back into the low consistency refiner to complete separation into individual fibers.

5. Washing: A tissue grade system would use three stages of presses to separate residual bleaching chemicals and anionic trash formed in the process.

For further information concerning pre-conditioning refiner chemical alkaline peroxide mechanical pulping, see:

Xu, U.S. Patent Application Publication No. 2010/0263815 A1, now U.S. Pat. No. 8,216,423, "Multi-Stage AP Mechanical Pulping With Refiner Blow Line Treatment", Oct. 21, 2010; Herkel et al., U.S. Patent Application Publication No. 2010/0186910 A1, now U.S. Pat. No. 8,048,263, "Four Stage Alkaline Peroxide Mechanical Pulpings", Jul. 29, 2010; Sabourin, U.S. Patent Application Publication No. 2008/0066877 A1, now U.S. Pat. No. 7,758,720, "High Defiberization Pretreatment Process For Mechanical Refining", Mar. 20, 2008; Herkel, U.S. Patent Application Publication No. 2004/0200586 A1, "Four Stage Alkaline Peroxide Mechanical Pulping", Oct. 14, 2004; Sabourin, U.S. Pat. No. 7,892,400 B2, "High Defiberization Chip Pretreatment Apparatus", Feb. 22, 2011; Sabourin, U.S. Pat. No. 7,758,721 B2, "Pulping Process With High Defiberization Chip Pretreatment", Jul. 20, 2010; Sabourin, U.S. Pat. No. 7,300,541 B2, "High Defiberization Chip Pretreatment", Nov. 27, 2007; Sabourin, U.S. Pat. No. 6,899,791 B2, "Method Of Pretreating Lignocellulose Fiber-Containing Material In A Pulp Refining Process", May 31, 2005; Xu, U.S. Patent Application Publication No. 2004/0069247 A1., "Multi-Stage AP Mechanical Pulping With Refiner Blow Line Treatment", Apr. 15, 2004; and Xu et al., International Publication No. WO 03/008703 A1; "Four Stage Alkaline Peroxide Mechanical Pulping", Jan. 30, 2003.

Table 21 sets forth suitable process details for preparation of eucalyptus APMP for use in the present invention.

TABLE 21

Processing Conditions for eucalyptus APMP

| SAMPLE FURNISH | | A1<br>I1 | A2<br>A1 | A3<br>A1 | A4<br>A1 | A5<br>A1 | A6<br>I1 | A7<br>A6 | A8<br>A6 | A9<br>A6 | A10<br>A6 |
|---|---|---|---|---|---|---|---|---|---|---|---|
| kWh/ODMT | PASS | 584 | 87 | 181 | 301 | 322 | 576 | 78 | 140 | 187 | 226 |
| APPLIED | Total | 655 | 742 | 836 | 1137 | 1158 | 647 | 725 | 787 | 974 | 1013 |
| Total Alkalinity | | 1.1 | 1.1 | 1.1 | 1.1 | 1.1 | 1.1 | 1.1 | 1.1 | 1.1 | 1.1 |
| % Impregnation | | | | | | | | | | | |
| Refiner | | 5.6 | 5.6 | 5.6 | 5.6 | 5.6 | 10 | 10 | 10 | 10 | 10 |
| Total Applied | | 6.7 | 6.7 | 6.7 | 6.7 | 6.7 | 11.1 | 11.1 | 11.1 | 11.1 | 11.1 |
| Residual | | 0.47 | 0.47 | 0.47 | 0.47 | 0.51 | 2.01 | 2.01 | 2.01 | 2.01 | 2.94 |
| Net | | 6.23 | 6.23 | 6.23 | 6.23 | 6.19 | 9.09 | 9.09 | 9.09 | 9.09 | 8.16 |
| Hydrogen Peroxide | | 1.1 | 1.1 | 1.1 | 1.1 | 1.1 | 1.1 | 1.1 | 1.1 | 1.1 | 1.1 |
| % Impregnation | | | | | | | | | | | |
| Refiner | | 9.6 | 9.6 | 9.6 | 9.6 | 9.6 | 11.9 | 11.9 | 11.9 | 11.9 | 11.9 |
| Total Applied | | 10.7 | 10.7 | 10.7 | 10.7 | 10.7 | 13 | 13 | 13 | 13 | 13 |
| Residual | | 4.57 | 4.57 | 4.57 | 4.57 | 3.33 | 0.92 | 0.92 | 0.92 | 0.92 | 0.74 |
| Net | | 6.13 | 6.13 | 6.13 | 6.13 | 7.37 | 12.08 | 12.08 | 12.08 | 12.08 | 12.26 |
| FREENESS (CSF) | | 577 | 474 | 427 | 344 | 335 | 541 | 448 | 396 | 317 | 307 |
| DENSITY | | 0.27 | 0.3 | 0.27 | 0.34 | 0.36 | 0.36 | 0.38 | 0.41 | 0.46 | 0.47 |
| BULK (cm$^3$/g) | | 3.69 | 3.28 | 3.68 | 2.92 | 2.81 | 2.78 | 2.62 | 2.43 | 2.15 | 2.11 |
| BURST INDEX<br>(kPa · m$^2$/g) | | 0.59 | 0.84 | 1.07 | 1.47 | 1.44 | 1.1 | 1.6 | 1.99 | 2.38 | 2.73 |
| TEAR INDEX<br>(mN · m$^2$/g) | | 3.7 | 4.5 | 4.7 | 4.8 | 4.9 | 5.9 | 6.6 | 6.1 | 6.1 | 6 |
| TENSILE INDEX<br>(N · m/g) | | 16 | 23.7 | 28.3 | 34.6 | 38 | 28.7 | 36.7 | 42.2 | 52.6 | 55 |
| Breaking Length km | | 1.6 | 2.4 | 2.9 | 3.5 | 3.9 | 2.9 | 3.7 | 4.3 | 5.4 | 5.6 |
| % STRETCH | | 0.86 | 1.13 | 1.33 | 1.52 | 1.65 | 1.21 | 1.49 | 1.7 | 2.07 | 2.34 |
| TEA (J/m$^2$) | | 4.81 | 9.33 | 13.38 | 19.04 | 22.92 | 12.56 | 19.47 | 25.92 | 39.63 | 49.01 |
| ABSORPTION<br>COEFF. (m | | 0.21 | 0.2 | 0.2 | 0.21 | 0.22 | 0.28 | 0.27 | 0.23 | 0.25 | 0.25 |
| % OPACITY | | 80.7 | 81.1 | 82.5 | 82.9 | 83.5 | 79.7 | 79.9 | 80.6 | 80.2 | 80.8 |
| SCATT. COEFF.<br>(m$^2$/kg) | | 47 | 48.2 | 52 | 52.8 | 54 | 42.7 | 45.3 | 46.7 | 45.8 | 46.2 |
| ISO BRIGHTNESS | | 85.6 | 85.9 | 85.8 | 86 | 85.4 | 84.9 | 85.4 | 85.2 | 84.8 | 84.7 |
| % SHIVES<br>(PULMAC-0.10 mm) | | 12.34 | 6.98 | 4 | 0.78 | 0.68 | 11.84 | 5.54 | 2.68 | 1.08 | 0.78 |
| LENGTH<br>WEIGHTED AVG<br>LNG (mm) | | 0.893 | 0.845 | 0.831 | 0.782 | 0.762 | 0.806 | 0.813 | 0.84 | 0.784 | 0.772 |
| ARITHMETIC AVG.<br>LENGTH (mm) | | 0.455 | 0.446 | 0.446 | 0.451 | 0.447 | 0.455 | 0.448 | 0.447 | 0.453 | 0.452 |
| WGT WEIGHTED<br>AVG LNG (mm) | | 1.87 | 1.57 | 1.54 | 1.22 | 1.12 | 1.3 | 1.37 | 1.65 | 1.19 | 1.2 |

TABLE 21-continued

Processing Conditions for eucalyptus APMP

|  | A1 | A2 | A3 | A4 | A5 | A6 | A7 | A8 | A9 | A10 |
|---|---|---|---|---|---|---|---|---|---|---|
| SAMPLE FURNISH | I1 | A1 | A1 | A1 | A1 | I1 | A6 | A6 | A6 | A6 |
| AVERAGE WIDTH (pm) | 32.7 | 31.91 | 31.23 | 29.46 | 29.15 |  | 31.07 | 32.15 | 29.52 | 29.05 |
| SURFACE AREA ($m^2$) | 1155 | 1060 | 1305 | 1371 | 1592 | 1467 | 1277 | 1045 | 1629 | 1465 |
| FIBER CLASS % ON 14 MESH | 10.1 | 5.9 | 3.2 | 1.1 | 0.9 | 9.2 | 4.7 | 3.1 | 0.8 | 0.6 |
| % ON 28 MESH | 15.1 | 14.4 | 11.5 | 5.3 | 4.7 | 16 | 13 | 11.4 | 6.4 | 4.7 |
| % ON 48 MESH | 26.4 | 29.8 | 31.3 | 34.7 | 33.4 | 27.1 | 29.6 | 34 | 35.2 | 35.6 |
| % ON 100 MESH | 20.8 | 20.8 | 22 | 25.4 | 24.2 | 21.1 | 22 | 23.7 | 24.3 | 25 |
| % ON 200 MESH | 14 | 13.8 | 14.4 | 16.6 | 15.9 | 13.1 | 14.1 | 14.6 | 16.2 | 16.2 |
| % THRU 200 MESH | 13.6 | 15.3 | 17.6 | 16.9 | 20.9 | 13.5 | 16.6 | 13.2 | 17.1 | 17.9 |
| +28 MESH | 25.2 | 20.3 | 14.7 | 6.4 | 5.6 | 25.2 | 17.7 | 14.5 | 7.2 | 5.3 |

EXAMPLE 5

This example is taken from U.S. Provisional Patent Application No. 61/574,200, entitled "High Softness, High Durability Bath Tissue Incorporating High Lignin Eucalyptus Fiber", filed on Jul. 28, 2011, naming Jeffrey A. Lee and Daniel W. Sumnicht as inventors, illustrating the suitability of eucalyptus pre-conditioning refiner chemical alkaline peroxide mechanical pulp referred to herein as eucalyptus APMP for short. We have found that we can get surprisingly good softness, bulk and wet properties using eucalyptus APMP, in conjunction with relatively low contents of CMF, even in CWP products. Accordingly, it is evident that eucalyptus APMP can be substituted into the formulations described elsewhere in this application to significant benefit, particularly, in cases where the amount of CMF is below 20% by weight.

Experimental Procedure

Pulps were distributed from Tanks according to Table 22. The strategy for the outer plies was to make a Yankee layer with kraft pulp and good durability with a layer of high-bulk APMP or other integrated furnish. The middle ply was homogeneously formed with a high (65%) percentage of APMP to maximize bulk or 100% southern kraft. P6 high bulk APMP was used for outer plies, and P3 APMP was used for the middle ply. Marathon NBSK was unrefined. The source of eucalyptus was Votorantim Celulose e Papel (VCP), aka Fibria, Sao Paulo, Brazil.

TABLE 22

|  | Tank 1, Air layer | | Tank 3, Yankee layer | | Total | |
|---|---|---|---|---|---|---|
| Cell | B.W. | Pulp | B.W | Pulp | BW | Purpose |
| Stratified | | | | | | |
| 1 | 3.9 | P6 APMP | 7.1 | 50/50 Mar./Euc. | 11 | Outer plies |
| 2 | 4.4 | P6 APMP | 8.2 | 50/50 Mar./Euc. | 12.6 | Outer plies |
| 3 | 4.5 | P6 APMP | 6.5 | 18/41/41 CMF/Mar./Euc. | 11 | Outer plies |
| 7 | 3.9 | 40/60 P3 APMP/Fibria | 7.1 | 15/42/43 CMF/Mar./Euc. | 11 | Outer plies |
| 8 | 5.5 | 50/50SSWK/SHWK | 7.1 | 15/42/43 CMF/Mar./Euc. | 12.6 | Outer plies |
| 9 | 6.2 | 50/50 SSWK/SHWK | 6.2 | 20% CMF/80% Euc. Kraft | 12.4 | Outer plies |
| Homogeneous | | | | | | |
| Cell | B.W. | Pulp | | | | Purpose |
| 4 | 12.6 | 65/35 P3 APMP/Mar. | | | | Middle ply |
| 5 | 11 | 65/35 P3 APMP/Mar. | | | | Middle ply |
| 6 | 12.6 | 50/50 SSWK/SHWK | | | | Middle ply |
| 10 |  | 50/50 SSWK/SHWK | | | | Middle ply, No FJ 98 |

Mar. = Marathon NBSK

Nalkat® 2020 was added as an "anionic trash killer" at 5 lb/ton APMP. This was done to prevent trash from poorly washed pilot APMP from interfering with retention of temporary wet strength. GP-C, an imidazolinum type softener, was added to the static mixer at 3 lb/ton APMP. T1 and T3 pH were adjusted to 5.0 to 5.5 with sulfuric acid to optimize retention of temporary wet strength. FJ98 (low molecular weight slightly cationic glyoxalated polyacrylamide temporary wet strength agent) was added into the pump suction at 6 lb/ton kraft pulp. GP-C was added at 3 lb/ton Yankee layer just before the fan pump.

All sheets for outer plies were calendered and had a geometric mean tensile (GMT) target of 350 g/3 in. and cross machine direction wet tensile (CDWT) target of 40 g/3 in. Sheets for middle plies were uncalendered and creped with a 10 degree bevel blade. Tensile control was achieved by increasing FJ98 or increasing debonder as necessary. A reel crepe of 25% was used for all basesheets. A 15° crepe blade was used for outer plies. In some cases, use of creping adhesive could be dispensed with, so water alone could be applied through the Yankee spray, as sufficient adhesion for satisfactory creping was provided by FJ98 and the hemicellulose remaining in the eucalyptus APMP. In other cases, when debonder in the sheet interfered with adhesion, it was desirable to apply about 0.25 to 0.5 lb/ton PAE coating to the Yankee. A sheet temperature of 230° F. was targeted. Only Yankee steam (no hood) was necessary for drying.

Method of Analysis

Results set forth in Table 23 were obtained when converted into finished product and evaluated for basis weight, caliper, wet and dry tensiles, softness, wet and dry lint and dispersibility. FIG. 14 sets forth a desirable design for a three-ply bath tissue 4-10 product utilizing eucalyptus APMP, in which upper ply 4-12 comprising two strata 4-14 and 4-16, in which upper stratum 4-14 comprising 50% northern bleached softwood kraft fiber and 50% by weight of eucalyptus kraft has a basis weight of about 7.1 lbs per 3000 sq ft ream; lower stratum 4-16 comprising 100% P6 eucalyptus APMP has basis weight of 3.9 lbs per 300 sq ft ream; while interior ply 4-18 comprising 65% P3 APMP and 35% by weight of northern bleached softwood kraft has a basis weight of 11 lbs/ream while lower ply 4-20 comprising two strata 4-22 and 4-24, in which lower stratum 4-24 comprising 50% northern bleached softwood kraft fiber and 50% by weight of eucalyptus kraft has a basis weight of about 7.1 lbs per 3000 sq ft ream; and upper stratum 4-22 comprising 100% P6 eucalyptus APMP has a basis weight of 3.9 lbs per 300 sq ft ream. It can be observed that upper ply 4-12 and interior ply 4-18 have been embossed together while lower ply 4-20 is relatively planar and is preferably unembossed. While the configuration shown in FIG. 14 is somewhat more convenient for manufacturing, in many instances, lower ply 4-20 will be inverted so that stratum 4-22 is on an exterior surface of the sheet to take advantage of its usually superior tactile properties.

Table 23 summarizes the properties of CWP prototypes wherein the three-ply prototypes therein are made having a structure like that illustrated in FIG. 14. Where "knurl" is indicated in the converting column, interior ply 4-18 was joined to lower ply 4-20 by knurling in a meandering path. Where "glue" is indicated in the converting column, the plies were joined to each other by glue lamination. Note that the last two rows provide a comparison to Quilted Northern® Ultra Plush bath tissue and prototypes made using a newer technology, in which a nascent web is creped off of a transfer cylinder at between 30% and 60% consistency. Table 24 sets forth details concerning the structure of each glue laminated product; while Tables 24A-24G set forth further details on the physical properties of the finished products and basesheets, the finished product composition, and the converting parameters used for of each of the finished glue laminated products. Tables 25A-25D do the same for the knurled products. Tables 26 to 28 delineate the properties and construction of CWP sheets made using a high bulk birch pulp manufactured by a high yield pulping process.

TABLE 23

Summary of CWP prototypes.

| Item | Description | Basis weight, lb/3000 ft² | Caliper, mil/8 sht | GMT, g/3 in. | Softness | CD Wet, g/3 in. | Dry Lint, ΔL* | Wet lint, mm² | Dispersibility, #shakes | Converting |
|---|---|---|---|---|---|---|---|---|---|---|
| 1 | High-bulk mechanical HW w/CMF | 27.0 | 131 | 888 | 19.7 | 193 | 0.4 | | | 2-ply, HVS9 knurl |
| 2 | High-bulk mechanical HW w/CMF | 37.7 | 174 | 899 | 20.0 | 192 | −0.1 | | | 2-ply, HVS9 knurl |
| 3 | High durable no cmf | 27.0 | 101 | 2405 | 17.5 | 342 | 0.2 | 1 | | 3-ply, U19 lines, glue |
| 4 | Med durable no cmf | 28.1 | 95 | 2076 | 18.1 | 267 | 0.9 | 7 | | 3-ply, U19 lines, glue |
| 5 | Less durable no cmf | 28.4 | 105 | 1495 | 18.5 | 193 | 1.9 | 12 | | 3-ply, U19 lines, glue |
| 6 | Less durable 20% cmf | 26.7 | 95 | 2034 | 17.8 | 229 | 0.8 | 3 | | 3-ply, U19 lines, glue |
| 7 | High durable 20% cmf | 27.2 | 96 | 2633 | 17.2 | 382 | 0.2 | 1 | | 3-ply, U19 lines, glue |
| 8 | Euc APMP 33% | 38.5 | 145 | 902 | 19.1 | 85 | 6.0 | 19 | | 3-ply, U19 lines, glue |
| 9 | Euc APMP 50% | 30.5 | 112 | 731 | 18.9 | 59 | 5.6 | 28 | | 2-ply, U19 lines, glue |
| 10 | Euc APMP 60% | 38.8 | 145 | 850 | 18.2 | 60 | 5.9 | 24 | | 2-ply, U19 lines, glue |
| 11 | Euc APMP 44% | | 152 | 982 | 19.3 | 90 | 2.1 | 11 | 688 | 3-ply, U19, glue |
| 12 | Euc APMP 44% | 36.3 | 160 | 1018 | 19.4 | 116 | 4.3 | 15 | 1450 | 3-ply, U19, glue |
| 13 | Euc APMP 49%, 7% CMF | 32.7 | 148 | 835 | 19.3 | 92 | 2.6 | 4 | 575 | 3-ply, U19, glue |
| 14 | Euc APMP 49%, 7% CMF | 32.5 | 146 | 1035 | 19.1 | 130 | 0.6 | 2 | 838 | 3-ply, U19, glue |
| 15 | Euc APMP 31%, 6% CMF | 32.4 | 139 | 1005 | 19.1 | 108 | 1.7 | 6 | 975 | 3-ply, U19, glue |
| 16 | Southern 62%, 6% CMF | 36.7 | 147 | 1165 | 19.3 | 101 | 1.5 | 6 | 2000 | 3-ply, U19, glue |
| 17 | Integrated 57% | 34.3 | 154 | 737 | 20.0 | 72 | 2.4 | 66 | 875 | 3-ply, HVS9 knurl |
| 18 | Integrated 57% | 35.1 | 160 | 619 | 20.4 | 73 | 5.0 | 22 | 1000 | 3-ply, HVS9 knurl |
| 19 | Euc APMP 49%, 7% CMF | 31.0 | 146 | 765 | 19.8 | 100 | 1.1 | 18 | 850 | 3-ply, HVS9 knurl |
| 20 | Euc APMP 49%, 7% CMF | 32.1 | 148 | 953 | 19.8 | 126 | 0.7 | 3 | 1450 | 3-ply, HVS9 knurl |
| 21 | Euc APMP 33%, 6% CMF | 32.7 | 143 | 888 | 19.6 | 100 | 2.0 | 10 | 1025 | 3-ply, HVS9 knurl |
| 22 | Southern 63%, 6% CMF | 36.7 | 148 | 954 | 19.8 | 99 | 1.9 | 8 | 2000 | 3-ply, HVS9 knurl |

TABLE 23-continued

Summary of CWP prototypes.

| Item | Description | Basis weight, lb/3000 ft² | Caliper, mil/8 sht | GMT, g/3 in. | Softness | CD Wet, g/3 in. | Dry Lint, ΔL* | Wet lint, mm² | Dispersibility, #shakes | Converting |
|---|---|---|---|---|---|---|---|---|---|---|
| 23 | Southern 65%, 7% Pilot CMF | 35.8 | 150 | 788 | 20.1 | 68 | 3.8 | 13 | 2000 | 3-ply, HVS9 knurl |
| 24 | Southern 65%, 7% Pilot CMF | 35.0 | 150 | 823 | 20.1 | 89 | 2.7 | 11 | 2000 | 3-ply, HVS9 knurl |
| | Comparatives | | | | | | | | | |
| | FRBC P3403G | 26.3 | 145 | 932 | 19.3 | 113 | 5.4 | 30 | 600 | |
| | Quilted Northern ® UltraPlush | 37.0 | 148 | 773 | 20.0 | 40 | | | | 3-ply, HVS9 knurl |

TABLE 24

Basesheet data for Three-Ply U19/glue lamination prototypes

| 11.2011-0039 Sample 1 | Conv. Cell | PM cell | Basesheet Description | Caliper 8 Sheet mils/8 sht | Basis Weight lb/3000 ft² | Tensile MD g/3 in. | Stretch MD % | Tensile CD g/3 in. | Stretch CD % | Tensile GM g/3 in. | Wet Tens Finch Cured- CD g/3 in. | Break Modulus GM gms/% | Break Modulus CD gms/% | Break Modulus MD gms/% |
|---|---|---|---|---|---|---|---|---|---|---|---|---|---|---|
| 4-1 | 1 | 1 | 0110-4 | 49.1 | 11.4 | 386 | 28.5 | 284 | 4.7 | 331 | 23 | 29 | 60 | 14 |
| 32-1 | 1 | 5 | 0110-31 | 64.6 | 11.5 | 476 | 31.1 | 260 | 4.3 | 351 | 54 | 29 | 55 | 16 |
| 5-1 | 1 | 1 | 0110-5 | 47.3 | 11.4 | 351 | 26.9 | 277 | 4.4 | 311 | 27 | 28 | 65 | 12 |
| | | | | 160.9 | 34.3 | 1214 | 28.8 | 821' | 4.45 | 993 | 104 | 29 | 60 | 14 |
| 10-1 | 2 | 2 | 0110-9 | 50.1 | 12.5 | 410 | 29.6 | 327 | 4.4 | 365 | 42 | 32 | 72 | 14 |
| 27-1 | 2 | 4 | 0110-26 | 65.9 | 117 | 629 | 29.7 | 372 | 4.2 | 482 | 62 | 49 | 108 | 22 |
| 11-1 | 2 | 2 | 0110-10 | 53.2 | 12.6 | 331 | 28.7 | 253 | 4.7 | 289 | 35 | 25 | 54 | 12 |
| | | | | 169.2 | 37.8 | 1369 | 29.3 | 952 | 4.45 | 1136 | 139 | 35 | 78 | 16 |
| 15-1 | 3 | 3A | 0110-14 | 46.1 | 11.2 | 483 | 32.2 | 316 | 5.1 | 391 | 44 | 32 | 69 | 15 |
| 31-1 | 3 | 5 | 0110-30 | 62.2 | 11.6 | 552 | 30.2 | 312 | 3.9 | 415 | 48 | 38 | 80 | 18 |
| 16-1 | 3 | 3A | 0110-15 | 48.5 | 110 | 381 | 30.9 | 264 | 4.7 | 317 | 34 | 27 | 60 | 12 |
| | | | | 156.8 | 33.8 | 1416 | 31.1 | 893 | 4.54 | 1123 | 127 | 32 | 70 | 15 |
| 19-1 | 4 | 3B | 0110-18 | 45.8 | 10.9 | 472 | 29.8 | 365 | 4.9 | 415 | 66 | 34 | 74 | 16 |
| 26-1 | 4 | 4 | 0110-25 | 65.4 | 13.1 | 757 | 29.3 | 435 | 3.8 | 574 | 74 | 56 | 120 | 26 |
| 20-1 | 4 | 3B | 0110-19 | 46.0 | 10.9 | 491 | 30.8 | 356 | 5.0 | 417 | 63 | 33 | 73 | 15 |
| | | | | 157.2 | 34.9 | 1719 | 29.9 | 1157 | 4.59 | 1406 | 202 | 41 | 89 | 19 |
| 39-1 | 5 | 7 | 0110-38 | 43.7 | 11.7 | 462 | 29.8 | 313 | 5.8 | 380 | 47 | 28 | 50 | 15 |
| 30-1 | 5 | 5 | 0110-29 | 62.0 | 11.4 | 604 | 28.1 | 330 | 4.1 | 443 | 33 | 41 | 72 | 23 |
| 40-1 | 5 | 7 | 0110-39 | 41.1 | 10.8 | 383 | 29.3 | 285 | 5.1 | 330 | 42 | 27 | 56 | 13 |
| | | | | 146.8 | 33.9 | 1449 | 29.1 | 928 | 4.99 | 1154 | 123 | 32 | 59 | 17 |
| 46-1 | 6 | 8 | 0110-45 | 45.0 | 12.5 | 539 | 28.9 | 318 | 5.6 | 413 | 39 | 32 | 57 | 18 |
| 35-1 | 6 | 6 | 0110-34 | 63.0 | 12.8 | 322 | 35.9 | 268 | 5.5 | 293 | 31 | 21 | 47 | 9 |
| 47-1 | 6 | 8 | 0110-46 | 44.8 | 12.9 | 575 | 28.7 | 355 | 5.7 | 452 | 42 | 35 | 61 | 20 |
| | | | | 152.8 | 38.2 | 1436 | 31.1 | 941 | 5.58 | 1157 | 112 | 29 | 55 | 15 |

TABLE 24A

Ply data for low-weight CWP products.
Basesheet data for each Ply

| Cell | X-Ref to Table 23 | Roll ID | | 8 Sheet Caliper Mils/8 sht | Basis Weight Lb/3000 ft² | MD Tensile g/3 in. | MD Stretch % | CD Tensile g/3 in. | CD Stretch % | GM Tensile g/3 in. | CD Wet Tensile Cured g/3 in. | GM Break Modulus gms/% |
|---|---|---|---|---|---|---|---|---|---|---|---|---|
| 1 | 3 | 1130-4 | Hi durable | 27.0 | 9.2 | 1259 | 31.3 | 870 | 4.7 | 1045 | 171 | 87 |
| | | 1130-5 | No CMF | 27.3 | 9.2 | 1112 | 31.9 | 712 | 4.4 | 888 | 149 | 75 |
| | | 1130-6 | | 27.8 | 8.8 | 1330 | 33.2 | 859 | 4.4 | 1067 | 127 | 87 |
| 2 | 4 | 1130-7 | Med durable | 29.5 | 9.6 | 1092 | 33.0 | 562 | 4.0 | 782 | 90 | 67 |
| | | 1130-8 | No CMF | 29.1 | 9.7 | 990 | 32.4 | 665 | 4.6 | 811 | 92 | 71 |
| | | 1130-9 | | 27.0 | 8.9 | 1091 | 34.8 | 575 | 4.7 | 791 | 99 | 61 |
| 3 | 5 | 1130-16 | Less | 31.7 | 9.1 | 461 | 31.1 | 380 | 5.2 | 418 | 49 | 32 |
| | | 1130-17 | durable | 32.7 | 9.9 | 632 | 34.3 | 494 | 5.2 | 559 | 64 | 43 |
| | | 1130-18 | No CMF | 30.8 | 9.2 | 572 | 31.6 | 392 | 4.9 | 471 | 64 | 38 |
| 4 | 6 | 1130-20 | Less | 30.1 | 9.2 | 972 | 33.3 | 509 | 6.1 | 703 | 70 | 47 |
| | | 1130-21 | durable | 30.8 | 9.5 | 1029 | 33.5 | 506 | 6.6 | 721 | 71 | 45 |
| | | 1130-22 | 20% CMF | 29.5 | 9.1 | 852 | 33.1 | 501 | 6.4 | 653 | 58 | 48 |
| 5 | 7 | 1130-24 | Hi durable | 29.6 | 9.6 | 1201 | 34.9 | 705 | 5.6 | 920 | 118 | 72 |
| | | 1130-25 | 20% CMF | 28.5 | 9.3 | 1198 | 32.3 | 625 | 6.4 | 865 | 115 | 58 |
| | | 1130-26 | | 26.1 | 8.4 | 889 | 30.3 | 550 | 6.1 | 699 | 126 | 51 |

TABLE 24A-continued

Ply data for low-weight CWP products.
Basesheet data for each Ply

| Cell | X-Ref to Table 23 | Roll ID | | 8 Sheet Caliper Mils/8 sht | Basis Weight Lb/3000 ft² | MD Tensile g/3 in. | MD Stretch % | CD Tensile g/3 in. | CD Stretch % | GM Tensile g/3 in. | CD Wet Tensile Cured g/3 in. | GM Break Modulus gms/% |
|---|---|---|---|---|---|---|---|---|---|---|---|---|
| 6 | 8 | 4905-57 | High bulk | 52.1 | 13.1 | 379 | 27.6 | 301 | 5.1 | 337 | 36 | 29 |
|   |   | 4905-58 | 33% APMP | 48.5 | 12.6 | 409 | 25.9 | 298 | 4.8 | 348 | 31 | 32 |
|   |   | 4905-59 |          | 49.2 | 12.9 | 391 | 27.7 | 306 | 5.7 | 345 | 31 | 27 |
| 7 | 9 | 4905-60 | High bulk | 61.4 | 16.1 | 460 | 28.5 | 381 | 5.3 | 417 | 36 | 35 |
|   |   | 4905-61 | 50% APMP | 61.5 | 15.9 | 492 | 28.0 | 339 | 5.1 | 408 | 39 | 33 |
| 8 | 10 | 4905-62 | High bulk | 81.7 | 20.3 | 508 | 26.6 | 434 | 5.0 | 469 | 38 | 41 |
|   |    | 4905-63 | 60% APMP | 80.1 | 20.6 | 633 | 28.0 | 459 | 5.3 | 539 | 40 | 45 |

TABLE 24B

Finished product composition.

|   | Euc APMP | SBHK | SBSK | NBSK | Euc Kraft | CMF |
|---|---|---|---|---|---|---|
| 1 | 44.4 | 0.0 | 0.0 | 33.7 | 21.9 | 0.0 |
| 2 | 44.4 | 0.0 | 0.0 | 33.7 | 21.9 | 0.0 |
| 3 | 48.6 | 0.0 | 0.0 | 28.1 | 16.1 | 7.2 |
| 4 | 49.4 | 0.0 | 0.0 | 28.4 | 15.3 | 6.9 |
| 5 | 31.3 | 0.0 | 0.0 | 29.8 | 32.6 | 6.4 |
| 6A | 0.0 | 31.2 | 31.2 | 15.8 | 16.1 | 5.6 |
| 6B | 0.0 | 31.2 | 31.2 | 15.8 | 16.1 | 5.6 |

TABLE 24C

Converting Parameters (U19/Glue)

Emboss Sleeves: U19 300-0436.2 HVS  
Plybond Adhesive: TT 3005, 5% solids  
Perf Blades: 1866 × 0.040  
Sheet Length: 4.09  
Sheet Count: 200

| Cell ID | Emboss Pen. | Front Roll # | Middle Roll # Embossed | Back Roll # Embossed | Marry Roll Nip Open/Closed | # of logs/Rolls | Notes |
|---|---|---|---|---|---|---|---|
| 1 | 0.052 | Cell 1-4 | Cell 5-31 | Cell 1-5 | 16 mm | 12/24 | |
| 2 | 0.052 | Cell 2-9 | Cell 4-26 | Cell 2-10 | 16 mm | 6/12 | |
| 3 | 0.055 | Cell 3A-14 | Cell 5-30 | Cell 3A-15 | 16 mm | 13/26 | |
| 4 | 0.055 | Cell 3B-18 | Cell 4-25 | Cell 3B-19 | | 16/32 | Decreased marry roll nip width |
| 5 | 0.052 | Cell 7-38 | Cell 5-29 | Cell 7-39 | | 16/32 | |
| 6A | 0.052 | Cell 8-45 | Cell 6-34 | Cell 8-46 | | 6/12 | |
| 6B | 0.045 | Cell 8-45 | Cell 6-34 | Cell 8-46 | | 10/20 | |

TABLE 24D

Glue Laminated Finish Product - Physical Properties (pt. 1)

|   | Table 23 ref | Description | Softness Panel | Wet Abrasion mm² | Lint Black Felt Unitless | Basis Weight lb/3000 ft² | Caliper 8 Sheet mils/8sht | MD Tensile g/3 in. | CD Tensile g/3 in. | GM Tensile g/3 in. | MD Stretch % | CD Stretch % | CD Wet Tens Finch g/3 in. |
|---|---|---|---|---|---|---|---|---|---|---|---|---|---|
| 1 | 3 | High durable no cmf | 17.5 | 1 | 0.2 | 27.0 | 101 | 3,242 | 1,709 | 2,405 | 28.0 | 5.1 | 342 |
| 2 | 4 | med durable no cmf | 18.1 | 7 | 0.9 | 28.1 | 95 | 2,688 | 1,604 | 2,076 | 27.7 | 5.6 | 267 |
| 3 | 5 | less durable no cmf | 18.5 | 12 | 1.9 | 28.4 | 105 | 1,888 | 1,185 | 1,495 | 26.1 | 5.2 | 193 |
| 4 | 6 | less durable 20& cmf | 17.8 | 3 | 0.8 | 26.7 | 95 | 2,899 | 1,428 | 2,034 | 28.1 | 6.3 | 229 |
| 5 | 7 | High durable 20% cmf | 17.2 | 1 | 0.2 | 27.2 | 96 | 3,727 | 1,862 | 2,633 | 28.9 | 6.2 | 382 |
| 6 | 8 | 33% APMP (P6) | 19.1 | 19 | 6.0 | 38.5 | 145 | 1,105 | 738 | 902 | 19.8 | 4.7 | 85 |
| 7 | 9 | 5-% APMP (P6) | 18.9 | 28 | 5.6 | 30.5 | 112 | 878 | 610 | 731 | 20.5 | 5.2 | 59 |
| 8 | 10 | 60% APMP (P6) | 18.2 | 24 | 5.9 | 38.8 | 145 | 1,040 | 698 | 850 | 19.0 | 4.7 | 60 |

TABLE 24E

| | Table 23 ref | Description | GM Break Modulus g/% | Brtness MacBeth UV-C % | MacBeth Opacity Units | Roll Diameter in | Roll Compress Value % | TMI Ply Bond g | MD Break Modulus g/% | CD Break Modulus g/% | MD TEA mm-g/mm² | CD TEA mm-g/mm² |
|---|---|---|---|---|---|---|---|---|---|---|---|---|
| 1 | 3 | High durable no cmf | 203 | 89.7 | 72 | 4.80 | 29.29 | 4.65 | 116 | 355 | 4.20 | 0.59 |
| 2 | 4 | med durable no cmf | 166 | 89.8 | 72 | 4.32 | 19.10 | 5.14 | 96 | 287 | 3.66 | 0.59 |
| 3 | 5 | less durable no cmf | 129 | 89.8 | 73 | 4.55 | 19.33 | 20.69 | 73 | 230 | 2.61 | 0.40 |
| 4 | 6 | less durable 20& cmf | 151 | 91.6 | 80 | 4.26 | 17.84 | 8.63 | 104 | 220 | 3.44 | 0.60 |
| 5 | 7 | High durable 20% cmf | 196 | 91.3 | 79 | 4.38 | 17.93 | 3.98 | 128 | 300 | 4.27 | 0.80 |
| 6 | 8 | 33% APMP (P6) | 92 | 87.8 | 82 | 4.91 | 21.40 | 9.54 | 56 | 153 | 1.46 | 0.23 |
| 7 | 9 | 5-% APMP (P6) | 71 | 87.8 | 77 | 4.12 | 13.73 | 11.80 | 43 | 118 | 1.24 | 0.22 |
| 8 | 10 | 60% APMP (P6) | 89 | 86.6 | 83 | 4.71 | 16.88 | 10.96 | 55 | 145 | 1.37 | 0.23 |

TABLE 24F

Finished product composition for CWP sheets

| | NBSK | VCP Eucalyptus Kraft | Euc APMP P6 | CMF |
|---|---|---|---|---|
| 1 | 40 | 40 | 0 | 20 |
| 2 | 40 | 40 | 0 | 20 |
| 3 | 40 | 40 | 0 | 20 |
| 4 | 40 | 40 | 0 | 20 |
| 5 | 40 | 40 | 0 | 20 |
| 6 | 40 | 27 | 33 | 0 |
| 7 | 30 | 20 | 50 | 0 |
| 8 | 24 | 16 | 60 | 0 |

TABLE 24G

Glue Laminated Finished product - Physical Properties (pt. 1)

| Description | Table 23 ref | Softness Panel | Dispersibility, #shakes | Wet Abrasion Tissue mm² | Lint Black Felt Unitless | Basis Weight lb/3000 ft² | Caliper 8 Sheet mils/8 sht | Tensile MD g/3 in. | Tensile CD g/3 in. | Tensile GM g/3 in. | Stretch MD % | Stretch CD % |
|---|---|---|---|---|---|---|---|---|---|---|---|---|
| 1 | 11 | 19.33 | 688 | 11.0 | 2.1 | 33.7 | 152 | 1,280 | 756 | 982 | 22.2 | 5.1 |
| 2 | 12 | 19.35 | 1450 | 15.1 | 4.3 | 36.3 | 160 | 1,169 | 886 | 1,018 | 21.7 | 4.9 |
| 3 | 13 | 19.31 | 575 | 3.9 | 2.6 | 32.7 | 148 | 1,019 | 688 | 835 | 20.3 | 5.2 |
| 4 | 14 | 19.05 | 838 | 1.7 | 0.6 | 32.5 | 146 | 1,314 | 818 | 1,035 | 20.6 | 5.3 |
| 5 | 15 | 19.11 | 975 | 6.3 | 1.7 | 32.4 | 139 | 1,315 | 769 | 1,005 | 22.2 | 5.1 |
| 6A | 16 | 19.29 | 2000 | 5.9 | 1.5 | 36.7 | 147 | 1,468 | 926 | 1,165 | 25.5 | 5.9 |
| 6B | — | 19.31 | 2000 | 5.4 | 1.3 | 36.8 | 143 | 1,464 | 971 | 1,190 | 26.6 | 5.8 |

TABLE 24G

Glue Laminated Finished product - Physical Properties (pt. 2)

| Description | Table 23 ref | Perf Tensile g/3 in. | Finch CD g/3 in. | Modulus GM gms/% | Roll Diameter in. | Compress Value % | TMI Ply Bond g | Modulus MD gms/% | Modulus CD gms/% | mm-gm/mm 2 | mm-gm/mm 2 |
|---|---|---|---|---|---|---|---|---|---|---|---|
| 1 | 11 | 377 | 90 | 94 | 5.06 | 21.9 | 9.0 | 58 | 153 | 1.65 | 0.28 |
| 2 | 12 | 412 | 116 | 100 | 5.13 | 21.2 | 7.5 | 55 | 182 | 1.60 | 0.32 |
| 3 | 13 | 336 | 92 | 81 | 5.13 | 26.5 | 8.8 | 50 | 130 | 1.27 | 0.25 |
| 4 | 14 | 448 | 130 | 100 | 4.95 | 22.6 | 8.0 | 64 | 156 | 1.55 | 0.31 |
| 5 | 15 | 397 | 108 | 94 | 4.98 | 27.8 | 11.1 | 60 | 150 | 1.62 | 0.29 |
| 6A | 16 | 441 | 101 | 95 | 4.91 | 22.5 | 15.3 | 57 | 158 | 1.96 | 0.40 |
| 6B | — | 421 | 106 | 97 | 5.04 | 28.4 | 14.6 | 56 | 168 | 2.04 | 0.42 |

TABLE 25A

Construction data for HVS9/knurl prototypes w/ Basesheet data.

| TL2011-0039 Sample | Converting Cell | PM cell | Description | 8 Sheet Caliper mils/8 sht | Basis Weight lb/3000 ft² | MD Tensile g/3 in | MD Stretch % | Tensile CD g/3 in. | Stretch CD % | Tensile GM g/3 in. | CD Wet Tens Finch Cured g/3 in. | GM Break Modulus g/% |
|---|---|---|---|---|---|---|---|---|---|---|---|---|
| 6-1 | 1 | 1 | 0110-6 | 46.9 | 11.1 | 365 | 28.8 | 280 | 4.5 | 320 | 26 | 29 |
| 37-1 | 1 | 6 | 0110-36 | 57.7 | 12.1 | 407 | 35.0 | 361 | 5.3 | 383 | 49 | 29 |
| 7-1 | 1 | 1 | 0110-7 | 47.4 | 11.3 | 369 | 28.7 | 294 | 4.6 | 329 | 27 | 29 |
| | | | | 152.0 | 34.5 | 1141 | 30.8 | 935 | 4.8 | 1031 | 102 | 29 |
| 12-1 | 2 | 2 | 0110-11 | 56.0 | 12.7 | 335 | 29.9 | 290 | 4.5 | 311 | 33 | 26 |

TABLE 25A-continued

Construction data for HVS9/knurl prototypes w/ Basesheet data.

| TL2011-0039 Sample | Converting Cell | PM cell | Description | 8 Sheet Caliper mils/8 sht | Basis Weight lb/3000 ft² | MD Tensile g/3 in | MD Stretch % | Tensile CD g/3 in. | Stretch CD % | Tensile GM g/3 in. | CD Wet Tens Finch Cured g/3 in. | GM Break Modulus g/% |
|---|---|---|---|---|---|---|---|---|---|---|---|---|
| 34-1 | 2 | 6 | 0110-33 | 63.5 | 13.0 | 357 | 38.7 | 274 | 5.4 | 312 | 30 | 23 |
| 13-1 | 2 | 2 | 0110-12 | 52.2 | 12.3 | 326 | 29.1 | 250 | 5.3 | 285 | 34 | 22 |
|  |  |  |  | 171.7 | 37.9 | 1018 | 32.6 | 815 | 5.1 | 908 | 96 | 24 |
| 17-1 | 3 | 3A | 0110-16 | 46.9 | 10.9 | 417 | 30.3 | 341 | 5.0 | 376 | 49 | 31 |
| 29-1 | 3 | 5 | 0110-28 | 62.8 | 11.8 | 453 | 30.4 | 363 | 4.4 | 405 | 45 | 35 |
| 18-1 | 3 | 3A | 0110-17 | 45.8 | 10.5 | 382 | 29.3 | 301 | 5.2 | 338 | 43 | 27 |
|  |  |  |  | 155.4 | 33.2 | 1252 | 30.0 | 1005 | 4.9 | 1119 | 137 | 31 |
| 21-1 | 4 | 3B | 0110-20 | 45.8 | 11.0 | 475 | 31.3 | 344 | 5.0 | 404 | 59 | 32 |
| 25-1 | 4 | 4 | 0110-24 | 63.8 | 12.3 | 708 | 30.0 | 374 | 4.1 | 514 | 47 | 46 |
| 22-1 | 4 | 3B | 0110-21 | 45.8 | 10.5 | 393 | 29.9 | 311 | 6.2 | 350 | 59 | 24 |
|  |  |  |  | 155.3 | 33.7 | 1576 | 30.4 | 1029 | 5.1 | 1268 | 165 | 34 |
| 41-1 | 5 | 7 | 0110-40 | 41.6 | 10.8 | 365 | 27.9 | 274 | 5.2 | 316 | 42 | 27 |
| 28-1 | 5 | 4 | 0110-27 | 65.8 | 13.0 | 734 | 29.3 | 419 | 4.2 | 554 | 72 | 49 |
| 42-1 | 5 | 7 | 0110-41 | 41.2 | 10.8 | 363 | 30.4 | 284 | 5.3 | 321 | 39 | 25 |
|  |  |  |  | 148.6 | 34.6 | 1462 | 29.2 | 977 | 4.9 | 1191 | 153 | 34 |
|  |  |  |  | 162.9 |  | 1097 |  | 733 |  | 893 | 115 |  |
| 48-1 | 6 | 8 | 0110-47 | 46.1 | 12.7 | 606 | 31.3 | 357 | 5.2 | 465 | 45 | 37 |
| 36-1 | 6 | 6 | 0110-35 | 63.7 | 13.6 | 390 | 35.3 | 312 | 5.0 | 345 | 43 | 27 |
| 49-1 | 6 | 8 | 0110-48 | 45.7 | 12.5 | 484 | 28.1 | 293 | 5.6 | 376 | 38 | 31 |
|  |  |  |  | 155.4 | 38.8 | 1480 | 31.6 | 962 | 5.3 | 1186 | 126 | 32 |
|  |  |  |  | 170.4 |  | 1110 |  | 721 |  | 890 | 94 |  |
| 56-1 | 7 | 9 | 0216-7 | 46.3 | 12.6 | 404 | 30.9 | 336 | 5.3 | 368 | 35 | 29 |
| 66-1 | 7 | 10 | 0216-16 | 66.6 | 12.7 | 323 | 36.9 | 238 | 5.8 | 277 | 6 | 19 |
| 57-1 | 7 | 9 | 0216-8 | 47.6 | 12.5 | 477 | 32.7 | 362 | 5.2 | 415 | 35 | 31 |
|  |  |  |  | 160.5 | 37.9 | 1203 | 33.5 | 936 | 5.4 | 1060 | 75 | 26 |
| 58-1 | 8 | 9 | 0216-9 | 46.0 | 12.5 | 442 | 30.5 | 331 | 4.9 | 382 | 39 | 32 |
| 63-1 | 8 | 6 | 0216-13 | 64.8 | 12.5 | 390 | 35.8 | 332 | 5.8 | 359 | 45 | 24 |
| 59-1 | 8 | 9 | 0216-10 | 46.8 | 12.7 | 451 | 31.0 | 369 | 5.0 | 408 | 39 | 34 |
|  |  |  |  | 157.6 | 37.7 | 1284 | 32.4 | 1032 | 5.2 | 1149 | 124 | 30 |

TABLE 25B

Finished product composition for HVS 9 Knurl Products.

|  | APMP Euc. | SBHK | SBSK | NBSK | Kraft Euc. | CMF |
|---|---|---|---|---|---|---|
| 1 | 22 | 17 | 17 | 21 | 21 | 0 |
| 2 | 22 | 17 | 17 | 22 | 22 | 0 |
| 3 | 49 | 0 | 0 | 28 | 16 | 7.1 |
| 4 | 49 | 0 | 0 | 28 | 16 | 7.0 |
| 5 | 33 | 0 | 0 | 30 | 31 | 6.0 |
| 6 | 0 | 32 | 32 | 15 | 16 | 5.5 |
| 7 | 0 | 32 | 32 | 0 | 28 | 7.0 |
| 8 | 0 | 32 | 32 | 0 | 28 | 7.1 |

TABLE 25C

HVS9/knurl finished product Physical Properties (pt. 1)

| Description | Table 23 desc. | Softness Panel | Dispersibility # of Shakes | Wet Abrasion Tissue mm² | Lint Black felt Unitless | Basis Weight lb/3000 ft² | Caliper 8 Sheet mils/8 Sheet | Tensile MD g/3 in. | Tensile GM g/3 in. | Stretch MD g/3 in. | Stretch CD % |
|---|---|---|---|---|---|---|---|---|---|---|---|
| 5-1 | 17 | 20.02 | 875 |  | 2.4 | 34.3 | 154 | 910 | 599 | 18.1 | 4.8 |
| 5-2 | 18 | 20.36 | 1000 |  | 5.0 | 35.1 | 160 | 762 | 505 | 17.8 | 5.1 |
| 5-3 | 19 | 19.84 | 850 |  | 1.1 | 31.0 | 146 | 1,008 | 583 | 17.4 | 5.2 |
| 5-4 | 20 | 19.79 | 1450 |  | 0.7 | 32.1 | 148 | 1,230 | 740 | 18.4 | 5.0 |
| 5-5 | 21 | 19.56 | 1025 |  | 2.0 | 32.7 | 143 | 1,225 | 645 | 18.7 | 5.0 |
| 5-6 | 22 | 19.79 | 2000 |  | 1.9 | 36.7 | 148 | 1,292 | 705 | 21.5 | 5.6 |
| 5-7 | 23 | 20.10 | 2000 |  | 3.8 | 35.8 | 150 | 918 | 679 | 20.3 | 5.1 |
| 5-8 | 24 | 20.08 | 2000 |  | 2.7 | 35.0 | 150 | 946 | 718 | 18.9 | 5.0 |

HVS9/knurl finished product Physical Properties (pt. 2)

| Description | Table 23 desc. | Perf-Tensile g/3 in. | Wet Tens Finch CD g/3 in. | Break Modulus GM g/% | Roll Diameter in | Roll Compress Value % | TMI Ply Bond g | Break Modulus MD g/% | Break Modulus CD g/% | TEA MD mm-g/mm² | TEA CD mm-g/mm² |
|---|---|---|---|---|---|---|---|---|---|---|---|
| 5-1 | 17 | 389 | 72 | 80 | 4.96 | 21 | 7.9 | 51.7 | 124.6 | 1.02 | 0.19 |
| 5-2 | 18 | 354 | 73 | 64 | 4.83 | 23 | 5.7 | 43.1 | 94.3 | 0.86 | 0.17 |

TABLE 25C-continued

| | | | | | | | | | | |
|---|---|---|---|---|---|---|---|---|---|---|
| 5-3 | 19 | 343 | 100 | 80 | 5.00 | 24 | 3.2 | 57.3 | 112.1 | 1.03 | 0.20 |
| 5-4 | 20 | 456 | 126 | 100 | 5.04 | 23 | 4.4 | 67.4 | 148.0 | 1.31 | 0.24 |
| 5-5 | 21 | 431 | 100 | 93 | 4.92 | 22 | 6.8 | 66.5 | 130.1 | 1.28 | 0.21 |
| 5-6 | 22 | 518 | 99 | 87 | 5.03 | 24 | 8.7 | 60.5 | 125.3 | 1.51 | 0.26 |
| 5-7 | 23 | 358 | 68 | 78 | 4.91 | 20 | 6.9 | 45.6 | 132.4 | 1.13 | 0.22 |
| 5-8 | 24 | 352 | 89 | 85 | 5.07 | 25 | 7.7 | 49.9 | 146.4 | 1.07 | 0.23 |

TABLE 25D

Converting parameters Sheet Length 4.09" Sheet Width 4.05"

| Cell No. | #1 Unwind Base Sheet | #2 Unwind Base Sheet | #3 Unwind Base Sheet | Lower Emboss Pattern # | Converting Process | Lower Emboss Depth | Feedroll Calender | Mach. Speed FPM | Unwind Tension #1 |
|---|---|---|---|---|---|---|---|---|---|
| 1 | 110-6 | 110-36 | 110-7 | 300-107.1 | 3 ply HVS | 0.090 | open | 130 | 0.5 |
| 2 | 110-12 | 110-33 | 110-11 | 300-107.1 | 3 ply HVS | 0.090 | open | 130 | 0.5 |
| 8 | 216-10 | 216-13 | 216-9 | 300-107.1 | 3 ply HVS | 0.090 | open | 130 | 0.5 |
| 6 | 110-48 | 110-35 | 110-47 | 300-107.1 | 3 ply HVS | 0.090 | open | 130 | 0.5 |
| 3 | 0110-17 | 0110-28 | 0110-16 | 300-107.1 | 3 ply HVS | 0.090 | open | 130 | 0.5 |
| 4 | 0110-21 | 0110-24 | 0110-30 | 300-107.1 | 3 ply HVS | 0.090 | open | 130 | 0.5 |
| 5 | 0110-41 | 0110-27 | 0110-40 | 300-107.1 | 3 ply HVS | 0.090 | open | 130 | 0.5 |
| 7 | 216-8 | 216-16 | 216-7 | 300-107.1 | 3 ply HVS | 0.090 | open | 130 | 0.5 |

| Cell No. | Unwind Tension #2 | Unwind Tension #3 | Plybond Air Pressure | Draw Tension | Winding Tension | Sheet Count | Finished Roll Diameter |
|---|---|---|---|---|---|---|---|
| 1 | 0.5 | 0.5 | 23 psi | float | 0.8 | 200 | 4.92 |
| 2 | 0.5 | 0.5 | 23 psi | float | 0.6 | 176 | 4.84 |
| 8 | 0.5 | 0.5 | 23 psi | float | 0.5 | 200 | 4.94 |
| 6 | 0.5 | 0.5 | 23 psi | float | 0.7 | 200 | 4.90 |
| 3 | 0.5 | 0.5 | 23 psi | float | 0.8 | 200 | 4.89 |
| 4 | 0.5 | 0.5 | 23 psi | float | 0.9 | 200 | 4.95 |
| 5 | 0.5 | 0.5 | 23 psi | float | 0.8 | 200 | 4.89 |
| 7 | 0.5 | 0.5 | 23 psi | float | 0.7 | 200 | 4.92 |

TABLE 26

Physical Properties of two-ply, high-bulk tissue with Tembec birch APMP (pt. 1).

| Description | 8 Sheet Caliper mils/8 sht | Basis Weight lb/3000 ft$^2$ | MD Tensile g/3 in. | MD Stretch % | CD Tensile g/3 in. | CD Stretch % | GM Tensile g/3 in. | CD Wet Tens Finch Cured g/3 in. |
|---|---|---|---|---|---|---|---|---|
| 0302-2 | 62 | 14.1 | 879 | 28.1 | 595 | 5.1 | 723 | 172 |
| 0302-3 | 64 | 14.5 | 988 | 30.3 | 546 | 5.4 | 734 | 163 |
| 0302-4 | 88 | 19.9 | 868 | 28.1 | 587 | 5.0 | 714 | 154 |
| 0302-5 | 84 | 19.7 | 884 | 28.4 | 701 | 5.0 | 786 | 183 |

Physical Properties of two-ply, high-bulk tissue with Tembec birch APMP (pt. 2).

| Description | GM Break Modulus gms/% | SAT Capacity g/m$^2$ | SAT Rate g/s$^{0.5}$ | SAT Time s | CD T.E.A mm-gm/mm$^2$ | MD TEA mm-gm/mm$^2$ | CD Break Modulus gms/% | MD Break Modulus gms/% |
|---|---|---|---|---|---|---|---|---|
| 0302-2 | 61 | 337 | 0.0613 | 124.9 | 0.21 | 0.96 | 117 | 32 |
| 0302-3 | 58 | 350 | 0.0667 | 112.6 | 0.21 | 1.12 | 102 | 33 |
| 0302-4 | 58 | 548 | 0.1047 | 141.4 | 0.20 | 1.01 | 109 | 31 |
| 0302-5 | 63 | 532 | 0.1043 | 146.6 | 0.25 | 1.03 | 137 | 29 |

TABLE 27

Overall Composition of 3 Ply prototypes* using Tembec Birch APMP for bulky inner layer.

| | Mar. NBSK | VCP Euc | CMF | Birch APMP |
|---|---|---|---|---|
| 1 | 32% | 7% | 10% | 51% |
| 2 | 23% | 5% | 7% | 65% |

TABLE 28

Physical Properties of 3 Ply prototypes* using Tembec Birch APMP for bulky inner layer (pt. 1).

| Description | Softness Panel | Lint Black Felt Unitless | Basis Weight lb/3000 ft² | Caliper 8 Sheet mils/ 8 sht | Tensile MD g/3 in. | Tensile CD g/3 in. | Tensile GM g/3 in. | Stretch MD % | Stretch CD % | Wet Tens Finch CD g/3 in. |
|---|---|---|---|---|---|---|---|---|---|---|
| 1 | 19.7 | 0.4 | 27.0 | 131 | 1,141 | 696 | 888 | 17.0 | 5.1 | 193 |
| 2 | 20.0 | −0.1 | 37.7 | 174 | 1,143 | 713 | 899 | 18.7 | 4.7 | 192 |

TABLE 28

Physical Properties of 3 Ply prototypes using Tembec Birch APMP for bulky inner layer (pt. 2).

| Description | Break Modulus GM gms/% | Brtness MacBeth UV-C % | Opacity MacBeth Opacity Units | Roll Diameter in | Roll Compress Value % | TMI Ply Bond g | Break Modulus MD gms/% | Break Modulus CD gms/% | TEA MD mm-gm/ mm² | TEA CD mm- gm/ mm² |
|---|---|---|---|---|---|---|---|---|---|---|
| 1 | 95.0 | 85.9 | 78.5 | 4.6 | 22.3 | 0.5 | 64.3 | 141.0 | 1.0 | 0.2 |
| 2 | 97.3 | 84.9 | 84.2 | 5.2 | 22.8 | 0.6 | 62.0 | 154.4 | 1.1 | 0.2 |

*Items 1 and 2 from Table 23

Summary of Results

Table 23 illustrates several rather surprising results in that three-ply bath tissue incorporating eucalyptus APMP exceeded Quilted Northern® Ultra Plush caliper without unduly degrading softness. This is considered quite surprising for a bath tissue comprising such large quantities of high yield pulp.

Even with products with excellent resistance to pilling, linting and shredding, it was possible to achieve softness panel ratings greater than nineteen while reducing wet lint up to 96% versus Charmin® Ultra Strong. It can also be observed that in those products comprising rather small amounts of CMF, even further reductions in wet lint values were obtained. This was especially true of sheets containing CMF at 6 to 7% of furnish, wherein the CMF was concentrated in the surface strata of the outer plies by stratification without CMF in the inner ply. This is considered to be especially significant as, currently, CMF is substantially more expensive than most papermaking fibers. Accordingly, it is particularly important both to reduce the amount needed and to obtain easily perceptible benefit for the CMF. Products without CMF, however, particularly, those made with glue lamination, exhibited reduced wet lint relative to products where the plies were joined by knurling, thus making it possible to achieve excellent results without the use of CMF.

It is clear that applicants have succeeded in manufacturing a bath tissue that is usable prewetted, yet fully achieves a softness that is not merely comparable to premium and super premium bath tissue, but is at full parity and is arguably even softer, although the improvement is most likely not significant enough to be noticed reliably by most users. This is a dramatic reversal of previous wet strength bath tissues, in which it was hoped that the deficit in softness was not large enough to be readily noticeable by most users. The softness panel rating of 20.1 achieved with furnish comprising 7% pilot CMF, 65% southern softwood kraft, and 28% eucalyptus kraft is considered to be a significant improvement in wet strength bath tissue.

High basis-weight CWP prototypes comprising less than 30% southern pine with large amounts of eucalyptus APMP were dispersible, passing the test described above in under 1500 shakes. Surprisingly, high basis-weight CWP product with an excess of 30% southern pine did not pass the dispersibility test after 2000 shakes as, despite appearing to be disintegrated, the slurry did not drain with the requisite speed. It appears that dispersibility may be helped significantly by the inclusion of short, eucalyptus APMP fibers relative to longer southern pine kraft fibers.

Between comparable prototypes, products having plies joined by knurling had a slight edge in softness over glue laminated prototypes.

As expected, however, CWP products were at a disadvantage to those products produced by creping a nascent web at a 30 to 60% consistency off of a transfer cylinder.

Two-ply bath tissue made with a furnish including Tembec Birch APMP achieved a softness rating of 20 at 176 mil/8 sheet caliper, exhibiting considerable dusting along with knurled ply bonding, which was poor, suggesting that mechanical hardwood APMP other than eucalyptus may achieve a similar bulk result as eucalyptus if used in the interior ply of a three-ply product, but likely might be rather weak for use in the exterior plies.

These results, however, also demonstrate that the current best practice for making soft tissue does not optimize the properties of tissues to be used wet. In particular, the current best practice for dry tissue uses about ⅓ northern softwood kraft and ⅔ eucalyptus kraft with the softwood providing network integrity while the eucalyptus provides smoothness and opacity. When a stratified headbox is available, in a refinement of this approach, the eucalyptus is stratified in the Yankee side of the sheet and spray softeners are applied up to about the limit at which they begin to interfere with creping. The stronger air layer with softwood provides strength while the eucalyptus layer becomes very smooth and velvety. As mentioned, however, not only can spray softeners act as release agents interfering with effective creping of the sheet, and thus interfering with realization of the full softness potential of the sheet, but surfaces comprised of 100% eucalyptus kraft often have increased tendency to shed lint. Thus, it can be appreciated that a premium softness wet or dry bath tissue product does not necessarily result from merely adding temporary wet strength agents to traditional premium bath tissue products intended for dry use.

A different strategy is needed for wet-durable tissue to reduce the linting tendency for both dry and wet use. CMF and northern softwood are incorporated in the Yankee layer, while a temporary wet strength agent is concentrated in the Yankee layer to provide durability. Thus, the Yankee layer provides wet tensile and surface strength to reduce pilling. The air layer contains an integrated furnish that is debonded as much as is tolerable, with little or no temporary wet strength, as shown in the representative tissue structure of FIG. 14. In this approach to providing a premium softness wet or dry bath tissue, the outer plies are stratified with softness and integrity, providing premium fibers in the Yankee layer and lower cost furnish in the air layer to provide bulk and overall strength. The middle ply is homogeneously formed APMP and softwood kraft. Alternatively, the middle ply can be made with integrated furnish such as southern kraft. The middle ply is creped with a relatively closed pocket to create bulk through coarser crepe and uncalendered to preserve the bulk added by the coarse creping. In this approach, stratification to provide a strong coherent Yankee layer of low weight with a debonded air layer combined to produce a finely creped, but coherent tissue on the surface. FIG. 14 sets forth a desirable design for a three-ply bath tissue 4-10 product utilizing eucalyptus APMP, in which upper ply 4-12 comprising two strata 4-14 and 4-16, in which upper stratum 4-14 comprising primarily northern bleached softwood kraft fiber and eucalyptus kraft, has a basis weight of about 4 to 9 lbs per 3000 sq ft ream; lower stratum 4-16 comprising primarily eucalyptus APMP has basis weight of 2 to 6 lbs per 3000 sq ft ream; while interior ply 4-18 comprising primarily APMP and northern bleached softwood kraft has a basis weight of 7 to 15 lbs/ream, while lower ply 4-20 comprising two strata 4-22 and 4-24, in which lower stratum 4-24 comprising primarily northern bleached softwood kraft fiber and eucalyptus kraft has a basis weight of about 4 lbs per 3000 sq ft ream; and upper stratum 4-22 comprising primarily eucalyptus APMP has basis weight of 2 to 6 lbs per 3000 sq ft ream. In many cases, it will be preferable to substitute furnishes comprising about 20% CMF; 40% eucalyptus kraft and 40% northern bleached softwood kraft fiber for 50% northern bleached softwood kraft fiber and 50% by weight of eucalyptus kraft in the above. It can be observed that upper ply 4-12 and interior ply 4-18 have been embossed together, while lower ply 4-20 is relatively planar and is preferably unembossed.

Table 23 summarizes CWP prototype properties made using the general strategy shown in FIG. 14 in comparison to some other tissue structures. Product 18 is an example of using an integrated furnish to lower cost through cheaper and bulkier fiber, while maintaining softness. The 176 count roll has a 4.83 inch diameter and a 23% roll compression. Alternatively, basis weight can be taken out of the 160 caliper product to keep 200 sheets, as in, for example, the 31 lb/ream product 19.

Product 24 is a CMF containing prototype offsetting the high cost CMF in the Yankee stratum by low cost integrated furnish away from the surface to produce a tissue achieving an extremely high softness rating of 20 when tested by a trained softness panel. Product 24 is made with an outer ply comprising a 6.7 lb/ream Yankee layer with 20% pilot CMF and 80% eucalyptus kraft with the remaining 6 lb/ream air layer being made with 50% southern softwood kraft and 50% southern hardwood kraft. As the middle ply is an uncalendered sheet with 50% southern softwood and 50% southern hardwood kraft, the finished product content nets out to only 7% CMF, 28% eucalyptus kraft, and 65% southern kraft for a product that is potentially economically feasible in view of the benefits resulting from the use of the CMF.

Figure 15:
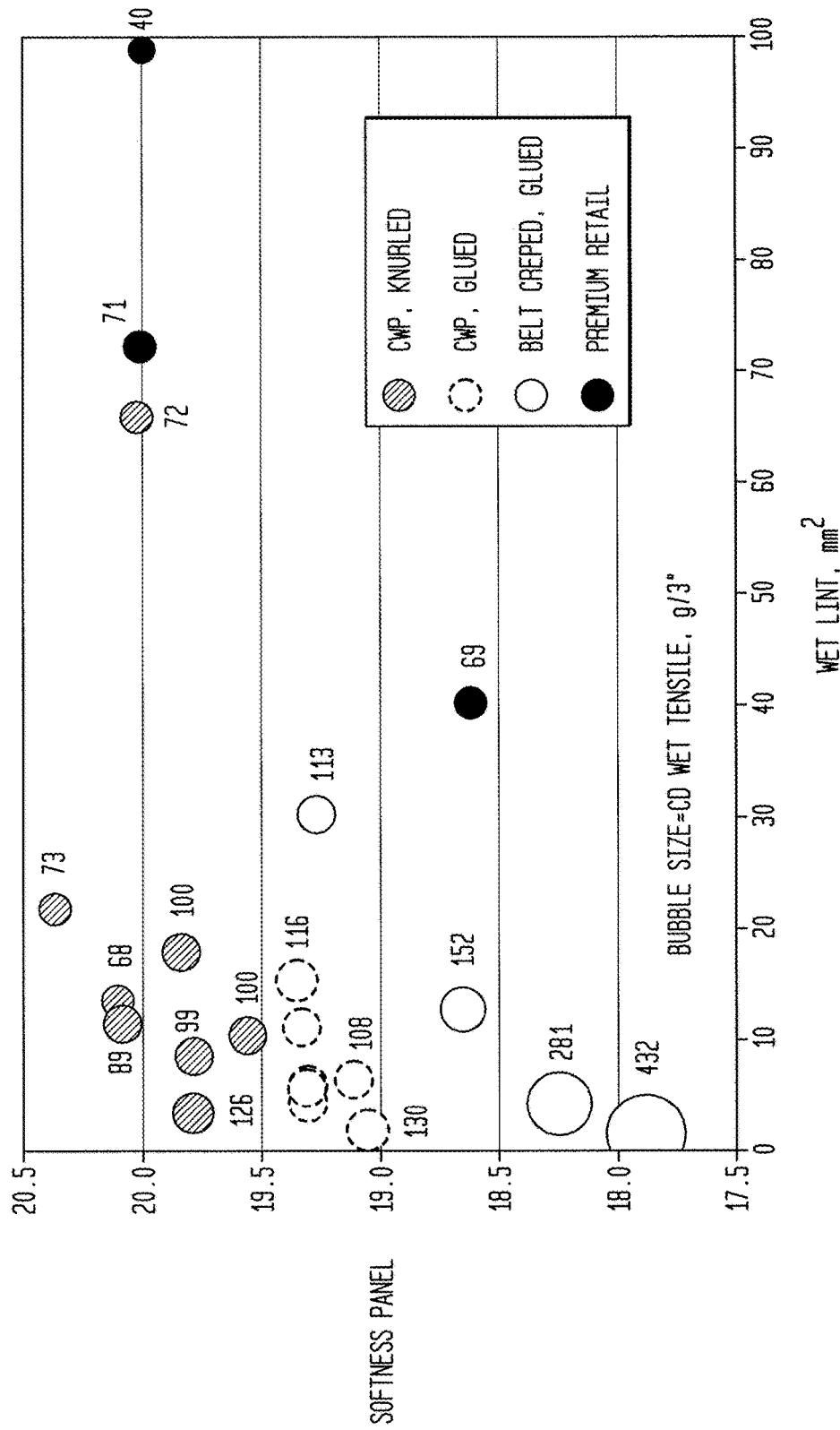
FIG. 15 is a bubble graph illustrating the inter-relationship among the softness, CD wet strength and wet linting resistance of several prototype products.

FIGS. 13 and 15 show plots of softness versus wet lint with the bubble size representing CD wet tensile. Softness greater than 19 was achieved for most CWP prototypes whether they are glue laminated or knurled. Wet lint was very low and wet tensile was generally less than the Delve 358 product, but greater than Charmin® Ultra Strong (69 g/3 in. CDWT). Many prototypes have a combination of softness, low lint, and durability.

It can also be appreciated that prototypes with CMF have less wet lint than comparable prototypes with only wood pulp. Prototypes with just wood pulp, however, have substantially reduced lint relative to other retail products, so they may provide the most economical way of delivering low lint.

Another comparison to highlight is the lower wet lint achieved with glue lamination relative to knurling, particularly, in products without CMF. The bubbles 90 and 116 in FIG. 15 (glue lamination) were made with outer plies similar to the product represented by bubble 315 (glue lamination). One of the knurled products had higher lint attributable to the surface ply failing, while other knurled products were both soft and durable. The difference between these two products was a higher basis weight and strength in the product that did not fail. While all glued products had low lint, most knurled prototypes performed nearly as well.

Figure 16:
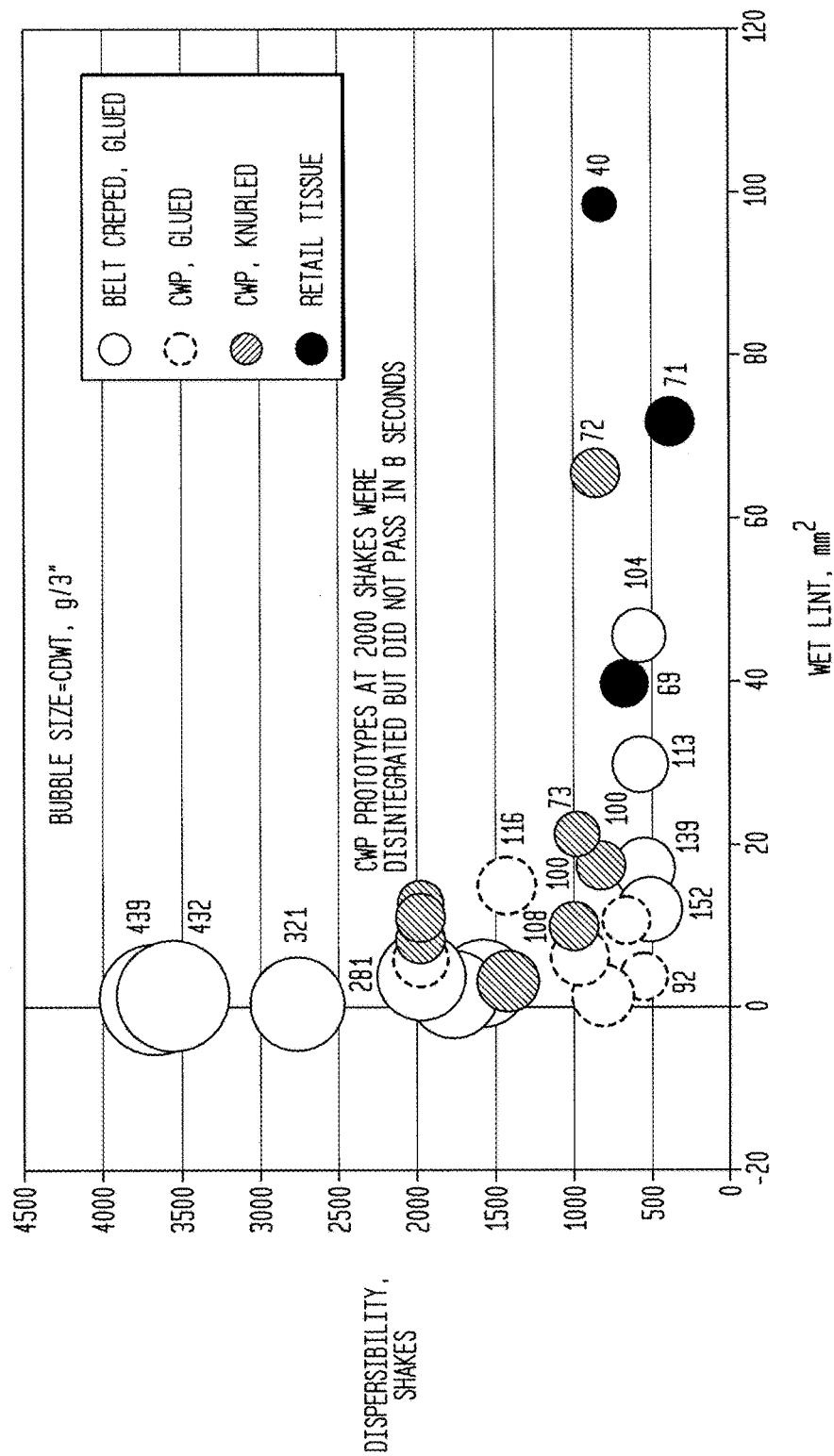
FIG. 16 is a bubble graph illustrating the inter-relationship among dispersibility, CD wet strength and resistance to wet linting of several prototype products.

FIG. 16 compares the dispersibility of previous FRBC prototypes with current CWP. Many CWP products have both dispersibility and low lint, while others fail dispersibility, despite being less durable than FRBC prototypes. This difference between FRBC and CWP can be explained mostly by basis weight, but the data also suggest a fiber composition contribution. CWP prototypes with a value of 2000 shakes were terminated without passing. The samples were observed to be largely disintegrated, but too floccy to pass the small bottle opening in 8 seconds per the procedure. Higher softwood contents will increase the flocciness of the disintegrated tissue, and this effect was often seen in a product that was made with a middle ply with 50% southern pine. On the other hand, sheets with more eucalyptus APMP passed the test. Minimizing softwood content, particularly, southern pine, can benefit dispersibility, particularly, in high basis weight tissue with more durability. Desirably, softwood content will be kept to less than about 40%, more preferably, to less than about 35%, still more preferably, between about 20% and about 35%, and most preferably, to between about 25% and about 35%.

Figure 17:
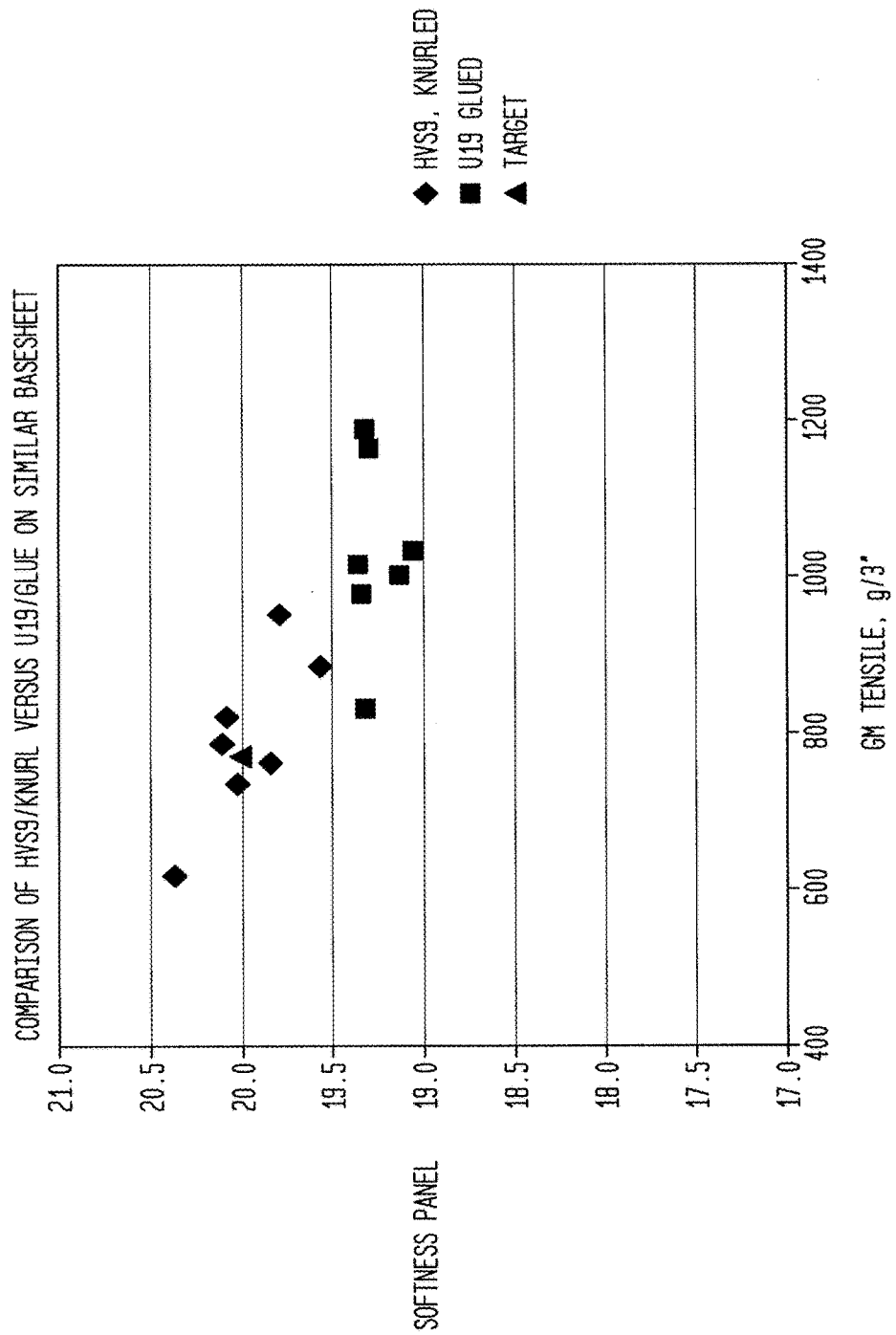
FIG. 17 illustrates the dry tensile strength and softness of several prototype tissue products.
Figures 1, 28:
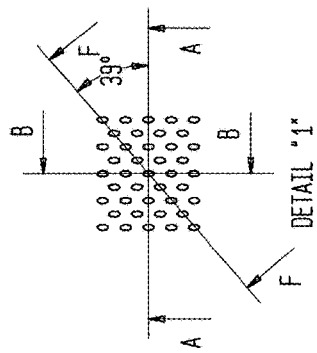
FIGS. 28, 28-A to 28-H, 28-J, 28-1, and 28-2 illustrate details of the emboss pattern HVS 9 referred to herein.
Figures 2, 28:
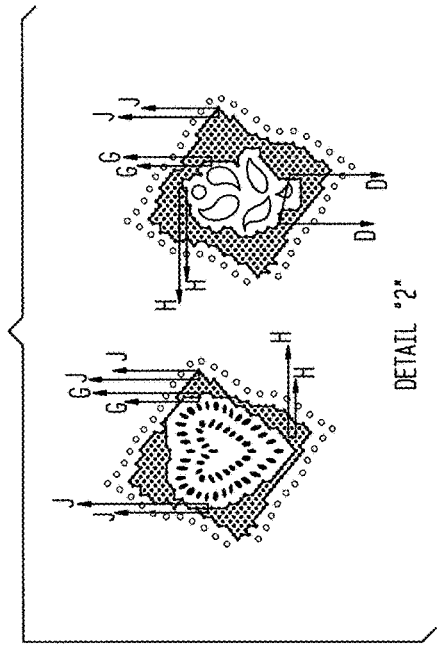
Figure 28:
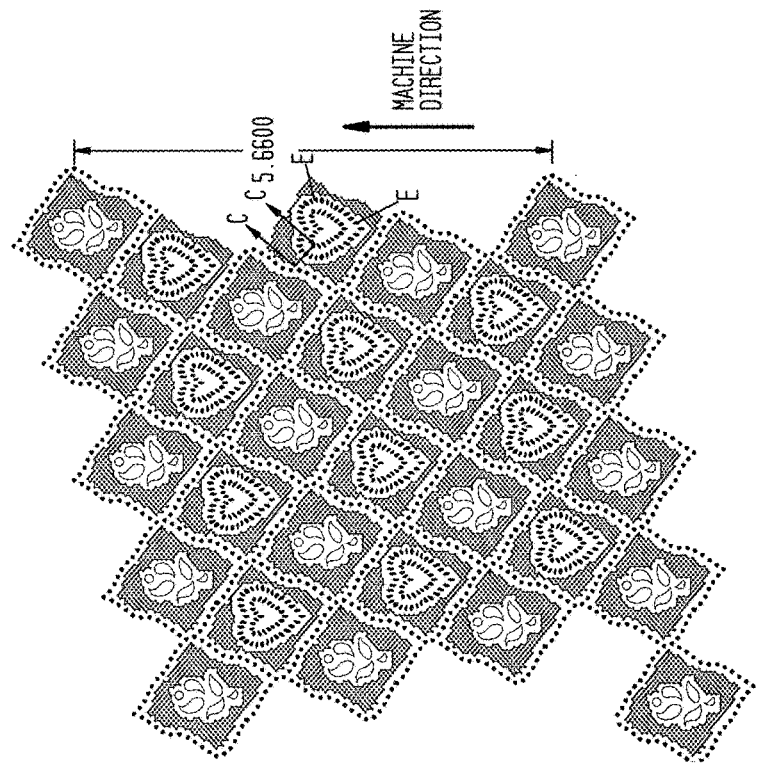

FIG. 17 shows that embossing with pattern HVS 9 (FIGS. 28, 28-A to 28-H, 28-J, 28-1, and 28-2), then ply bonding by knurling, resulted in a softer product on similar sheets than embossing with pattern U 19 (FIGS. 27, 27A to 27F, 27H, and 27T) and joining by glue. The HVS 9 microemboss reduced basesheet tensile on the order of 25%, while there was almost no tensile breakdown with the emboss penetration used in U 19.

Figure 18:
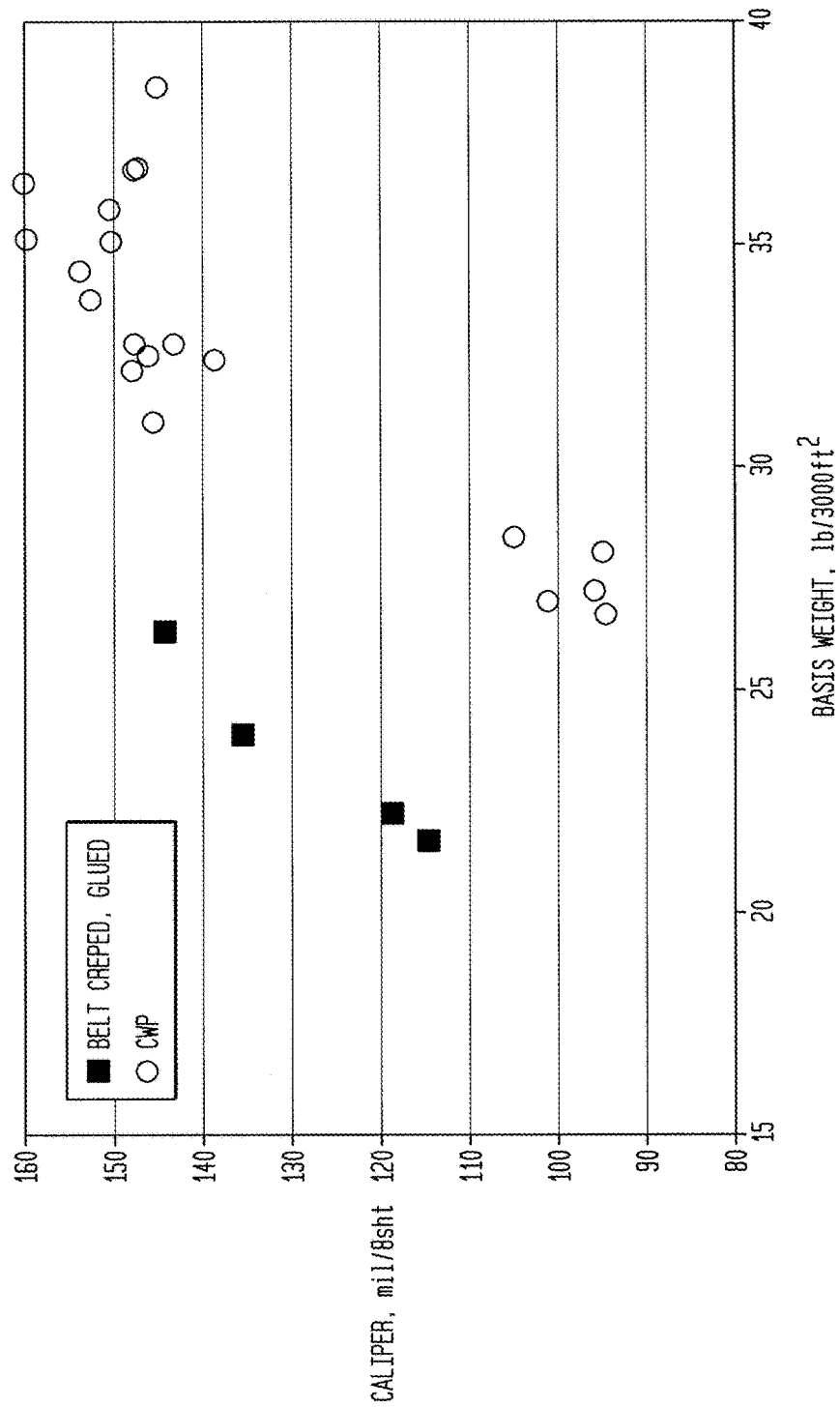
FIG. 18 illustrates the caliper and basis weight of CWP prototype tissue products in comparison with those of Fabric Reorienting Belt Creping ("FRBC") prototypes.
Figure 19:
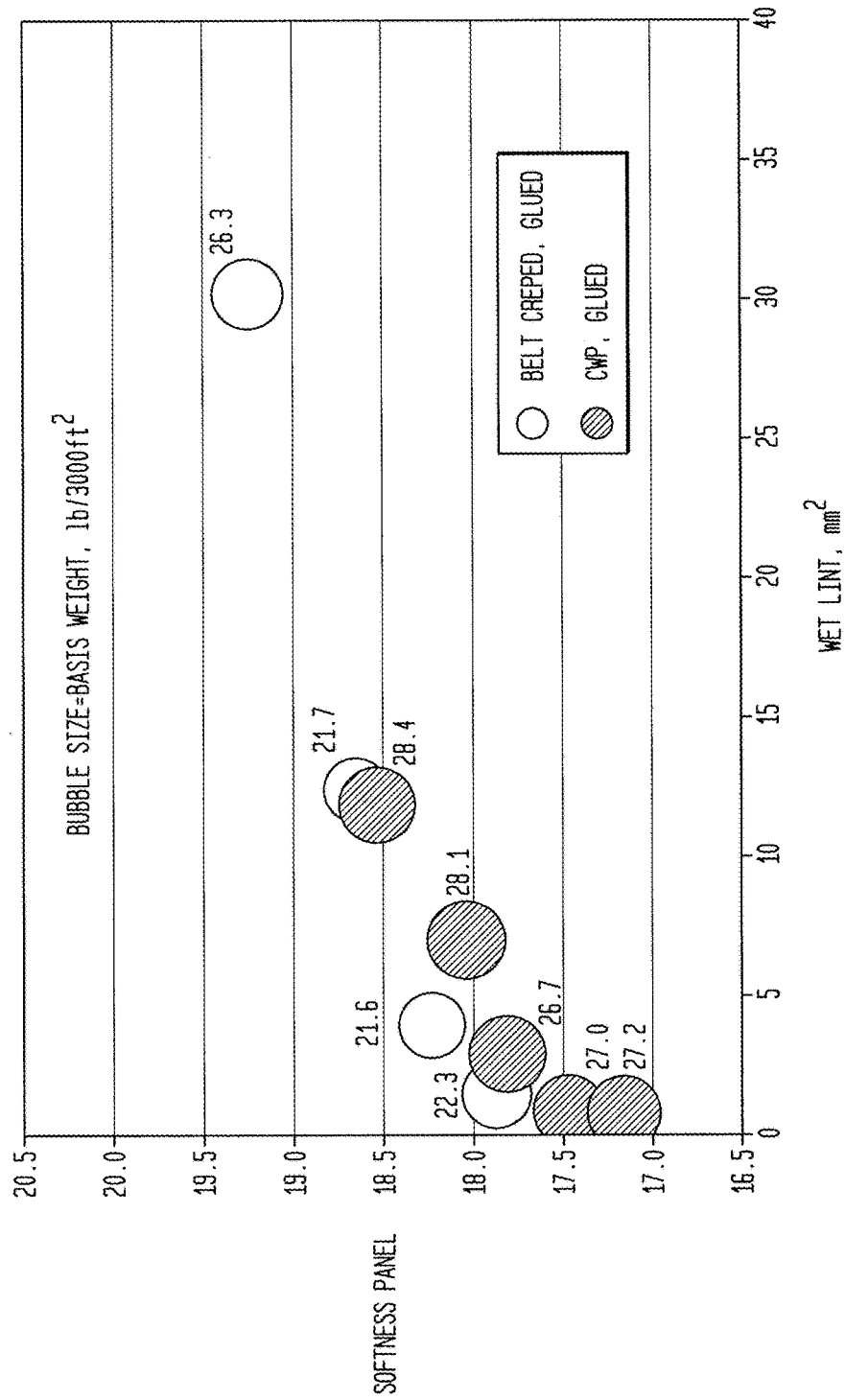
FIG. 19 illustrates the softness and wet lint resistance of CWP prototype tissue products in comparison with those of FRBC prototypes with bubble size representing basis weight.

FIGS. 18 and 19 compare the attributes of bath tissue made using FRBC technology to tissue made using CWP. In particular, while FRBC clearly has a striking advantage in terms of bulk generation/caliper (FIG. 18), the difference in softness is considerably less substantial (FIG. 19).

Referring back to Table 23, Products 1 and 2 are early prototypes that used birch APMP for the bulky inner layer. It appears that other APMP hardwood pulps can be substituted for eucalyptus APMP in the interior plies of three-ply products to provide the bulk benefit of the eucalyptus APMP. The sheets are, however, weak and subject to considerable dusting, suggesting that they are not all that desirable for exterior plies.

In contrast, the preceding Examples demonstrate that low cost eucalyptus APMP furnish can be incorporated into premium three-ply bath tissue without sacrificing softness or the attributes of quality, while adding bulk. Three-ply CWP can be an acceptable format for a premium quality wet or dry bath tissue.

While the invention has been described in connection with numerous examples and embodiments, modifications to those examples and embodiments within the spirit and scope of the invention will be readily apparent to those of skill in the art. In view of the foregoing discussion, relevant knowledge in the art and references including copending applications discussed above, the relevant disclosures of which are all incorporated herein by reference in their entireties, further description is deemed unnecessary.

We claim:

1. A multi-ply bath tissue having a basis weight of from about 20 to about 35 lbs per 3000 sq foot ream, and comprising:
   (A) a percentage by weight of cellulosic microfibers; and
   (B) a percentage by weight of wood pulp fibers,
   the multi-ply bath tissue having:
   (a) sufficient temporary wet strength resin to provide an initial Finch Cup cross-machine direction (CD) wet tensile of from about 2.5 to about 20 g/3 in. per pound of basis weight, the initial Finch Cup CD wet tensile decaying to less than 65% of the initial value in less than 15 minutes after immersion in water; and
   (b) a caliper of at least 5 mils per 8 sheets per pound of basis weight,
   wherein at least one of the plies comprises:
   (i) a plurality of fiber-enriched hollow domed regions having a relatively high basis weight;
   (ii) a plurality of connecting regions having a relatively lower basis weight forming a network interconnecting the fiber-enriched hollow domed regions of the sheet; and
   (iii) a plurality of transition regions with upwardly and inwardly inflected consolidated fibrous regions transitioning from the connecting regions into the fiber-enriched hollow domed regions.

2. The multi-ply bath tissue of claim 1, having an opacity of at least about 2.5 MacBeth Opacity Units per pound of basis weight.

3. The multi-ply bath tissue of claim 1, comprising from about 5% to about 25% cellulosic microfiber and from about 75% to about 85% wood pulp fibers.

4. The multi-ply bath tissue of claim 1, comprising two substantially unembossed plies and one embossed ply.

5. The multi-ply bath tissue of claim 1, comprising one substantially unembossed ply and two embossed plies.

6. The multi-ply bath tissue of claim 1, having a basis weight of from about 22 to about 32 lbs per 3000 sq foot ream.

7. The multi-ply bath tissue of claim 1, comprising overall from at least about 5% up to about 50% of cellulosic microfiber (CMF) by weight and from about 50% to about 95% wood pulp fibers, the multi-ply bath tissue comprising three plies, at least one of the plies comprising at least one stratum comprising from about 15% to about 50% of cellulosic microfiber, the multi-ply bath tissue having an eight sheet caliper of at least about 5.25 mils per lb of basis weight for a 3000 sq foot ream, a breaking modulus of between 2.5 and 3.5 g/% stretch per pound of basis weight, a CD wet tensile of between 3.5 and 18 g/3 in. per pound of basis weight, and a geometric mean (GM) dry tensile (GMT) of between 30 and 60 g/3 in. per pound of basis weight.

8. The multi-ply bath tissue of claim 7, wherein (i) the ply comprising the plurality of fiber-enriched hollow domed regions, the plurality of connecting regions, and the plurality of transition regions is a ply other than an interior ply, and (ii) the at least one of the plies comprising the at least one stratum comprising from about 15% to about 50% cellulosic microfiber is disposed such that the stratum defines an exterior surface of the multi-ply bath tissue.

9. The multi-ply bath tissue of claim 7, wherein at least two of the three plies comprise a plurality of fiber-enriched hollow domed regions having a relatively high basis weight, a plurality of connecting regions of a relatively lower basis weight forming a network interconnecting the fiber-enriched hollow domed regions of a sheet of the bath tissue, and a plurality of transition regions with upwardly and inwardly inflected consolidated fibrous regions transitioning from the connecting regions into the fiber-enriched hollow domed regions.

10. The multi-ply bath tissue of claim 7, wherein each of the three plies comprises a plurality of fiber-enriched hollow domed regions having a relatively high basis weight, a plurality of connecting regions of a relatively lower basis weight forming a network interconnecting the fiber-enriched hollow domed regions of the sheet, and a plurality of transition regions with upwardly and inwardly inflected consolidated fibrous regions transitioning from the connecting regions into the fiber-enriched hollow domed regions.

11. The multi-ply bath tissue of claim 1, wherein the fiber-enriched hollow domed regions in the plurality of fiber-enriched hollow domed regions are provided in an interpenetrating staggered array.

12. The multi-ply bath tissue of claim 1, wherein, when tested according to the Wet Abrasion Lint Test, the Wet Abraded Lint Area is less than 35 mm$^2$.

13. The multi-ply bath tissue of claim 1, wherein, when tested according to the Wet Abrasion Lint Test, the Wet Abraded Lint Area is less than 30 mm$^2$.

14. The multi-ply bath tissue of claim 1, wherein, when tested according to the Wet Abrasion Lint Test, the Wet Abraded Lint Area is less than 25 mm$^2$.

15. The multi-ply bath tissue of claim 1, wherein, when tested according to the Wet Abrasion Lint Test, the Wet Abraded Lint Area is less than 20 mm$^2$.

16. The multi-ply bath tissue of claim 1, wherein, when tested according to the Dry Lint Test, the ΔL* value is less than 6.0.

17. The multi-ply bath tissue of claim 1, wherein, when tested according to the Dry Lint Test, the ΔL* value is less than 5.0.

18. The multi-ply bath tissue of claim 1, wherein, when tested according to the Dry Lint Test, the ΔL* value is less than 4.5.

19. The multi-ply bath tissue of claim 1, wherein, when tested according to the Dry Lint Test, the ΔL* value is less than 4.25.

20. The multi-ply bath tissue of claim 1, wherein the plies are joined to each other by knurling.

21. The multi-ply bath tissue of claim 1, wherein the plies are embossed with a pattern having primarily points to the inside and are joined by glue-lamination.

22. The multi-ply bath tissue of claim 1, comprising three plies of tissue, wherein two plies are embossed, one ply is unembossed, and the plies are joined by knurling, wherein knurled regions are arranged in a meandering path.

23. The multi-ply bath tissue of claim 1, comprising three plies of tissue, wherein two plies are unembossed, one ply is embossed, and the plies are joined by knurling, wherein knurled regions are arranged in a meandering path.

24. The multi-ply bath tissue of claim 1, comprising three plies of tissue, wherein two plies are embossed, one ply is unembossed, and the plies are joined by knurling, wherein knurled regions are arranged in a meandering path and an outermost stratum of a lower ply has substantially the same composition as that of an outermost stratum of an upper ply.

25. The multi-ply bath tissue of claim 1, having a geometric mean (GM) dry tensile of from about 17 to about 80 g/3 in. per pound basis weight.

26. The multi-ply bath tissue of claim 1, having a CD dry tensile of between about 30 to about 60 g/3 in. per pound of basis weight.

27. A multi-ply bath tissue having a basis weight of from about 20 to about 35 lbs per 3000 sq foot ream, and comprising:
(A) a percentage by weight of cellulosic microfibers; and
(B) a percentage by weight of wood pulp fibers,
the multi-ply bath tissue having sufficient temporary wet strength resin to provide an initial Finch Cup cross-machine (CD) wet tensile of from about 2.5 to about 20 g/3 in. per pound of basis weight, the initial Finch Cup CD wet tensile decaying to less than 75% of the initial value in less than 1 hour after immersion in water,
wherein at least one of the plies, other than an interior ply, comprises:
(i) a plurality of fiber-enriched hollow domed regions having a relatively high basis weight;
(ii) a plurality of connecting regions having a relatively lower basis weight forming a network interconnecting the fiber-enriched hollow domed regions of the sheet; and
(iii) a plurality of transition regions with upwardly and inwardly inflected consolidated fibrous saddle shaped regions transitioning from the connecting regions into the fiber-enriched hollow domed regions.

28. The multi-ply bath tissue of claim 27, having a geometric mean (GM) dry tensile of from about 17 to 80 g/3 in. per pound of basis weight.

29. The multi-ply bath tissue of claim 27, having a geometric mean (GM) breaking modulus of between 1.5 to 6.5 g/% stretch per pound of basis weight.

30. The multi-ply bath tissue of claim 27, having a CD dry tensile of between about 2 to about 30 g/3 in. per pound of basis weight.

31. The multi-ply bath tissue of claim 27, having an opacity of at least about 2.0 MacBeth Opacity Units per pound of basis weight.

32. A multi-ply bath tissue having a basis weight of from about 20 to about 38 lbs per 3000 sq foot ream, and comprising:
(A) a percentage by weight of cellulosic microfibers;
(B) a percentage by weight of wood pulp fibers; and
(C) from about 5% to about 50% by weight of the tissue comprising eucalyptus fibers having a lignin content of at least about 20%,
the multi-ply bath tissue having:
(i) sufficient temporary wet strength resin to provide an initial Finch Cup cross-machine direction (CD) wet tensile of from about 2.5 to about 20 g/3 in. per pound of basis weight, the initial Finch Cup CD wet tensile decaying to less than 65% of the initial value in less than one half hour after immersion in water; and
(ii) a caliper of at least 4 mils per 8 sheets per pound of basis weight.

33. The multi-ply bath tissue of claim 32, having a geometric mean (GM) dry tensile of from about 35 to 80 g/3 in. per pound of basis weight.

34. The multi-ply bath tissue of claim 32, having a CD dry tensile of between about 2 to about 30 g/3 in. per pound of basis weight.

35. The multi-ply bath tissue of claim 32, having a caliper of at least 4.5 mils per 8 sheets per pound of basis weight.

36. The multi-ply bath tissue of claim 32, having a caliper of at least 5 mils per 8 sheets per pound of basis weight.

37. The multi-ply bath tissue of claim 32, wherein, when tested according to the Wet Abrasion Lint Test, the Wet Abraded Lint Area is less than 35 mm$^2$.

38. The multi-ply bath tissue of claim 32, wherein, when tested according to the Wet Abrasion Lint Test, the Wet Abraded Lint Area is less than 30 mm$^2$.

39. The multi-ply bath tissue of claim 32, wherein, when tested according to the Wet Abrasion Lint Test, the Wet Abraded Lint Area is less than 25 mm$^2$.

40. (Currently Amened) The multi-ply bath tissue of claim 32, wherein, when tested according to the Wet Abrasion Lint Test, the Wet Abraded Lint Area is less than 20 mm$^2$.

41. The multi-ply bath tissue of claim 32, having an opacity of at least about 2.5 MacBeth Opacity Units per pound of basis weight.

42. The multi-ply bath tissue of claim 32, comprising from about 3% to about 10% cellulosic microfiber and from about 75% to about 85% wood pulp fibers.

43. The multi-ply bath tissue of claim 32, comprising two substantially unembossed plies and one embossed ply.

44. The multi-ply bath tissue of claim 32, comprising one substantially unembossed ply and two embossed plies.

45. The multi-ply bath tissue of claim 32, having a basis weight of from about 22 to about 32 lbs per 3000 sq foot ream.

46. The multi-ply bath tissue of claim 32, comprising at least three plies, at least first and second plies of which comprise from about 3% to about 25% cellulosic microfiber, up to about 50% alkaline peroxide mechanical pulp (APMP) eucalyptus and from about 75% to about 97% wood pulp fibers, the multi-ply bath tissue having:
(a) an overall basis weight of between 22 and 36 lbs per 3000 sq ft ream;
(b) an eight sheet caliper of at least about 5.25 mils per lb of basis weight for a 3000 sq foot ream;
(c) a breaking modulus of between 2.5 and 3.5 g/% stretch per pound of basis weight;
(d) a CD wet tensile of between 3 and 18 g/3 in. per pound of basis weight; and (e) a geometric mean tensile (GMT) of between 40 and 70 g/3 in. per pound of basis weight, wherein the percentage of eucalyptus APMP in the third ply is:
  (i) greater than at least about 20%;
  (ii) greater than the percentage of eucalyptus APMP in the first ply; and
  (iii) exceeds the percentage of eucalyptus APMP in the first ply by an amount that is at least 20% of the weight of eucalyptus APMP in the first ply, if any.

47. The multi-ply bath tissue of claim 46, wherein at least one of the plies comprises a web having a plurality of fiber-enriched hollow domed regions having a relatively high basis weight, a plurality of connecting regions having a relatively lower basis weight forming a network interconnecting the fiber-enriched hollow domed regions of the sheet, and a plurality of transition regions with upwardly and inwardly inflected consolidated fibrous regions transitioning from the connecting regions into the fiber-enriched hollow domed regions.

48. The multi-ply bath tissue of claim 47, wherein the ply comprising the plurality of fiber-enriched hollow domed regions, the plurality of connecting regions, and the plurality of transition regions is a ply other than an interior ply.

49. The multi-ply bath tissue of claim 47, wherein the fiber-enriched hollow domed regions in the plurality of fiber-enriched hollow domed regions are provided in an interpenetrating staggered array.

50. The multi-ply bath tissue of claim 46, wherein at least two of the three plies comprise a plurality of fiber-enriched hollow domed regions having a relatively high basis weight, a plurality of connecting regions having a relatively lower basis weight forming a network interconnecting the fiber-enriched hollow domed regions of the sheet, and a plurality of transition regions with upwardly and inwardly inflected consolidated fibrous regions transitioning from the connecting regions into the fiber-enriched hollow domed regions.

51. The multi-ply bath tissue of claim 46, wherein each of the three plies comprises a plurality of fiber-enriched hollow domed regions having a relatively high basis weight, a plurality of connecting regions having a relatively lower basis weight forming a network interconnecting the fiber-enriched hollow domed regions of the sheet, and a plurality of transition regions with upwardly and inwardly inflected consolidated fibrous regions transitioning from the connecting regions into the fiber-enriched hollow domed regions.

52. The multi-ply bath tissue of claim 46, wherein, when tested according to the Wet Abrasion Lint Test, the Wet Abraded Lint Area is less than 35 mm$^2$.

53. The multi-ply bath tissue of claim 46, wherein, when tested according to the Wet Abrasion Lint Test, the Wet Abraded Lint Area is less than 30 mm$^2$.

54. The multi-ply bath tissue of claim 46, wherein, when tested according to the Wet Abrasion Lint Test, the Wet Abraded Lint Area is less than 25 mm$^2$.

55. The multi-ply bath tissue of claim 46, wherein, when tested according to the Wet Abrasion Lint Test, the Wet Abraded Lint Area is less than 20 mm$^2$.

56. The multi-ply bath tissue of claim 46, wherein, when tested according to the Dry Lint Test, the ΔL* value is less than 6.0.

57. The multi-ply bath tissue of claim 46, wherein, when tested according to the Dry Lint Test, the ΔL* value is less than 5.5.

58. The multi-ply bath tissue of claim 46, wherein, when tested according to the Dry Lint Test, the ΔL* value is less than 5.0.

59. The multi-ply bath tissue of claim 46, wherein the plies are joined to each other by knurling.

60. The multi-ply bath tissue of claim 46, wherein the plies are embossed in a pattern having primarily points to the inside and are joined by glue-lamination.

61. The multi-ply bath tissue of claim 46, comprising three plies of tissue, wherein two plies are embossed, one ply is unembossed, and the plies are joined by knurling, wherein knurled regions are arranged in a meandering path.

62. The multi-ply bath tissue of claim 46, comprising three plies of tissue, wherein two plies are unembossed, one ply is embossed, and the plies are joined by knurling, wherein knurled regions are arranged in a meandering path.

63. The multi-ply bath tissue of claim 46, comprising two plies of tissue, wherein one ply is embossed, one ply is unembossed, and the plies are joined by knurling, wherein knurled regions are arranged in a meandering path.

64. A multi-ply bath tissue having a basis weight of from about 20 to 38 lbs per 3000 sq foot ream, and comprising:
  (A) a percentage by weight of cellulosic microfibers;
  (B) a percentage by weight of wood pulp fibers; and
  (C) from about 10% to about 50% of the weight of the tissue comprising eucalyptus fibers having a lignin content of at least about 20%, an ISO brightness of at least about 84, a Canadian Standard Freeness (CSF) of at least about 400 ml, a bulk of between 2.2 and 4.2 cc/g, and a breaking length of between about 1.2 and 4.7 km,
  the multi-ply bath tissue having sufficient temporary wet strength resin to provide an initial Finch Cup cross-machine direction (CD) wet tensile of from about 2.5 g/3 in. to about 20 g/3 in. per pound of basis weight, the initial Finch Cup CD wet tensile decaying to less than 65% of the initial value in less than one hour after immersion in water,
  wherein at least one of the plies, other than an interior ply, comprises:
  (i) a plurality of fiber-enriched hollow domed regions having a relatively high basis weight;
  (ii) a plurality of connecting regions having a relatively lower basis weight forming a network interconnecting the fiber-enriched hollow domed regions of the sheet; and
  (iii) a plurality of transition regions with upwardly and inwardly inflected consolidated fibrous saddle shaped regions transitioning from the connecting regions into the fiber-enriched hollow domed regions.

65. The multi-ply bath tissue of claim 64, wherein at least 50% of the eucalyptus fibers having a lignin content of at least about 20% are never dried fibers.

66. The multi-ply bath tissue of claim 64, having a geometric mean (GM) dry tensile of from about 25 to 80 g/3 in. per pound of basis weight.

67. The multi-ply bath tissue of claim 64, having a breaking modulus of between 2.5 and 3.5 g/% stretch per pound of basis weight.

68. The multi-ply bath tissue of claim 64, having a cross-machine direction (CD) dry tensile of between about 30 to about 60 g/3 in. per pound of basis weight.

69. The multi-ply bath tissue of claim 64, having an opacity of at least about 2.5 MacBeth Opacity Units per pound of basis weight.

70. A multi-ply bath tissue product having:
  (A) an upper stratified ply comprising two strata, an outer stratum and an inner stratum,
    (a) the outer stratum comprising a blend of at least about 30% to about 70% kraft fiber and at least 30% to about 70% by weight of eucalyptus kraft and having a basis weight of at least about 5 to about 12 lbs per 3000 sq ft ream; and
(b) the inner stratum comprising at least about 50% fibers having a lignin content of at least about 20% by weight and a basis weight of at least about 2.0 lbs per 3000 sq ft ream;
(B) an interior ply having a basis weight of at least about 6 to about 15 lbs per 3000 sq ft ream, comprising:
(a) a percentage by weight of fibers having a lignin content of at least about 20% by weight; and
(b) a percentage by weight of bleached softwood kraft fibers; and
(C) a lower stratified ply comprising two strata, a first stratum and a second stratum,
(a) the first stratum comprising from at least about 30% to about 70% kraft fiber and from about 30% to about 70% by weight of eucalyptus kraft and having a basis weight of about 5 to about 12 lbs per 3000 sq ft ream; and
(b) the second stratum comprising at least about 50% fibers having a lignin content of at least about 20% by weight and a basis weight of at least about 2.0 lbs per 3000 sq ft ream,
wherein at least one of the plies comprises:
(i) a plurality of fiber-enriched hollow domed regions having a relatively high basis weight;
(ii) a plurality of connecting regions having a relatively lower basis weight forming a network interconnecting the fiber-enriched hollow domed regions of the sheet; and
(iii) a plurality of transition regions with upwardly and inwardly inflected consolidated fibrous saddle shaped regions transitioning from the connecting regions into the fiber-enriched hollow domed regions.

71. The multi-ply bath tissue product of claim 70, wherein at least 50% of the fibers having a lignin content of at least about 20% are never dried fibers.

72. The multi-ply bath tissue product of claim 71, wherein the outer stratum of the upper ply comprises at least about 8% by weight of individualized regenerated cellulosic microfiber.

73. The multi-ply bath tissue product of claim 71, wherein the outer stratum of the upper ply comprises at least about 8% by weight of individualized regenerated cellulosic microfiber having a number average diameter of at most about 2 microns.

74. The multi-ply bath tissue product of claim 70, wherein the interior ply and the upper stratified ply have been joined by being embossed together.

75. The multi-ply bath tissue product of claim 74, wherein the fibrous composition of the upper stratified ply is substantially the same as the fibrous composition of the lower stratified ply.

76. The multi-ply bath tissue product of claim 74, wherein the depth of emboss of the lower stratified ply is less than 50% of the depth of emboss of the upper stratified ply.

77. The multi-ply bath tissue product of claim 74, wherein the depth of emboss of the lower stratified ply is less than 80% of the depth of emboss of the upper stratified ply.

78. The multi-ply bath tissue product of claim 76, wherein the outer stratum of the upper stratified ply comprises at least about 8% by weight of individualized regenerated cellulosic microfiber having a number average diameter of at most about 2 microns.

79. The multi-ply bath tissue product of claim 74, wherein the lower stratified ply is generally unembossed.

80. The multi-ply bath tissue product of claim 79, wherein the outer stratum of the upper stratified ply comprises at least about 5% by weight of individualized regenerated cellulosic microfiber having a number average diameter of at most about 1 micron.

81. The multi-ply bath tissue product of claim 70, wherein the fibrous composition of the upper stratified ply is substantially the same as the fibrous composition of the lower stratified ply.

82. The multi-ply bath tissue product of claim 70, wherein the outer stratum of the upper stratified ply further comprises at least about 5% by weight of individualized regenerated cellulosic microfiber having a diameter of no more than about 5 microns and passing a screen of about 14 mesh.

83. The multi-ply bath tissue product of claim 70, wherein the outer stratum of the upper stratified ply further comprises at least about 5% by weight of individualized regenerated cellulosic microfiber having a number average diameter of no more than about 4 microns and a number average length of between about 50 microns and 2000 microns.

84. The mulit-ply bath tissue product of claim 70, wherein the outer stratum of the upper stratified ply further comprises at least about 10% by weight of individualized regenerated cellulosic microfiber having a number average diameter of at most about 4 microns and a number average length of between about 50 microns and 2000 microns.

85. The multi-ply bath tissue product of claim 70, wherein the outer stratum of the upper stratified ply further comprises at least about 10% by weight of individualized regenerated cellulosic microfiber having a number average diameter of at most about 2 microns and a number average length of between about 50 microns and 2000 microns.

86. The multi-ply bath tissue product of claim 70, wherein the outer stratum of each of the upper stratifed ply and the lower stratified ply further comprises at least about 5% by weight of individualized regenerated cellulosic microfiber having a number average diameter of at most about 4 microns and a number average length of between about 50 microns and 2000 microns.

87. The multi-ply bath tissue product of claim 70, wherein each of the inner stratum of the upper stratified ply and the second stratum of the lower stratified ply comprises at least about 70% eucalyptus fibers having a lignin content of at least about 20% by weight.

88. The multi-ply bath tissue product of claim 70, wherein each of the inner stratum of the upper stratified ply and the second stratum of the lower stratified ply comprises debonder.

89. The multi-ply bath tissue product of claim 70, wherein the interior ply is creped, exhibiting a percent crepe at least 3% greater than that of the upper stratified and lower stratified plies.

90. A multi-ply bath tissue product having comprising:
(A) an upper stratified ply comprising two strata, an outer stratum and an inner stratum,
(a) the outer stratum comprising a blend of at least about 30% to about 70% kraft fiber and at least 30% to about 70% by weight of eucalyptus kraft and at least about 5% by weight of individualized regenerated cellulosic microfibers having a number average diameter of at most about 4 microns and a number average length of between about 50 microns and 2000 microns, the outer stratum having a basis weight of at least about 5 to about 12 lbs per 3000 sq ft ream; and (b) the inner stratum comprising at least about 70% fibers having a lignin content of at least about 20% by weight, and a basis weight of at least about 2.0 lbs per 3000 sq ft ream;

(B) an interior ply having a basis weight of at least about 6 to about 15 lbs per 3000 sq ft ream, and comprising:

(a) a percentage by weight of fibers having a lignin content of at least about 20% by weight; and (b) a percentage by weight of bleached kraft fiber; and (C) a lower stratified ply comprising at least two strata, including a first stratum and a second stratum, (a) the first stratum comprising from at least about 30% to about 70% kraft fiber and from about 30% to about 70% by weight of eucalyptus kraft and having a basis weight of about 5 to about 12 lbs per 3000 sq ft ream; and (b) the second stratum comprising at least about 70% fibers having a lignin content of at least about 20% by weight and a basis weight of at least about 2.0 lbs per 3000 sq ft ream, wherein at least one of the plies, other than the interior ply, comprises:

(i) a plurality of fiber-enriched hollow domed regions having a relatively high basis weight;

(ii) a plurality of connecting regions having a relatively lower basis weight forming a network interconnecting the fiber-enriched hollow domed regions of the sheet; and (iii) a plurality of transition regions with upwardly and inwardly inflected consolidated fibrous saddle shaped regions transitioning from the connecting regions into the fiber-enriched hollow domed regions.

91. The multi-ply bath tissue product of claim 90, wherein the upper stratified ply and the lower stratified ply have substantially identical fibrous compositions.

92. The multi-ply bath tissue product of claim 90, exhibiting an ISO brightness of at least:

0.82×(% VCP)+0.795×(% RF)98+0.84×(% APMP+CFM), where % VCP is the percentage of virgin chemical pulp in a sheet in an outer ply, % RF, the percentage of recycle fiber in the outer ply, and % APMP+CMF is the percentage of alkaline peroxide mechanical pulp (APMP) eucalyptus and regenerated cellulosic microfiber in the outer ply.

93. The multi-ply bath tissue product of claim 90, wherein a major portion of the fibers in the interior ply is never dried fibers having a lignin content of at least about 23%, and exhibits an ISO brightness of at least about 82.

94. The multi-ply bath tissue product of claim 90, wherein the weight percentage of chemically pulped softwood fiber in the three-ply bath tissue product is limited to at most 30% of the weight of the three-ply bath tissue product.

95. The multi-ply bath tissue product of claim 90, wherein a major portion of the fibers in the interior ply has a lignin content of at least about 23%, and exhibits an ISO brightness of at least about 82.

96. A multi-ply bath tissue having a basis weight of from about 20 to about 40 lbs per 3000 sq foot ream, and comprising:

(A) a percentage by weight of cellulosic microfibers; and (B) a percentage by weight of wood pulp fibers, the multi-ply bath tissue having:

(a) sufficient temporary wet strength resin to provide an initial Finch Cup cross-machine direction (CD) wet tensile of from about 2.5 to about 20 g/3 in. per pound of basis weight, the initial Finch Cup CD wet tensile decaying to less than 65% of the initial value in less than 15 minutes after immersion in water; and (b) a caliper of at least 5 mils per 8 sheets per pound of basis weight, wherein at least one of the plies comprises:

(i) a plurality of fiber-enriched hollow domed regions having a relatively high basis weight;

(ii) a plurality of connecting regions having a relatively lower basis weight forming a network interconnecting the fiber-enriched hollow domed regions of the sheet; and (iii) a plurality of transition regions with upwardly and inwardly inflected consolidated fibrous regions transitioning from the connecting regions into the fiber-enriched hollow domed regions.

97. The multi-ply bath tissue of claim 96, having an opacity of at least about 2.5 MacBeth Opacity Units per pound of basis weight.

98. The multi-ply bath tissue of claim 96, comprising from about 5% to about 25% cellulosic microfiber and from about 75% to about 85% wood pulp fibers.

99. The multi-ply bath tissue of claim 96, having a basis weight of from about 22 to about 32 lbs per 3000 sq foot ream.

100. The multi-ply bath tissue of claim 96, wherein, when tested according to the Wet Abrasion Lint Test, the Wet Abraded Lint Area is less than 35 mm$^2$.

101. The multi-ply bath tissue of claim 96, wherein, when tested according to the Wet Abrasion Lint Test, the Wet Abraded Lint Area is less than 30 mm$^2$.

102. The multi-ply bath tissue of claim 96, wherein, when tested according to the Wet Abrasion Lint Test, the Wet Abraded Lint Area is less than 25 mm$^2$.

103. The multi-ply bath tissue of claim 96, wherein, when tested according to the Wet Abrasion Lint Test, the Wet Abraded Lint Area is less than 20 mm$^2$.

104. The multi-ply bath tissue of claim 96, wherein, when tested according to the Dry Lint Test, the $\Delta L^*$ value is less than 6.0.

105. The multi-ply bath tissue of claim 96, wherein, when tested according to the Dry Lint Test, the $\Delta L^*$ value is less than 5.0.

106. The multi-ply bath tissue of claim 96, wherein, when tested according to the Dry Lint Test, the $\Delta L^*$ value is less than 4.5.

107. The multi-ply bath tissue of claim 96, wherein, when tested according to the Dry Lint Test, the $\Delta L^*$ value is less than 4.25.

108. The multi-ply bath tissue of claim 96, wherein the plies are joined to each other by knurling.

109. The multi-ply bath tissue of claim 96, wherein the plies are embossed with a pattern having primarily points to the inside and are joined by glue-lamination.

110. The multi-ply bath tissue of claim 96, having a geometric mean (GM) dry tensile of from about 17 to 80 g/3 in. per pound of basis weight.

111. The multi-ply bath tissue of claim 96, having a CD dry tensile of between about 30 to about 60 g/3 in. per pound of basis weight.

112. A bath tissue having a basis weight of from about 20 to about 40 lbs per 3000 sq foot ream, and comprising:

(A) a percentage by weight of cellulosic microfibers; and (B) a percentage by weight of wood pulp fibers, the bath tissue having:

sufficient temporary wet strength resin to provide an initial Finch Cup cross-machine direction (CD) wet tensile of from about 2.5 to about 20 g/3 in. per pound of basis weight, the initial Finch Cup CD wet tensile decaying to less than 65% of the initial value in less than 15 minutes after immersion in water, wherein the bath tissue includes at least one ply comprising:

(i) a plurality of fiber-enriched hollow domed regions having a relatively high basis weight;

(ii) a plurality of connecting regions having a relatively lower basis weight forming a network interconnecting the fiber-enriched hollow domed regions of the sheet; and (iii) a plurality of transition regions with upwardly and inwardly inflected consolidated fibrous regions transitioning from the connecting regions into the fiber-enriched hollow domed regions.

113. The bath tissue of claim 112, having an opacity of at least about 2.5 MacBeth Opacity Units per pound of basis weight.

114. The bath tissue of claim 112, comprising from about 5% to about 25% cellulosic microfiber and from about 75% to about 85% wood pulp fibers.

115. The bath tissue of claim 112, having a basis weight of from about 22 to about 32 lbs per 3000 sq foot ream.

116. The bath tissue of claim 112, wherein, when tested according to the Wet Abrasion Lint Test, the Wet Abraded Lint Area is less than 35 mm$^2$.

117. The bath tissue of claim 112, wherein, when tested according to the Wet Abrasion Lint Test, the Wet Abraded Lint Area is less than 30 mm$^2$.

118. The bath tissue of claim 112, wherein, when tested according to the Wet Abrasion Lint Test, the Wet Abraded Lint Area is less than 25 mm$^2$.

119. The bath tissue of claim 112, wherein, when tested according to the Wet Abrasion Lint Test, the Wet Abraded Lint Area is less than 20 mm$^2$.

120. The bath tissue of claim 112, wherein, when tested according to the Dry Lint Test, the $\Delta L^*$ value is less than 6.0.

121. The bath tissue of claim 112, wherein, when tested according to the Dry Lint Test, the $\Delta L^*$ value is less than 5.0.

122. The bath tissue of claim 112, wherein, when tested according to the Dry Lint Test, the $\Delta L^*$ value is less than 4.5.

123. The bath tissue of claim 112, wherein, when tested according to the Dry Lint Test, the $\Delta L^*$ value is less than 4.25.

124. The bath tissue of claim 112, having a geometric mean (GM) dry tensile of from about 17 to 80 g/3 in. per pound of basis weight.

125. The bath tissue of claim 112, having a CD dry tensile of between about 30 to about 60 g/3 in. per pound of basis weight.

126. The bath tissue of claim 112, having a caliper of at least 5 mils per 8 sheets per pound of basis weight.

* * * * *